US006220419B1

(12) United States Patent
Mennie

(10) Patent No.: US 6,220,419 B1
(45) Date of Patent: *Apr. 24, 2001

(54) METHOD AND APPARATUS FOR DISCRIMINATING AND COUNTING DOCUMENTS

(75) Inventor: Douglas U. Mennie, Barrington, IL (US)

(73) Assignee: Cummins-Allison, Mt. Prospect, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 08/834,746

(22) Filed: Apr. 4, 1997

Related U.S. Application Data

(63) Continuation-in-part of application No. 08/450,505, filed on May 26, 1995, now Pat. No. 5,687,963, and a continuation-in-part of application No. 08/340,031, filed on Nov. 14, 1994, now Pat. No. 5,815,592, and a continuation-in-part of application No. 08/573,392, filed on Dec. 15, 1995, now Pat. No. 5,790,697, and a continuation-in-part of application No. 08/287,882, filed on Aug. 9, 1994, now Pat. No. 5,652,802, said application No. 08/450,505, filed on May 26, 1995, now Pat. No. 5,687,963, is a continuation of application No. 08/340,031, filed on Nov. 14, 1994, now Pat. No. 5,815,592, which is a continuation-in-part of application No. 08/243,807, filed on May 16, 1994, now Pat. No. 5,633,949, and a continuation-in-part of application No. 08/207,592, filed on Mar. 8, 1994, now Pat. No. 5,467,406, said application No. 08/573,392, filed on Dec. 15, 1995, now Pat. No. 5,790,697, is a continuation-in-part of application No. 08/399,854, filed on Mar. 7, 1995, now Pat. No. 5,875,259, and a continuation-in-part of application No. 08/394,752, filed on Feb. 27, 1995, now Pat. No. 5,724,438, and a continuation-in-part of application No. 08/362,848, filed on Dec. 22, 1994, now Pat. No. 5,870,487, and a continuation-in-part of application No. 08/340,031, filed on Nov. 14, 1994, now Pat. No. 5,815,592, and a continuation-in-part of application No. 08/317,349, filed on Oct. 4, 1994, now Pat. No. 5,640,963, and a continuation-in-part of application No. 08/287,882, filed on Aug. 9, 1994, now Pat. No. 5,652,802, and a continuation-in-part of application No. 08/243,807, filed on May 16, 1994, now Pat. No. 5,633,949, and a continuation-in-part of application No. 08/226,660, filed on Apr. 12, 1994.

(51) Int. Cl.$^7$ .................................................. G07D 7/12
(52) U.S. Cl. ........................................... 194/207; 250/556
(58) Field of Search ........................... 194/207; 382/135; 250/556

(56) References Cited

U.S. PATENT DOCUMENTS

D. 369,984    5/1996    Larsen ................................. D10/97

(List continued on next page.)

FOREIGN PATENT DOCUMENTS 2659929    11/1977    (DE).

(List continued on next page.)

OTHER PUBLICATIONS

Translation of Japanese Patent No. 54–71673.

(List continued on next page.)

Primary Examiner—F. J. Bartuska
(74) Attorney, Agent, or Firm—Jenkens & Gilchrist

(57) ABSTRACT

A currency evaluation device for receiving a stack of currency bills and rapidly evaluating all the bills in the stack. The device includes an input receptacle for receiving a stack of bills to be evaluated and a single output receptacle for receiving the bills after they have been evaluated. A transport mechanism transports the bills, one at a time, from the input receptacle to the output receptacle along a transport path. The device further includes a discriminating unit that evaluates the bills. The discriminating unit comprises two detectors positioned along the transport path between the input receptacle and the output receptacle. The detectors are disposed on opposite sides of the transport path so that they are disposed adjacent to opposite sides of the bills. The discriminating unit counts and determines the denomination of the bills. The evaluation device also flags a bill when the denomination of the bill is not determined by the discriminating unit.

98 Claims, 41 Drawing Sheets

U.S. PATENT DOCUMENTS

| | | | |
|---|---|---|---|
| 3,246,295 | 4/1966 | DeClaris et al. | |
| 3,280,974 | 10/1966 | Riddle et al. | 209/111.8 |
| 3,409,109 * | 11/1968 | Iizuka et al. | 194/207 |
| 3,480,785 | 11/1969 | Aufderheide | 250/219 |
| 3,496,370 | 2/1970 | Haville et al. | 250/219 |
| 3,509,535 | 4/1970 | Berube | 340/149 |
| 3,612,835 | 10/1971 | Andrews et al. | 235/61.11 D |
| 3,618,765 | 11/1971 | Cooper et al. | 209/534 |
| 3,679,314 | 7/1972 | Mustert | 356/71 |
| 3,778,628 | 12/1973 | Novak et al. | 250/556 |
| 3,842,281 | 10/1974 | Goodrich | 250/461 |
| 3,870,629 | 3/1975 | Carter et al. | 209/111.8 |
| 3,906,449 | 9/1975 | Marchak | 340/149 R |
| 3,976,198 | 8/1976 | Carnes et al. | 209/111.7 T |
| 4,041,456 | 8/1977 | Ott et al. | 340/146.3 R |
| 4,096,991 | 6/1978 | Iguchi | 235/419 |
| 4,114,804 | 9/1978 | Jones et al. | 235/476 |
| 4,147,430 | 4/1979 | Gorgone et al. | 356/51 |
| 4,179,685 | 12/1979 | O'Maley | 340/146.3 H |
| 4,250,806 | 2/1981 | Boyson et al. | 101/2 |
| 4,255,651 | 3/1981 | Phillips | 235/92 |
| 4,275,874 | 6/1981 | DiBlasio | 271/4 |
| 4,277,774 | 7/1981 | Fujii et al. | 340/146.3 |
| 4,283,708 | 8/1981 | Lee | 340/146.3 Z |
| 4,288,781 | 9/1981 | Sellner et al. | 340/146.3 |
| 4,302,781 | 11/1981 | Ikeda et al. | 358/486 |
| 4,311,914 | 1/1982 | Huber | 250/556 |
| 4,313,598 | 2/1982 | DiBlasio | 271/124 |
| 4,334,619 | 6/1982 | Horino et al. | 209/551 |
| 4,348,656 | 9/1982 | Gorgone et al. | 340/146.3 R |
| 4,349,111 | 9/1982 | Shah et al. | 209/534 |
| 4,352,988 | 10/1982 | Ishida | 250/559 |
| 4,355,300 | 10/1982 | Weber | 340/146.3 C |
| 4,356,473 | 10/1982 | Freudenthal | 340/146.3 H |
| 4,365,700 | 12/1982 | Arimato et al. | |
| 4,381,447 | 4/1983 | Horvath et al. | 250/223 |
| 4,386,432 | 5/1983 | Nakamura et al. | |
| 4,442,541 | 4/1984 | Finkel et al. | |
| 4,461,028 | 7/1984 | Okubo. | |
| 4,464,786 | 8/1984 | Nishito et al. | |
| 4,464,787 | 8/1984 | Fish et al. | |
| 4,480,177 | 10/1984 | Allen | 235/379 |
| 4,487,306 | 12/1984 | Nao et al. | 382/135 |
| 4,490,846 | 12/1984 | Ishida et al. | |
| 4,513,439 | 4/1985 | Gorgone et al. | |
| 4,532,641 | 7/1985 | Nishimura | 377/14 |
| 4,539,702 | 9/1985 | Oka. | |
| 4,542,829 | 9/1985 | Emery et al. | 356/394 |
| 4,547,896 | 10/1985 | Ohtombe et al. | 382/318 |
| 4,553,846 | 11/1985 | Hilton et al. | 356/429 |
| 4,556,140 | 12/1985 | Okada. | |
| 4,557,597 | 12/1985 | Iwama | 356/71 |
| 4,558,224 | 12/1985 | Gober | 250/460.1 |
| 4,559,451 | 12/1985 | Curl | 250/560 |
| 4,559,452 | 12/1985 | Igaki et al. | 250/560 |
| 4,563,771 | 1/1986 | Gorgone et al. | |
| 4,567,370 | 1/1986 | Falls | 250/461.1 |
| 4,587,412 | 5/1986 | Apisdorf | 235/449 |
| 4,587,434 | 5/1986 | Roes et al. | 250/556 |
| 4,588,292 * | 5/1986 | Collins | 250/556 X |
| 4,592,090 | 5/1986 | Curl et al. | |
| 4,611,345 | 9/1986 | Ohniski et al. | 382/7 |
| 4,625,870 | 12/1986 | Nao et al. | 209/534 |
| 4,628,194 | 12/1986 | Dobbins et al. | 235/379 |
| 4,645,936 | 2/1987 | Gorgone | 250/556 |
| 4,650,320 | 3/1987 | Chapman et al. | 356/71 |
| 4,653,647 | 3/1987 | Hashimoto | 209/534 |
| 4,677,682 | 6/1987 | Miyagawa et al. | 382/7 |
| 4,681,229 | 7/1987 | Uesaka et al. | 209/534 |
| 4,690,268 | 9/1987 | Ueshin | 198/399 |
| 4,694,963 | 9/1987 | Takesako | 209/534 |
| 4,697,071 | 9/1987 | Hiraoka et al. | 235/379 |
| 4,700,368 | 10/1987 | Munn et al. | 377/8 |
| 4,733,308 | 3/1988 | Nakamura et al. | 358/496 |
| 4,747,492 | 5/1988 | Saito et al. | 209/534 |
| 4,764,976 | 8/1988 | Kallin et al. | |
| 4,820,909 | 4/1989 | Kawauchi et al. | 235/379 |
| 4,823,393 | 4/1989 | Kawakami. | |
| 4,827,531 | 5/1989 | Milford. | |
| 4,881,268 | 11/1989 | Uchida et al. | |
| 4,908,516 | 3/1990 | West | 250/556 |
| 4,922,109 | 5/1990 | Bercovitz et al. | 250/556 |
| 4,973,851 | 11/1990 | Lee | 250/556 |
| 4,984,280 | 1/1991 | Abe. | |
| 4,992,860 | 2/1991 | Hamaguchi et al. | 358/75 |
| 4,996,604 | 2/1991 | Ogawa et al. | 358/486 |
| 5,020,787 | 6/1991 | Arikawa | 271/3 |
| 5,027,415 | 6/1991 | Hara et al. | 382/135 |
| 5,047,871 | 9/1991 | Meyer et al. | 358/486 |
| 5,054,621 | 10/1991 | Murphy et al. | 209/534 |
| 5,055,834 | 10/1991 | Chiba | 382/135 |
| 5,068,519 | 11/1991 | Bryce | 235/449 |
| 5,122,754 | 6/1992 | Gotaas | 324/676 |
| 5,163,672 | 11/1992 | Mennie | 271/187 |
| 5,167,313 | 12/1992 | Dobbins et al. | 194/317 |
| 5,172,907 | 12/1992 | Kalisiak | 271/227 |
| 5,199,543 | 4/1993 | Kamagami et al. | 194/207 |
| 5,201,395 | 4/1993 | Takizawa et al. | 194/206 |
| 5,207,788 | 5/1993 | Geib et al. | 271/122 |
| 5,220,395 | 6/1993 | Yamashita et al. | 355/313 |
| 5,236,072 | 8/1993 | Cargill | 194/207 |
| 5,240,116 | 8/1993 | Stevens et al. | 209/534 |
| 5,261,518 | 11/1993 | Bryce | 194/206 |
| 5,295,196 | 3/1994 | Raterman et al. | 382/7 |
| 5,304,813 | 4/1994 | DeMan. | |
| 5,308,992 | 5/1994 | Crane et al. | 250/556 |
| 5,309,515 | 5/1994 | Troung et al. | 382/7 |
| 5,341,408 | 8/1994 | Melcher et al. | 377/8 |
| 5,363,949 | 11/1994 | Matsubayashi | 194/206 |
| 5,367,577 | 11/1994 | Gotaas | 382/135 |
| 5,397,003 | 3/1995 | Stevens et al. | 209/534 |
| 5,430,664 | 7/1995 | Cargill et al. | 364/550 |
| 5,437,357 | 8/1995 | Ota et al. | 382/135 |
| 5,465,821 | 11/1995 | Akioka | 194/207 |
| 5,467,405 | 11/1995 | Raterman et al. | 382/135 |
| 5,467,406 | 11/1995 | Graves et al. | 382/135 |
| 5,478,992 | 12/1995 | Hamada et al. | 235/379 |
| 5,607,040 | 3/1997 | Mathurin, Sr. | 194/207 |
| 5,633,949 | 5/1997 | Graves et al. | 382/135 |
| 5,640,463 | 6/1997 | Csulits | 382/135 |
| 5,652,802 | 7/1997 | Graves et al. | 382/135 |
| 5,687,963 | 11/1997 | Mennie | 271/119 |
| 5,692,067 | 11/1997 | Raterman et al. | 382/135 |
| 5,704,491 | 1/1998 | Graves | 209/534 |
| 5,724,438 | 3/1998 | Graves | 382/135 |
| 5,751,840 | 5/1998 | Raterman et al. | 382/135 |
| 5,790,693 | 8/1998 | Graves et al. | 382/135 |
| 5,790,697 | 8/1998 | Jones et al. | 382/135 |
| 5,806,650 | 9/1998 | Mennie et al. | 194/206 |
| 5,815,592 | 9/1998 | Mennie et al. | 382/135 |
| 5,822,448 | 10/1998 | Graves et al. | 382/135 |
| 5,832,104 | 11/1998 | Graves et al. | 382/135 |
| 5,867,589 | 2/1999 | Graves et al. | 382/135 |
| 5,870,487 | 2/1999 | Graves et al. | 382/135 |
| 5,875,259 | 2/1999 | Mennie et al. | 382/135 |

FOREIGN PATENT DOCUMENTS

| | | |
|---|---|---|
| 2935668 | 5/1980 | (DE). |
| 0077464 | 4/1983 | (EP). |

| | | |
|---|---|---|
| 077464 | 4/1983 | (EP) . |
| 0206675 | 12/1986 | (EP) . |
| 0253935 | 1/1988 | (EP) . |
| 0264125 | 4/1988 | (EP) . |
| 0338123 | 10/1989 | (EP) . |
| 338123 | 10/1989 | (EP) . |
| 0342647 | 11/1989 | (EP) . |
| 342647 | 11/1989 | (EP) . |
| 2038063 | 7/1980 | (GB) . |
| 2061232 | 5/1981 | (GB) . |
| 2119138 | 11/1983 | (GB) . |
| 2190996 | 12/1987 | (GB) . |
| 2217086 | 10/1989 | (GB) . |
| 2270904 | 3/1994 | (GB) . |
| 54-71673 | 6/1979 | (JP) . |
| 54-71674 | 6/1979 | (JP) . |
| 56-16287 | 2/1981 | (JP) . |
| 56-136689 | 10/1981 | (JP) . |
| 59-186079 | 10/1984 | (JP) . |
| 59-231692 | 12/1984 | (JP) . |
| 60-191379 | 9/1985 | (JP) . |
| 61-14557 | 4/1986 | (JP) . |
| 61-41439 | 9/1986 | (JP) . |
| 63-91794 | 4/1988 | (JP) . |
| 63-271687 | 11/1988 | (JP) . |
| 63-276688 | 11/1988 | (JP) . |
| 1-281591 * | 11/1989 | (JP) .................................... 194/207 |
| 2-22786 | 1/1990 | (JP) . |
| 4-307693 * | 10/1992 | (JP) .................................... 194/207 |
| 58-139296 | 8/1993 | (JP) . |
| WO 81/01211 | 4/1981 | (WO) . |
| WO 91/11778 | 8/1991 | (WO) . |
| WO 92/17394 | 10/1992 | (WO) . |
| WO 93/23824 | 11/1993 | (WO) . |
| WO 94/19773 | 9/1994 | (WO) . |
| WO95/24691 | 9/1995 | (WO) . |
| WO 96/10800 | 4/1996 | (WO) . |
| WO 97/01155 | 1/1997 | (WO) . |

OTHER PUBLICATIONS

Translation of Japanese Patent No. 56–16287.
Translation of Japanese Patent No. 63(1988)—271687, published Nov. 9, 1988.
Translation of Billcon Co. Ltd., D–202/D2–04 Mixed Paper Currency Counter; Service Manual (cover marked 630229).
Translation of Billcon Co. Ltd., D–202/D2–04 Mixed Paper Currency Counter; Operation Manual (cover marked 611215).
Banking Machine Digest No. 31 (1989), pp. 151 and 260.
Translation of Banking Machine Digest No. 31 (1989), pp. 151.
Translation of EP 0 077 464 A2.
Translation of EP 0 342 647 A2.
First Translation of JP 61–14557.
Second Translation of 61–14557 (Glory).
Translation of JP 54–71673.
Translation of JP 54–71674.
Translation of JP 61–41439.
First Translation of JP 56–136689.
Second Translation of JP 56–136689 (Glory).
Billcon D–202/204 Service Manual (cover marked 630229) (Japanese).
Translation of Billcon D–202/204 Service Manual—(H13).
Billcon D–202, D204 Operator's Manual (cover marked 611215) (Japanese).
First Translation of Billcon D–202, D204 Operator's Manual (H15).
Second Translation of Billcon D–202, D204 Operator's Manual (H15) (Glory).
Banking Machine Digest No. 31 (last page of H19 translation has a date of Dec. 5, 1988) (Japanese).
First Translation of Banking Machine Digest No. 31 (H18).
Second Translation of Banking Machine Digest No. 31 (H18) (Glory).
Third Translation of Banking Machine Digest No. 31 (H18).
AFB Currency Recognition System (1982).
Brochure by Toyocom, "New Currency Counter with Denomination Recognition, Toyocom NS" (Sep. 26, 1994) (1 page).
Brochure of Mosler Model CS 6600 Optical Currency Counter/Sorter, 4 pages, copyr. 1992.
Chp. 7 of Mosler CF–420 Cash Management System, Operator's Manual, ©1989.
Currency System Intl'l, Mr. W. Kranister in Conversation With Richard Haycock; pp. 1–5; dated: uncertain.
Currency Systems International, Medium Speed Currency Sorting Family, CPS 600 and CPS 900; 4 pages; date: copyr. 1994.
Currency Systems International/Currency Processing Systems, CPS 300; 4 pages; date: uncertain.
Description of Currency Systems International's CPS 600 and CPS 900 devices; date: uncertain.
Description of Toshiba–Mosler CF–420 Device; believed to be about 1989.
Drawings of portions of Mosler CF–420 Cash Management System (FIGs. A–C) and description of the same (1989).
Glory GFB–200/210/220/230, Desk–Top Bank Note Counter; 2 pages; date: uncertain.
Glory GSA–500 Sortmaster brochure; 2 pages; date: believed to be prior to Aug. 9, 1994.
Glory Instruction Manual for GFR–100 Currency Reader Couner (Aug. 15, 1995).
Glory UF–1D brochure; 2 pages; date: unknown.
JetScan Currency Scanner/Counter, Model 4060, Operator's Manual by Cummins–Allison (Aug. 1991).
JetScan Currency Scanner/Counter, Model 4061, Operating Instructions by Cummins–Allison (Apr. 20, 1993).
JetScan Currency Scanner/Counter, Model 4062, Operating Instructions by Cummins–Allison (Nov. 28, 1994).
Mosler Inc. brochure "The Mosler/Toshiba CF–420", 1989.
News Product News by Toyocom, "Toyocom Currency Counter Now Reads Denominations" (Sep. 26, 1994) (1 page).
Revised Drawings of portions of Mosler CF–420 Cash Management System (FIGs. A–C) and description of the same (1989).
Sale of JetScan Currency Scanner/Counter, Model 4060 (Aug. 1991).
Sale of JetScan Currency Scanner/Counter, Model 4061 (Apr. 20, 1993).
Sale of JetScan Currency Scanner/Counter, Model 4062 (Nov. 28, 1994).
Toshiba–Mosler Operator's Manual for CF–420 Cash Settlement System; pps 1 to C–3; copyr. 1989 (See eg. pp. 3–10; 4–10; and 5–7).
Toyocom Currency Counter, Model NS–100, "Operation Guide (Preliminary)" (Jun. 13, 1995).
Abstract of Japanese Patent No. 63–91794.
Abstract of Japanese Patent No. 2–22786.
Japanese Reference X –10 pages.

* cited by examiner

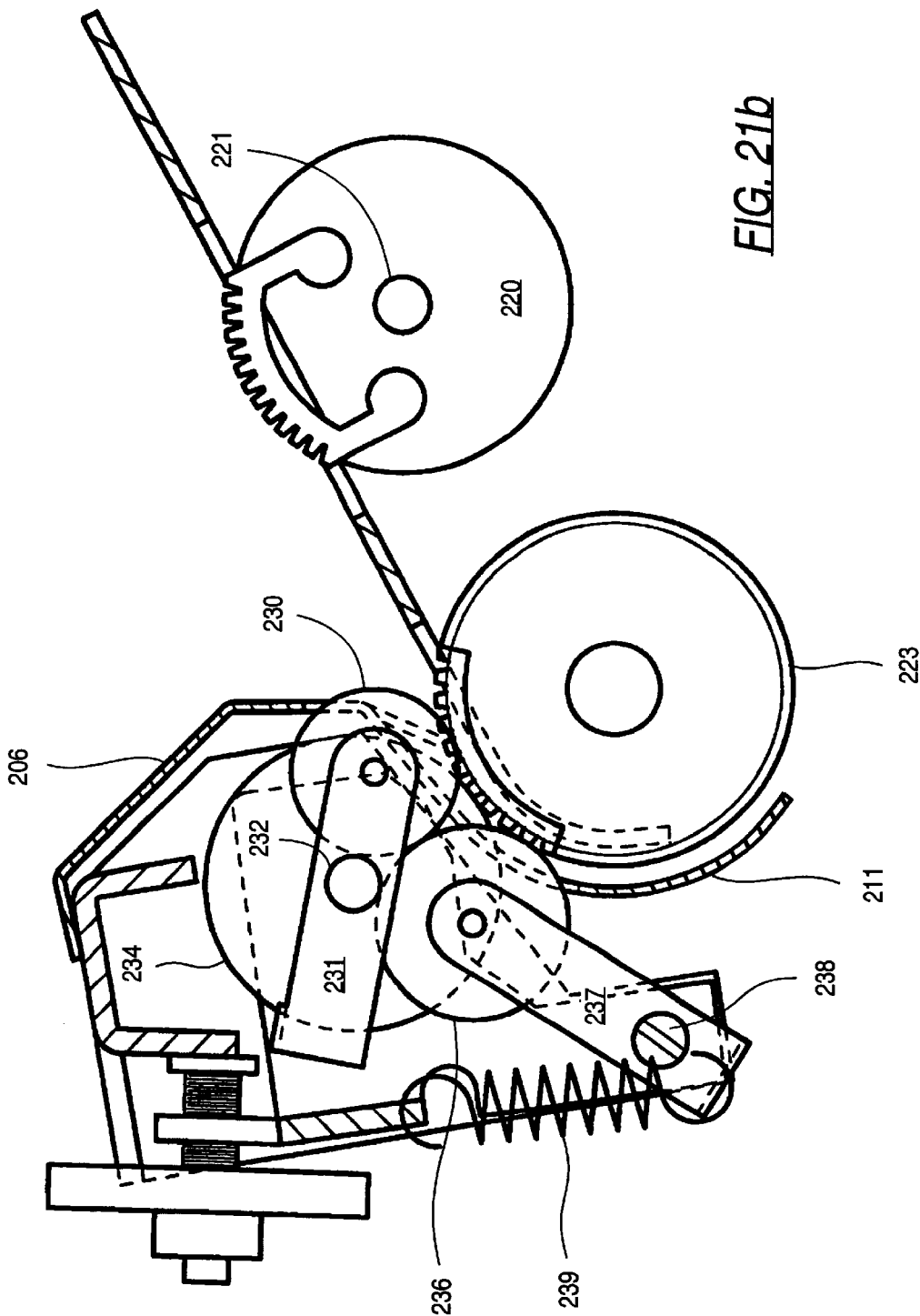

METHOD AND APPARATUS FOR DISCRIMINATING AND COUNTING DOCUMENTS

CROSS-REFERENCE TO RELATED APPLICATIONS

This application is a continuation-in-part of U.S. patent application Ser. No. 08/450,505 filed May 26, 1995, now U.S. Pat. No. 5,687,963 for "Method And Apparatus For Discriminating and Counting Documents"; U.S. patent application Ser. No. 08/340,031 filed Nov. 14, 1994, now U.S. Pat. No. 5,815,592 for "Method And Apparatus For Discriminating and Counting Documents"; U.S. patent application Ser. No. 08/573,392 filed Dec. 15, 1995 now U.S. Pat. No. 5,790,697 for a "Method and Apparatus for Discriminating and Counting Documents", and U.S. patent application Ser. No. 08/287,882 filed Aug. 9, 1994 now U.S. Pat. No. 5,652,802 for a "Method and Apparatus for Document Identification".

U.S. patent application Ser. No. 08/450,505, filed May 20, 1995 now U.S. Pat. No. 5,687,963 is a continuation of U.S. patent application Ser. No. 08/340,031 filed Nov. 14, 1994 now U.S. Pat. No. 5,815,592 which is in turn a continuation-in-part of U.S. patent application Ser. No. 08/243,807 filed May 16, 1994, now U.S. Pat. No. 5,633,949 for "Method And Apparatus For Currency Discrimination" and U.S. patent application Ser. No. 08/207,592 filed Mar. 8, 1994 for "Method and Apparatus for Currency Discrimination", now issued as U.S. Pat. No. 5,467,406.

U.S. patent application Ser. No. 08/573,392 filed Dec. 15, 1995 now U.S. Pat. No. 5,790,697 for a "Method and Apparatus for Discriminating and Counting Documents" is a continuation-in-part of the following U.S. patent applications:

Ser. No. 08/399,854 filed Mar. 7, 1995 now U.S. Pat. No. 5,875,259 for a "Method and Apparatus For Discriminating and Counting Documents"; Ser. No. 08/394,752 filed Feb. 27, 1995 now U.S. Pat. No. 5,724,438 for a "Method of Generating Modified Patterns and Method and Apparatus for Using the Same in a Currency Identification System"; Ser. No. 08/362,848 filed Dec. 22, 1994, now U.S. Pat. No. 5,870,487 for a "Method And Apparatus For Discriminating and Counting Documents"; Ser. No. 08/340,031 filed Nov. 14, 1994, now U.S. Pat. No. 5,815,592 for a "Method And Apparatus For Discriminating and Counting Documents"; Ser. No. 08/317,349 filed Oct. 4, 1994, now U.S. Pat. No. 5,640,463 for a "Method And Apparatus For Authenticating Documents Including Currency"; Ser. No. 08/287,882 filed Aug. 9, 1994 now U.S. Pat. No. 5,652,802 for a "Method and Apparatus for Document Identification"; Ser. No. 08/243,807 filed May 16, 1994, now U.S. Pat. No. 5,633,949 for "Method And Apparatus For Currency Discrimination"; and Ser. No. 08/226,660 filed Apr. 12, 1994, for "Method And Apparatus For Currency Discrimination", pending.

FIELD OF THE INVENTION

The present invention relates, in general, to document discrimination and counting. More specifically, the present invention relates to an apparatus and method for discriminating and counting documents such as currency bills.

BACKGROUND OF THE INVENTION

Currency discrimination systems typically employ either magnetic sensing or optical sensing for discriminating between different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for currency discrimination. The more commonly used optical sensing technique, on the other hand, is based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination.

Machines that are currently available for simultaneous scanning and counting of documents such as paper currency are relatively complex and costly, and relatively large in size. The complexity of such machines can also lead to excessive service and maintenance requirements. Furthermore, these prior machines are large in size. These drawbacks have inhibited more widespread use of such machines, particularly in banks and other financial institutions where space is limited in areas where the machines are most needed, such as teller areas. The above drawbacks are particularly difficult to overcome in machines which offer much-needed features such as the ability to scan bills regardless of their orientation relative to the machine or to each other, and the ability to authenticate genuineness and/or denomination of the bills.

Accordingly, there is a need for a compact currency discriminator that can process a stack of bills at a high rate of speed.

SUMMARY OF THE INVENTION

It is an object of the present invention to provide an improved currency scanning and counting machine which is relatively simple and compact, while at the same time providing a variety of advanced features which make the machine convenient and useful to the operator.

Another object of this invention is to provide such an improved currency scanning and counting machine that is relatively inexpensive to manufacture and maintain, and which also facilitates service and maintenance. In this connection, a related object of the invention is to provide such a machine having a relatively small number of parts, and in which most of the parts are arranged in a manner to have a long operating life with little or no maintenance.

It is a further object of this invention to provide such a machine that is capable of operating at a faster throughput rate than any previous machine able to determine the denomination of the scanned bills.

It is another object of this invention to provide an improved method and apparatus of the above kind which is capable of efficiently discriminating among bills of several currency denominations at a high speed and with a high degree of accuracy.

Other objects and advantages of the invention will become apparent upon reading the following detailed description in conjunction with the accompanying drawings.

In accordance with the one embodiment of the present invention, the foregoing objectives are realized by providing a currency evaluation device for receiving a stack of currency bills and rapidly evaluating all the bills in the stack. This device includes an input receptacle for receiving a stack of bills to be evaluated and a single output receptacle for receiving the bills after they have been evaluated. A transport mechanism transports the bills, one at a time, from the input receptacle to the output receptacle along a transport path. The device further includes a discriminating unit that evaluates the bills. The discriminating unit includes at least two detectors positioned along the transport path between the input receptacle and the output receptacle. The detectors are disposed on opposite sides of the transport path and they receive characteristic information from opposite sides of the bills. The discriminating unit counts and determines the denomination of the bills. The evaluation device also includes means for flagging a bill when the denomination of the bill is not determined by the discriminating unit. Bills whose denominations are not determined are called no call bills. According to one embodiment, the evaluation device flags no call bills by stopping or halting the transport mechanism. For example, the transport mechanism may be stopped so that a no call bill is at an identifiable location, such as being the last bill in the output pocket. Positioning a detector on each side of the transport path contributes to an evaluation device that can efficiently handled and process bills fed in any orientation. Utilizing a single output receptacle contributes to making the evaluation device compact and less complicated.

According to another embodiment, the evaluation device includes means for flagging a bill meeting or failing to meet a certain criteria. For example, the evaluation device may perform one or more authenticating tests on the bills being processed. If a bill fails an authentication test, that bill may be flagged as a suspect bill. According to one embodiment, the evaluation device flags bills meeting or failing to meet certain criteria, such as being suspect bills, by stopping or halting the transport mechanism. For example, the transport mechanism may be stopped so that the flagged bill is at an identifiable location, such as being the last bill in the output pocket.

BRIEF DESCRIPTION OF THE DRAWINGS

FIG. 21b is a cross-sectional view of the bill transport mechanism depicted in FIG. 21a along line 21b;

DETAILED DESCRIPTION OF THE EMBODIMENTS

Figure 1:
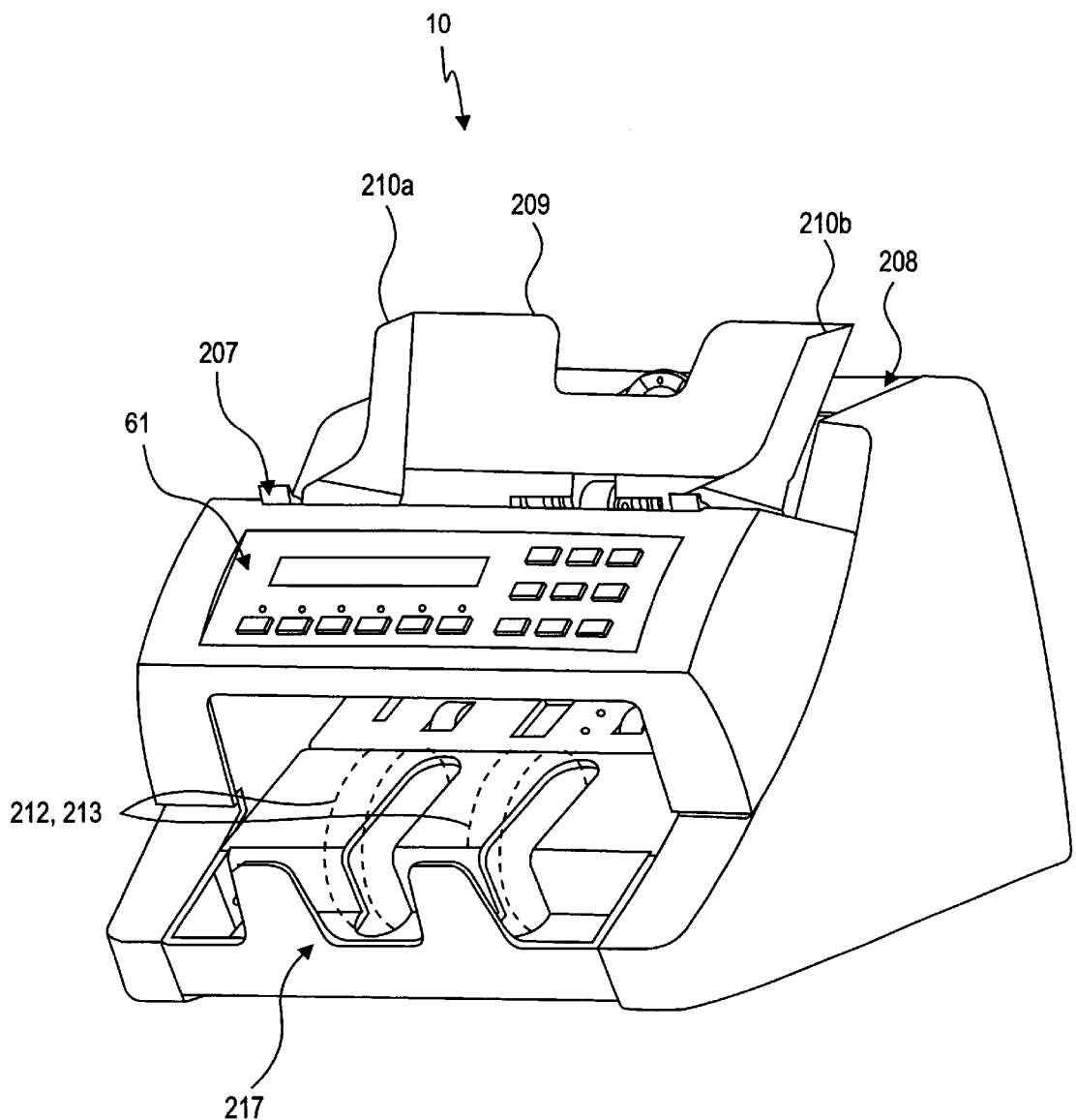
FIG. 1 is a perspective view of a currency scanning and counting machine embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

Figure 2:
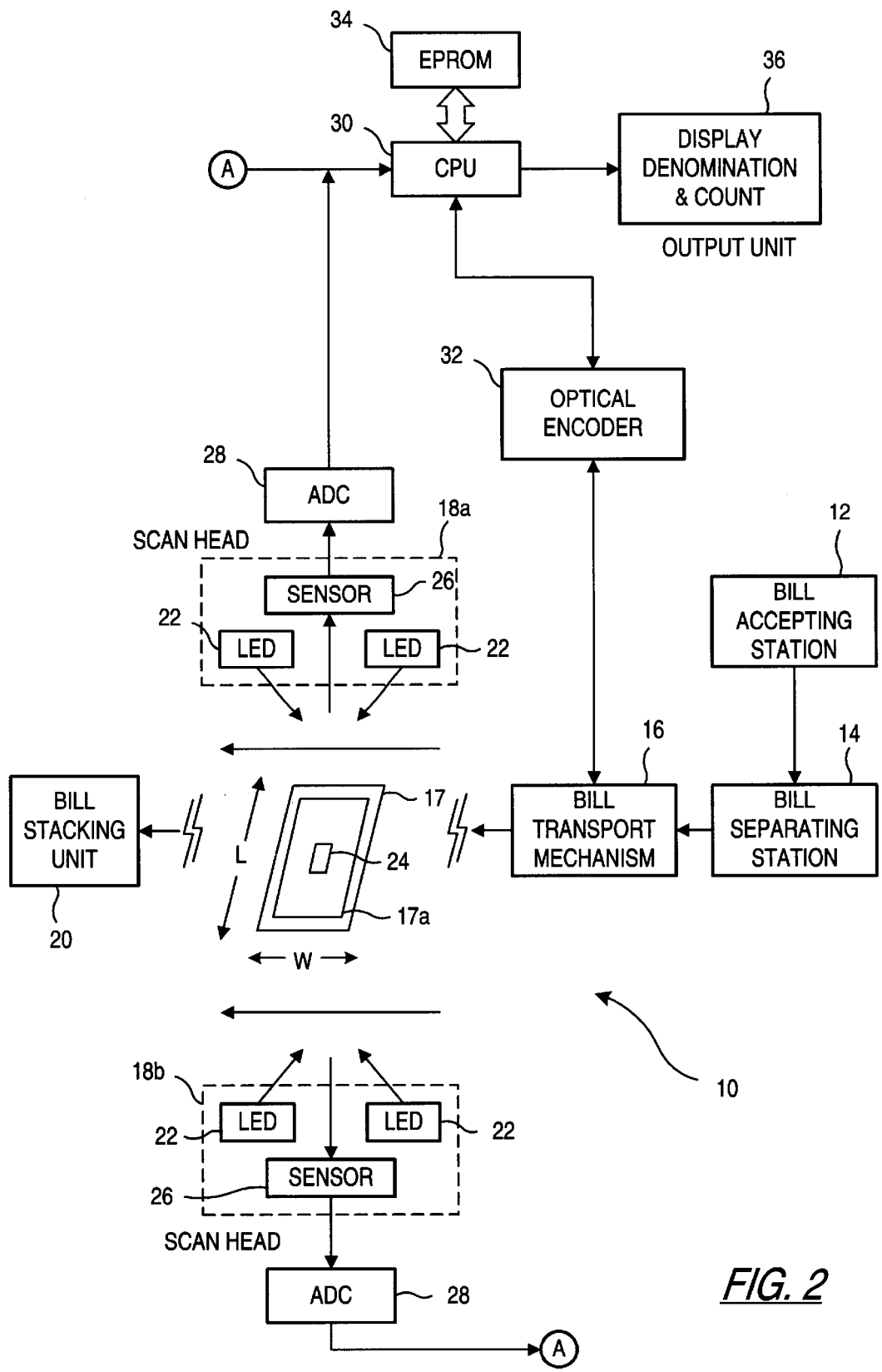
FIG. 2 is a functional block diagram of the currency scanning and counting machine of FIG. 1.

Referring now to FIGS. 1 and 2, there is shown one embodiment of a currency scanning and counting machine 10 according to the present invention. The machine 10 includes an input receptacle or bill accepting station 12 where stacks of currency bills that need to be identified and counted are positioned. Bills in the input receptacle are acted upon by a bill separating station 14 which functions to pick out or separate one bill at a time for being sequentially relayed by a bill transport mechanism 16 (FIG. 2), according to a precisely predetermined transport path, between a pair of scanheads 18a, 18b where the currency denomination of the bill is scanned and identified. In the embodiment depicted, each scanhead 18a, 18b is an optical scanhead that scans for characteristic information from a scanned bill 17 which is used to identify the denomination of the bill. The scanned bill 17 is then transported to an output receptacle or bill stacking station 20 where bills so processed are stacked for subsequent removal.

Each optical scanhead 18a, 18b comprises a pair of light sources 22 directing light onto the bill transport path so as to illuminate a substantially rectangular light strip 24 upon a currency bill 17 positioned on the transport path adjacent the scanhead 18. Light reflected off the illuminated strip 24 is sensed by a photodetector 26 positioned between the two light sources. The analog output of the photodetector 26 is converted into a digital signal by means of an analog-to-digital (ADC) convertor unit 28 whose output is fed as a digital input to a central processing unit (CPU) 30.

The bill transport path is defined in such a way that the transport mechanism 16 moves currency bills with the narrow dimension of the bills being parallel to the transport path and the scan direction. As a bill 17 traverses the scanheads 18a, 18b, the coherent light strip 24 effectively scans the bill across the narrow dimension of the bill. In the embodiment depicted, the transport path is so arranged that a currency bill 17 is scanned across a central section of the bill along its narrow dimension, as shown in FIG. 2. Each scanhead functions to detect light reflected from the bill as it moves across the illuminated light strip 24 and to provide an analog representation of the variation in reflected light, which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a normalizing routine for processing the sampled data for improved correlation and for smoothing out variations due to "contrast" fluctuations in the printed pattern existing on the bill surface. The normalized reflectance data represents a characteristic pattern that is unique for a given bill denomination and provides sufficient distinguishing features among characteristic patterns for different currency denominations. This process is more fully explained in U.S. patent application Ser. No. 07/885,648, filed on May 19, 1992, now issued as U.S. Pat. No. 5,295, 196 for a "Method and Apparatus for Currency Discrimination and Counting," which is incorporated herein by reference in its entirety.

In order to ensure strict correspondence between reflectance samples obtained by narrow dimension scanning of successive bills, the reflectance sampling process is, according to one embodiment, controlled through the CPU 30 by means of an optical encoder 32 which is linked to the bill transport mechanism 16 and precisely tracks the physical movement of the bill 17 between the scanheads 18a, 18b. More specifically, the optical encoder 32 is linked to the rotary motion of the drive motor which generates the movement imparted to the bill along the transport path. In addition, the mechanics of the feed mechanism ensure that positive contact is maintained between the bill and the transport path, particularly when the bill is being scanned by the scanheads. Under these conditions, the optical encoder 32 is capable of precisely tracking the movement of the bill 17 relative to the light strips 24 generated by the scanheads 18a, 18b by monitoring the rotary motion of the drive motor.

The outputs of the photodetectors 26 are monitored by the CPU 30 to initially detect the presence of the bill adjacent the scanheads and, subsequently, to detect the starting point of the printed pattern on the bill, as represented by the thin borderline 17a which typically encloses the printed indicia on currency bills. Once the borderline 17a has been detected, the optical encoder 32 is used to control the timing and number of reflectance samples that are obtained from the outputs of the photodetectors 26 as the bill 17 moves across the scanheads.

The use of the optical encoder 32 for controlling the sampling process relative to the physical movement of a bill 17 across the scanheads 18a, 18b is also advantageous in that the encoder 32 can be used to provide a predetermined delay following detection of the borderline 17a prior to initiation of samples. The encoder delay can be adjusted in such a way that the bill 17 is scanned only across those segments which contain the most distinguishable printed indicia relative to the different currency denominations.

In the case of U.S. currency, for instance, it has been determined that the central, approximately two-inch (approximately 5 cm) portion of currency bills, as scanned across the central section of the narrow dimension of the bill, provides sufficient data for distinguishing among the various U.S. currency denominations. Accordingly, the optical encoder can be used to control the scanning process so that reflectance samples are taken for a set period of time and only after a certain period of time has elapsed after the borderline 17a is detected, thereby restricting the scanning to the desired central portion of the narrow dimension of the bill.

Figure 3:
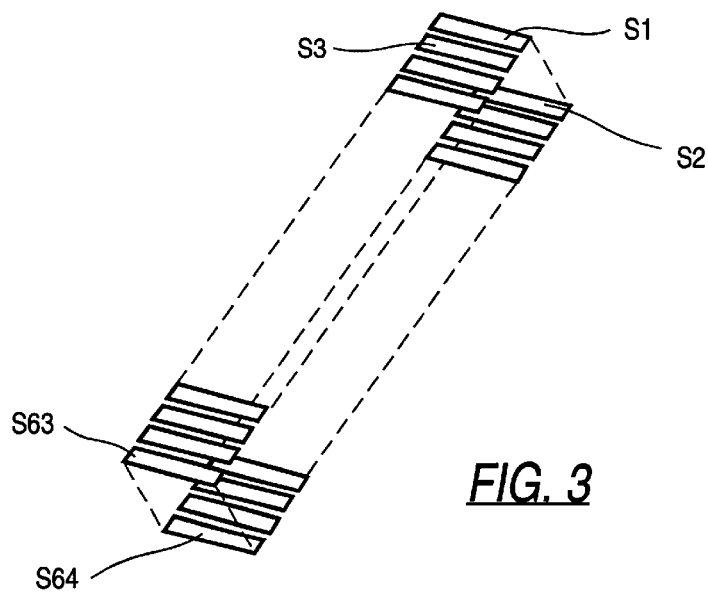
FIG. 3 is a diagrammatic perspective illustration of the successive areas scanned during the traversing movement of a single bill across an optical sensor according to one embodiment of the present invention.
Figure 4:
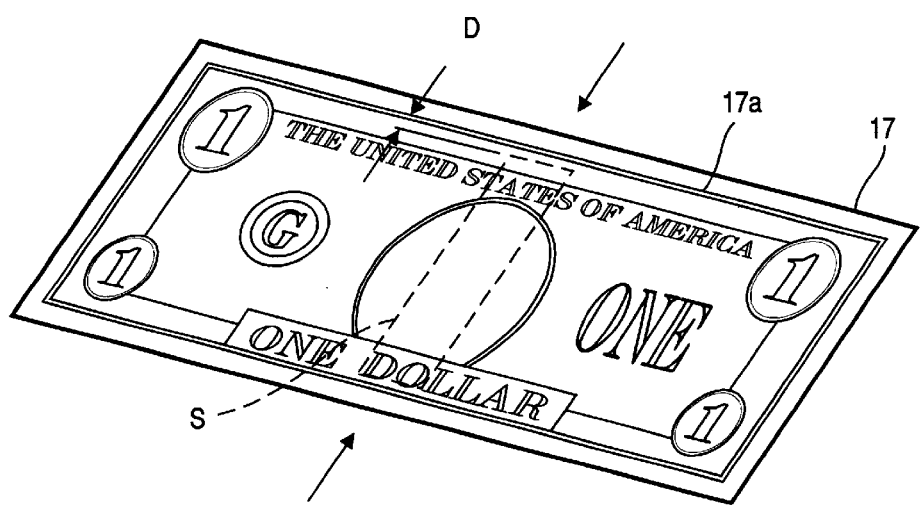
FIG. 4 is a perspective view of a bill and an area to be optically scanned on the bill.
Figure 5:
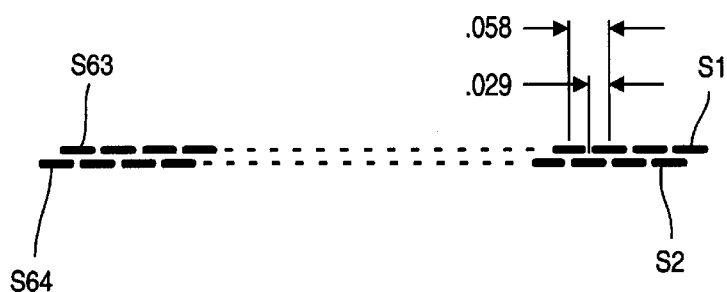
FIG. 5 is a diagrammatic side elevation view of the scan area to be optically scanned on a bill according to one embodiment of the present invention.

FIGS. 3–5 illustrate the scanning process in more detail. Referring to FIG. 4, as a bill 17 is advanced in a direction parallel to the narrow edges of the bill, scanning via a slit in the ahead 18a or 18b is effected along a segment S of the central portion of the bill 17. This segment S begins a fixed distance D inboard of the borderline 17a. As the bill 17 traverses the scanhead, a strip s of the segment S is always illuminated, and the photodetector 26 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

As illustrated in FIGS. 3 and 5, the sampling intervals are selected so that the strips s that are illuminated for successive samples overlap one another. The odd-numbered and even-numbered sample strips have been separated in FIGS. 3 and 5 to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch (0.127 cm) wide at 0.029 inch (0.074 cm) intervals, along a segment S that is 1.83 inch (4.65 cm) long (64 samples).

The optical sensing and correlation technique is based upon using the above process to generate a series of stored intensity signal patterns using genuine bills for each denomination of currency that is to be detected. According to one embodiment, two or four sets of master intensity signal samples are generated and stored within the system memory, such as an EPROM 34 (see FIG. 2), for each detectable currency denomination. In the case of U.S. currency, the sets of master intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of foreign bills. Additionally, the optical scanning may be performed on both sides of a bill. In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $10 bill in U.S. currency, two patterns for each of the "forward" and "reverse" directions may be stored, each pair of patterns for the same direction represent two scan areas that are slightly displaced from each other along the long dimension of the bill. Accordingly, a set of 16 different master characteristic patterns are stored within the EPROM for subsequent correlation purposes (four master patterns for the $10 bill and two master patterns for each of the other denominations). Once the master patterns have been stored, the pattern generated by scanning a bill under test is compared by the CPU 30 with each of the 16 master patterns of stored intensity signal samples to generate, for each comparison, a correlation number representing the extent of correlation, i.e., similarity between corresponding ones of the plurality of data samples, for the sets of data being compared.

The CPU 30 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. If a "positive" call can not be made for a scanned bill, an error signal is generated.

Figure 6:
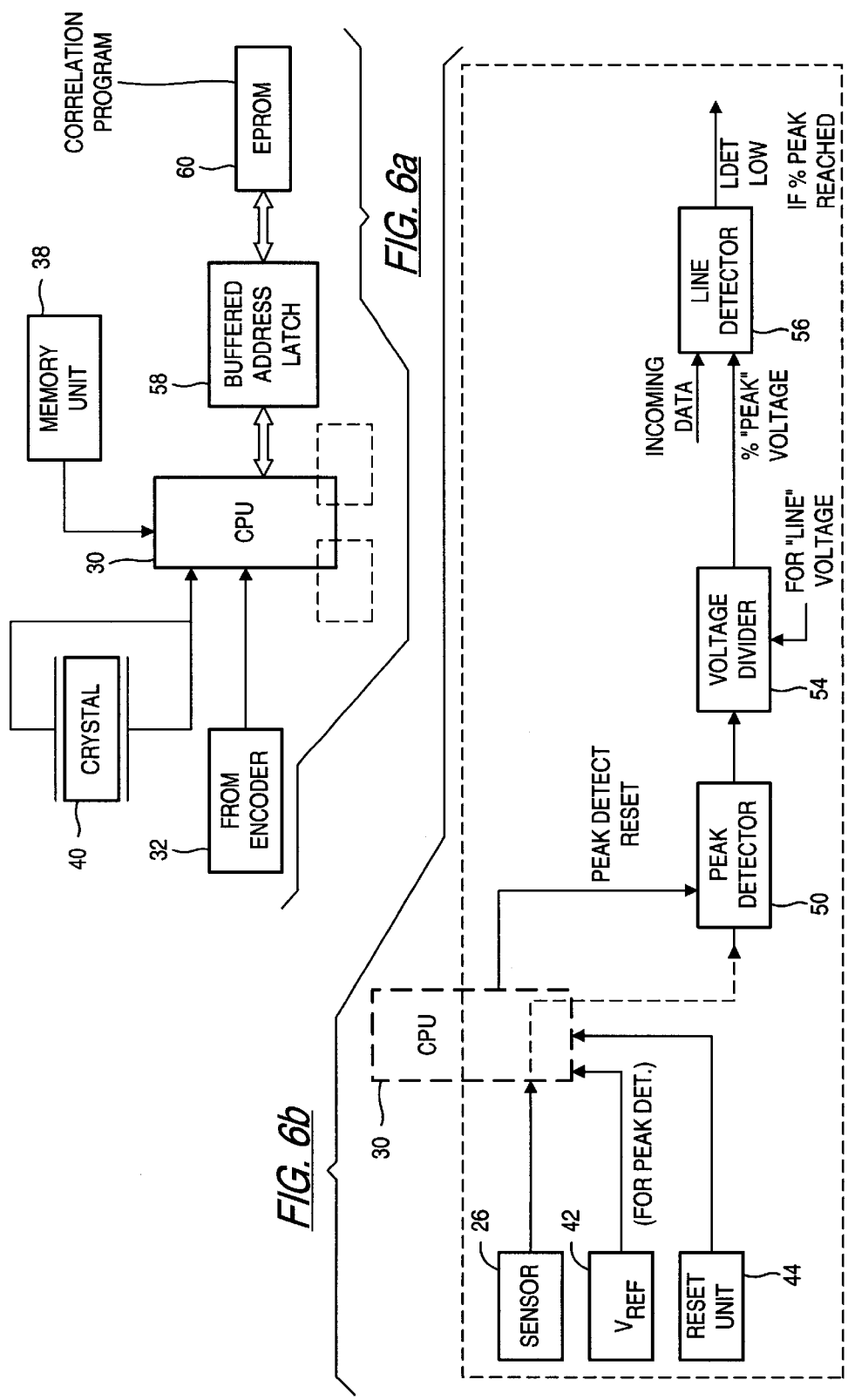
FIGS. 6a and 6b form a block diagram illustrating a circuit arrangement for processing and correlating reflectance data according to the optical sensing and counting technique of this invention.

Referring now to FIGS. 6a and 6b, there is shown a representation, in block diagram form, of a circuit arrangement for processing and correlating reflectance data according to the system of this invention. The CPU 30 accepts and processes a variety of input signals including those from the optical encoder 32, the sensor 26 and the erasable programmable read only memory (EPROM) 60. The EPROM 60 has stored within it the correlation program on the basis of which patterns are generated and test patterns compared with stored master programs in order to identify the denomination of test currency. A crystal 40 serves as the time base for the CPU 30, which is also provided with an external reference voltage $V_{REF}$ 42 on the basis of which peak detection of sensed reflectance data is performed.

The CPU 30 processes the output of the sensor 26 through a peak detector 50 which essentially functions to sample the sensor output voltage and hold the highest, i.e., peak, voltage value encountered after the detector has been enabled. For U.S. currency, the peak detector is also adapted to define a scaled voltage on the basis of which the printed borderline on the currency bills is detected. The output of the peak detector 50 is fed to a voltage divider 54 which lowers the peak voltage down to a scaled voltage $V_S$ representing a predefined percentage of this peak value. The voltage $V_S$ is based upon the percentage drop in output voltage of the peak detector as it reflects the transition from the "high" reflectance value resulting from the scanning of the unprinted edge portions of a currency bill to the relatively lower "gray" reflectance value resulting when the thin borderline is encountered. According to one embodiment, the scaled voltage $V_S$ is set to be about 70–80 percent of the peak voltage.

The scaled voltage $V_S$ is supplied to a line detector 56 which is also provided with the incoming instantaneous output of the sensor 26. The line detector 56 compares the two voltages at its input side and generates a signal $L_{DET}$ which normally stays "low" and goes "high" when the edge of the bill is scanned. The signal $L_{DET}$ goes "low" when the incoming sensor output reaches the pre-defined percentage of the peak output up to that point, as represented by the voltage $V_S$. Thus, when the signal $L_{DET}$ goes "low", it is an indication that the borderline of the bill pattern has been detected. At this point, the CPU 30 initiates the actual reflectance sampling under control of the encoder 32 and the desired fixed number of reflectance samples are obtained as the currency bill moves across the illuminated light strip and is scanned along the central section of its narrow dimension.

When master characteristic patterns are being generated, the reflectance samples resulting from the scanning of one or more genuine bills for each denomination are loaded into corresponding designated sections within a system memory 60, which is, for example, an EPROM. During currency discrimination, the reflectance values resulting from the scanning of a test bill are sequentially compared, under control of the correlation program stored within the EPROM 60, with the corresponding master characteristic patterns stored within the EPROM 60. A pattern averaging procedure for scanning bills and generating characteristic patterns is described in co-pending U.S. patent application Ser. No. 08/243,807, filed on May 16, 1994 and entitled "Method and Apparatus for Currency Discrimination," which is incorporated herein by reference.

In addition to the optical scanheads, the bill-scanning system may also include a magnetic scanhead. A variety of currency characteristics can be measured using magnetic scanning. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

According to one embodiment, the denomination determined by optical scanning of a bill is used to facilitate authentication of the bill by magnetic scanning, using the relationship set forth in Table 1.

TABLE 1

| Sensitivity Denomination | 1 | 2 | 3 | 4 | 5 |
|---|---|---|---|---|---|
| $1 | 200 | 250 | 300 | 375 | 450 |
| $2 | 100 | 125 | 150 | 225 | 300 |
| $5 | 200 | 250 | 300 | 350 | 400 |
| $10 | 100 | 125 | 150 | 200 | 250 |
| $20 | 120 | 150 | 180 | 270 | 360 |
| $50 | 200 | 250 | 300 | 375 | 450 |
| $100 | 100 | 125 | 150 | 250 | 350 |

Table 1 depicts relative total magnetic content thresholds for various denominations of genuine bills. Columns 1–5 represent varying degrees of sensitivity selectable by a user of a device employing the present invention. The values in Table 1 are set based on the scanning of genuine bills of varying denominations for total magnetic content and setting required thresholds based on the degree of sensitivity selected. The information in Table 1 is based on the total magnetic content of a genuine $1 being 1000. The following discussion is based on a sensitivity setting of 4. In this example it is assumed that magnetic content represents the second characteristic tested. If the comparison of first characteristic information, such as reflected light intensity, from a scanned billed and stored information corresponding to genuine bills results in an indication that the scanned bill is a $10 denomination, then the total magnetic content of the scanned bill is compared to the total magnetic content threshold of a genuine $10 bill, i.e., 200. If the magnetic content of the scanned bill is less than 200, the bill is rejected. Otherwise it is accepted as a $10 bill.

In order to avoid problems associated with re-feeding bills, counting bills by hand, and adding together separate totals, according to one embodiment of the present invention a number of selection elements associated with individual denominations are provided. In FIG. 1, these selection elements are in the form of keys or buttons of a keypad. Other types of selection elements such as switches or displayed keys in a touch-screen environment may be employed. Before describing the operation of the selection elements in detail, their operation will be briefly described. When an operator determines that a suspect or no call bill is acceptable, the operator may simply depress the selection element associated with the denomination of the suspect or no call bill and the corresponding denomination counter and/or the total value counter are appropriately incremented and the discriminator resumes operating again. In non-automatic restart discriminators, where an operator has removed a genuine suspect or no call bill from the output receptacle for closer examination, the bill is first replaced into the output receptacle before a corresponding selection element is chosen. When an operator determines that a suspect or no call bill is not acceptable, the operator may remove the unacceptable bill from the output receptacle without replacement and depress a continuation key on the keypad. When the continuation key is selected the denomination counters and the total value counter are not affected and the discriminator will resume operating again. An advantage of the above described procedure is that appropriate counters are incremented and the discriminator is restarted with the touch of a single key, greatly simplifying the operation of the discriminator while reducing the opportunities for human error.

Figure 7:
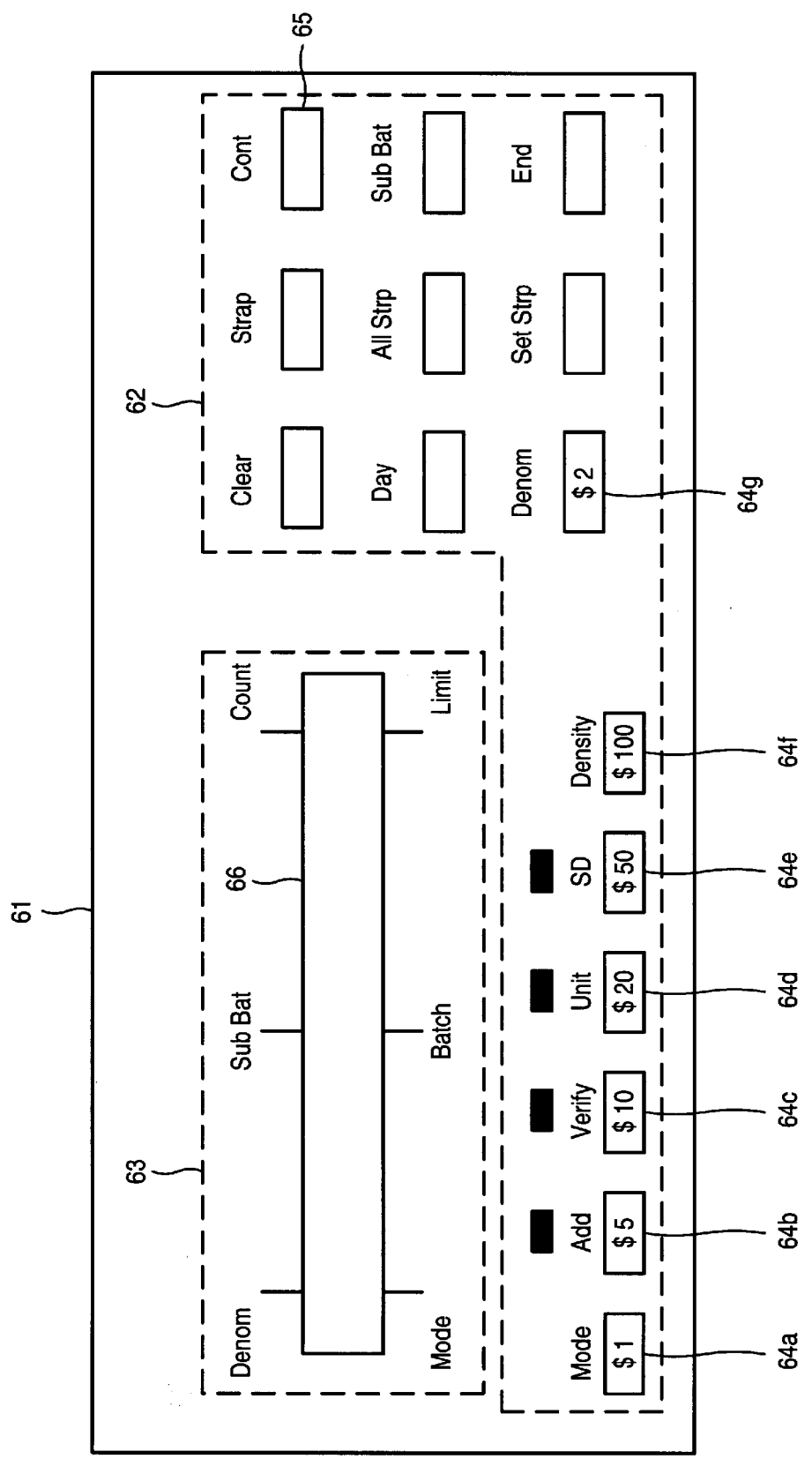
FIG. 7 is an enlarged plan view of the control and display panel in the machine of FIG. 1.

The operation of the selection elements will now be described in more detail in conjunction with FIG. 7 which is a front view of a control panel 61 of one embodiment of the present invention. The control panel 61 comprises a keypad 62 and a display section 63. The keypad 62 comprises a plurality of keys including seven denomination selection elements 64a–64g, each associated with one of seven U.S. currency denominations, i.e., $1, $2, $5, $10, $20, $50, and $100. The $1 denomination selection key 64a also serves as a mode selection key. The keypad 62 also comprises a "Continuation" selection element 65. Various information such as instructions, mode selection information, authentication and discrimination information, individual denomination counter values, and total batch counter value are communicated to the operator via an LCD 66 in the display section 63. The operation of a discriminator having the denomination selection elements 64a–64g and the continuation element 65 will now be discussed in connection with several operating modes, including a mixed mode, a stranger mode, a sort mode, a face mode, and a forward/reverse orientation mode.

(A) Mixed Mode

Mixed mode is designed to accept a stack of bills of mixed denomination, total the aggregate value of all the bills in the stack and display the aggregate value in the display 63. Information regarding the number of bills of each individual denomination in a stack may also be stored in denomination counters. When an otherwise acceptable bill remains unidentified after passing through the authenticating and discriminating unit, operation of the discriminator may be resumed and the corresponding denomination counter and/ or the aggregate value counter may be appropriately incremented by selecting the denomination selection key 64a–64g associated with the denomination of the unidentified bill. For example, if the discriminator stops operation with an otherwise acceptable $5 bill being the last bill deposited in the output receptacle, the operator may simply select key 64b. When key 64b is depressed, the operation of the discriminator is resumed and the $5 denomination counter is incremented and/or the aggregate value counter is incremented by $5. Otherwise, if the operator determines the no call or suspect bill is unacceptable, the bill may be removed from the output receptacle. The continuation key 65 is depressed after the unacceptable bill is removed, and the discriminator resumes operation without affecting the total value counter and/or the individual denomination counters.

(B) Stranger Mode

Stranger mode is designed to accommodate a stack of bills all having the same denomination, such as a stack of $10 bills. In such a mode, when a stack of bills is processed by the discriminator the denomination of the first bill in the stack is determined and subsequent bills are flagged if they are not of the same denomination. Alternatively, the discriminator may be designed to permit the operator to designate the denomination against which bills will be evaluated with those of a different denomination being flagged. Assuming the first bill in a stack determines the relevant denomination and assuming the first bill is a $10 bill, then provided all the bills in the stack are $10 bills, the display 63 will indicate the aggregate value of the bills in the stack and/or the number of $10 bills in the stack. However, if a bill having a denomination other than $10 is included in the stack, the discriminator will stop operating with the non-$10 bill or "stranger bill" being the last bill deposited in the output receptacle. The stranger bill may then be removed from the output receptacle and the discriminator is started again by depression of the "Continuation" key 65. An unidentified but otherwise acceptable $10 bill may be handled in a manner similar to that described above in connection with the mixed mode, e.g., by depressing the $10 denomination selection element 64c, or alternatively, the unidentified but otherwise acceptable $10 bill may be removed from the output receptacle and placed into the input hopper to be re-scanned. Upon the completion of processing the entire stack, the display 63 will indicate the aggregate value of the $10 bills in the stack and/or the number of $10 bills in the stack. All bills having a denomination other than $10 will have been set aside and will not be included in the totals. Alternatively, these stranger bills can be included in the totals via operator selection choices. For example, if a $5 stranger bill is detected and flagged in a stack of $10 bills, the operator may be prompted via the display as to whether the $5 bill should be incorporated into the running totals. If the operator responds positively, the $5 bill is incorporated into appropriate running totals, otherwise it is not. Alternatively, a set-up selection may be chosen whereby all stranger bills are automatically incorporated into appropriate running totals.

(C) Sort Mode

Sort mode is designed to accommodate a stack of bills wherein the bills are separated by denomination. For example, all the $1 bills may be placed at the beginning of the stack, followed by all the $5 bills, followed by all the $10 bills, etc. The operation of the sort mode is similar to that of the stranger mode except that after stopping upon the detection of a different denomination bill, the discriminator is designed to resume operation upon removal of all bills from the output receptacle. Returning to the above example, assuming the first bill in a stack determines the relevant denomination and assuming the first bill is a $1 bill, then the discriminator processes the bills in the stack until the first non-$1 bill is detected, which in this example is the first $5 bill. At that point, the discriminator will stop operating with the first $5 being the last bill deposited in the output receptacle. The display 63 may be designed to indicate the aggregate value of the preceding $1 bills processed and/or the number of preceding $1 bills. The scanned $1 bills and the first $5 bill are removed from the output receptacle and placed in separate $1 and $5 bill stacks. The discriminator will start again automatically and subsequent bills will be assessed relative to being $5 bills. The discriminator continues processing bills until the first $10 bill is encountered. The above procedure is repeated and the discriminator resumes operation until encountering the first bill which is not a $10 bill, and so on. Upon the completion of processing the entire stack, the display 63 will indicate the aggregate value of all the bills in the stack and/or the number of bills of each denomination in the stack. This mode permits the operator to separate a stack of bills having multiple denominations into separate stacks according to denomination.

(D) Face Mode

Face mode is designed to accommodate a stack of bills all faced in the same direction, e.g., all placed in the input hopper face up (that is the portrait or black side up for U.S. bills) and to detect any bills facing the opposite direction. In such a mode, when a stack of bills is processed by the discriminator, the face orientation of the first bill in the stack is determined and subsequent bills are flagged if they do not have the same face orientation. Alternatively, the discriminator may be designed to permit designation of the face orientation to which bills will be evaluated with those having a different face orientation being flagged. Assuming the first bill in a stack determines the relevant face orientation and assuming the first bill is face up, then provided all the bills in the stack are face up, the display 63 will indicate the aggregate value of the bills in the stack and/or the number of bills of each denomination in the stack. However, if a bill faced in the opposite direction (i.e., face down in this example) is included in the stack, the discriminator will stop operating with the reverse-faced bill being the last bill deposited in the output receptacle. The reverse-faced bill then may be removed from the output receptacle. The reverse-faced bill may be either placed into the input receptacle with the proper face orientation and the continuation key 65 depressed, or placed back into the output receptacle with the proper face orientation. Depending on the set up of the discriminator when a bill is placed back into the output receptacle with the proper face orientation, the denomination selection key associated with the reverse-faced bill may be selected, whereby the associated denomination counter and/or aggregate value counter are appropriately incremented and the discriminator resumes operation. Alternatively, in embodiments wherein the discriminator is capable of determining denomination regardless of face orientation, the continuation key 65 or a third key may be depressed whereby the discriminator resumes operation and the appropriate denomination counter and/or total value counter is incremented in accordance with the denomination identified by the discriminating unit. The ability to detect and correct for reverse-faced bills is important as the Federal Reserve requires currency it receives to be faced in the same direction.

(E) Forward/Reverse Orientation Mode

Forward/Reverse Orientation mode ("Orientation" mode) is designed to accommodate a stack of bills all oriented in a predetermined forward or reverse orientation direction. The forward direction may be defined as the fed direction whereby the top edge of a bill is fed first and conversely for the reverse direction. In such a mode, when a stack of bills is processed by the discriminator, the forward/reverse orientation of the first bill in the stack is determined and subsequent bills are flagged if they do not have the same forward/reverse orientation. Alternatively, the discriminator may be designed to permit the operator to designate the forward/reverse orientation against which bills will be evaluated with those having a different forward/reverse orientation being flagged. Assuming the first bill in a stack determines the relevant forward/reverse orientation and assuming the first bill is fed in the forward direction, then provided all the bills in the stack are also fed in the forward direction, the display 63 will indicate the aggregate value of the bills in the stack and/or the number of bills of each denomination in the stack. However, if a bill having the opposite forward/reverse direction is included in the stack, the discriminator will stop operating with the opposite forward/reverse oriented bill being the last bill deposited in the output receptacle. The opposite forward/reverse oriented bill then may be removed from the output receptacle. The opposite forward/reverse oriented bill then may be either placed into the input receptacle with the proper forward/reverse orientation and the continuation key 65 depressed, or placed back into the output receptacle with the proper forward/reverse orientation. Depending on the set up of the discriminator when a bill is placed back into the output receptacle with the proper forward/reverse orientation, the denomination selection key associated with the opposite forward/reverse oriented bill may be selected, whereby the associated denomination counter and/or aggregate value counter are appropriately incremented and the discriminator resumes operation. Alternatively, in embodiments wherein the discriminator is capable of determining denomination regardless of forward/reverse orientation, the continuation key 65 or a the third key may be depressed whereby the discriminator resumes operation and the appropriate denomination counter and/or total value counter is incremented in accordance with the denomination identified by the discriminating unit. The ability to detect and correct for reverse-oriented bills is important as the Federal Reserve may soon require currency it receives to be oriented in the same forward/reverse direction.

Suspect Mode

In addition to the above modes, a suspect mode may be activated in connection with these modes whereby one or more authentication tests may be performed on the bills in a stack. When a bill fails an authentication test, the discriminator will stop with the failing or suspect bill being the last bill transported to the output receptacle. The suspect bill then may be removed from the output receptacle and set aside.

Likewise, one or more of the above described modes may be activated at the same time. For example, the face mode and the forward/reverse orientation mode may be activated at the same time. In such a case, bills that are either reverse-faced or opposite forward/reverse oriented will be flagged.

Figure 8:
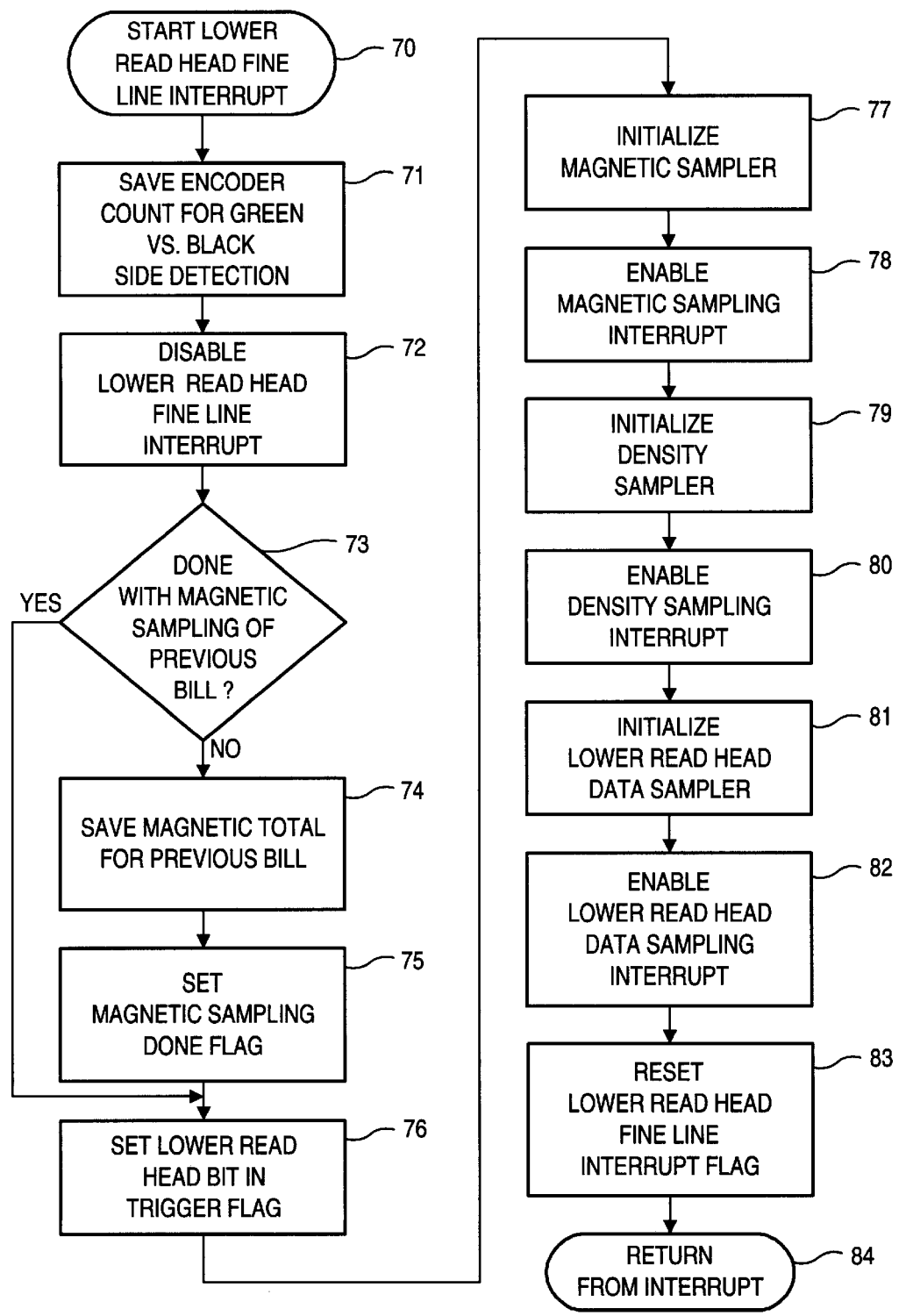
FIG. 8 is a flow chart illustrating the sequential procedure involved in detecting the presence of a bill adjacent the lower scanhead and the borderline on the side of the bill adjacent to the lower scanhead.
Figure 9:
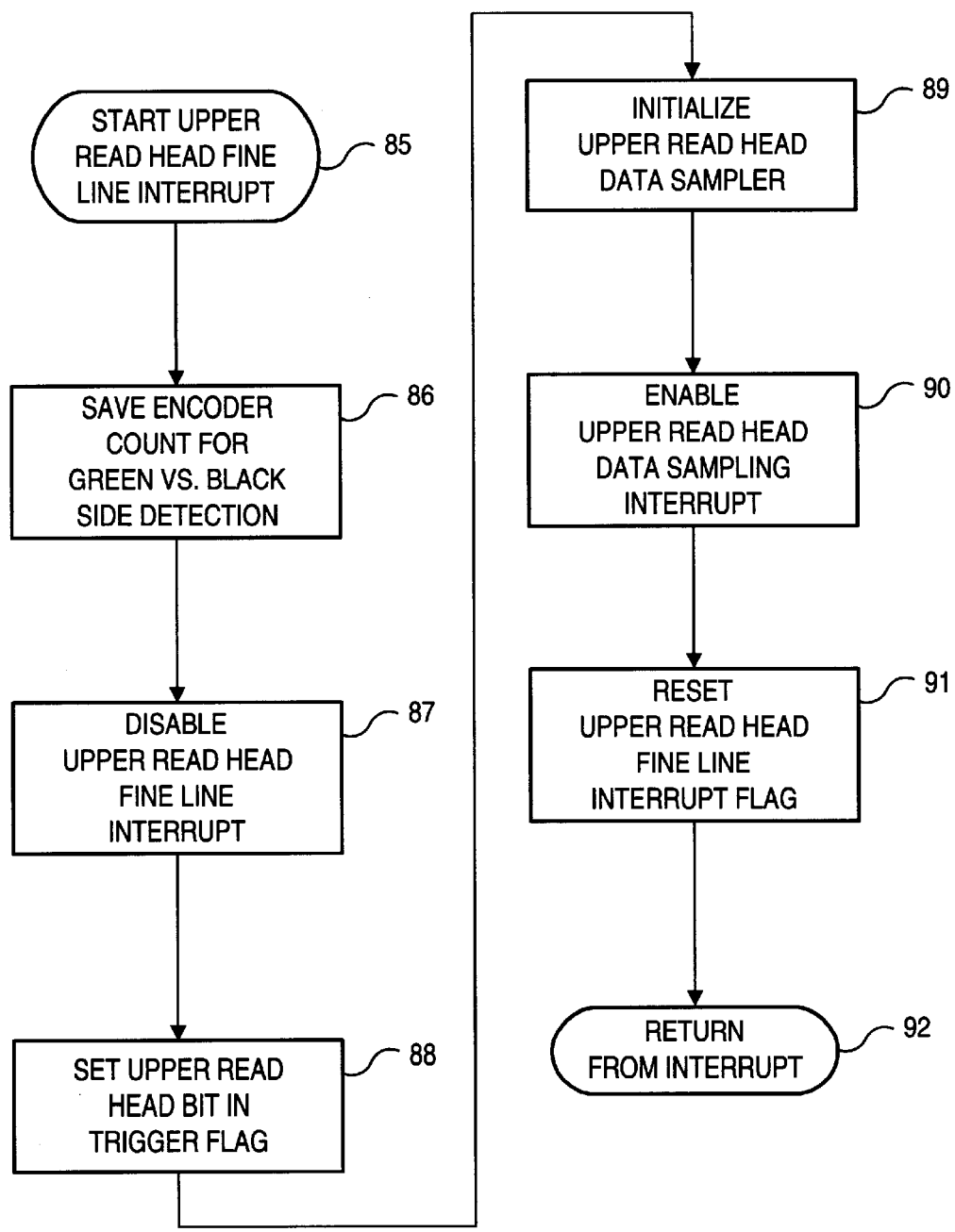
FIG. 9 is a flow chart illustrating the sequential procedure involved in detecting the presence of a bill adjacent the upper scanhead and the borderline on the side of the bill adjacent to the upper scanhead.

Referring now to FIGS. 8–11, there are shown flow charts illustrating the sequence of operations involved in implementing the above-described optical sensing and correlation technique. FIGS. 8 and 9, in particular, illustrate the sequences involved in detecting the presence of a bill adjacent the scanheads and the borderlines on each side of the bill. Turning to FIG. 8, at step 70, the lower scanhead fine line interrupt is initiated upon the detection of the fine line by the lower scanhead. An encoder counter is maintained that is incremented for each encoder pulse. The encoder counter scrolls from 0–65,535 and then starts at 0 again. At step 71 the value of the encoder counter is stored in memory upon the detection of the fine line by the lower scanhead. At step 72 the lower scanhead fine line interrupt is disabled so that it will not be triggered again during the interrupt period. At step 73, it is determined whether the magnetic sampling has been completed for the previous bill. If it has not, the magnetic total for the previous bill is stored in memory at step 74 and the magnetic sampling done flag is set at step 75 so that magnetic sampling of the present bill may thereafter be performed. Steps 74 and 75 are skipped if it is determined at step 73 that the magnetic sampling has been completed for the previous bill. At step 76, a lower scanhead bit in the trigger flag is set. This bit is used to indicate that the lower scanhead has detected the fine line. The magnetic sampler is initialized at step 77 and the magnetic sampling interrupt is enabled at step 78. A density sampler is initialized at step 79 and a density sampling interrupt is enabled at step 80. The lower read data sampler is initialized at step 81 and a lower scanhead data sampling interrupt is enabled at step 82. At step 83, the lower scanhead fine line interrupt flag is reset and at step 84 the program returns from the interrupt.

Turning to FIG. 9, at step 85, the upper scanhead fine line interrupt is initiated upon the detection of the fine line by the upper scanhead. At step 86 the value of the encoder counter is stored in memory upon the detection of the fine line by the upper scanhead. This information in connection with the encoder counter value associated with the detection of the fine line by the lower scanhead may then be used to determine the face orientation of a bill, that is whether a bill is fed green side up or green side down in the case of U.S. bills as is described in more detail below in connection with FIG. 12. At step 87 the upper scanhead fine line interrupt is disabled so that it will not be triggered again during the interrupt period. At step 88, the upper scanhead bit in the trigger flag is set. This bit is used to indicate that the upper scanhead has detected the fine line. By checking the lower and upper scanhead bits in the trigger flag it can be determined whether each side has detected a respective fine line. Next, the upper scanhead data sampler is initialized at step 89 and the upper scanhead data sampling interrupt is enabled at step 90. At step 91, the upper scanhead fine line interrupt flag is reset and at step 92 the program returns from the interrupt.

Figure 10:
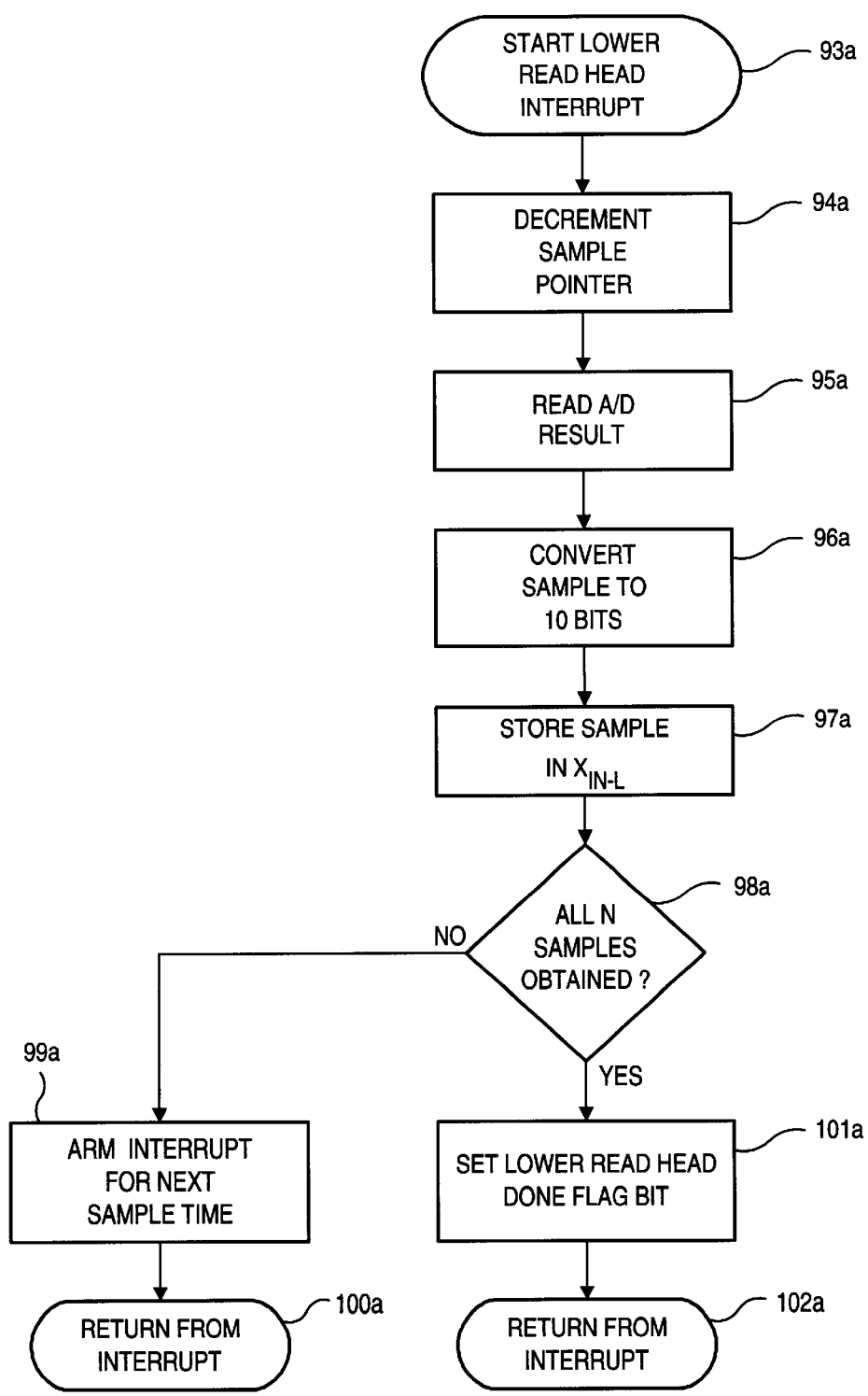
FIG. 10 is a flow chart illustrating the sequential procedure involved in the analog-to-digital conversion routine associated with the lower scanhead.
Figure 11:
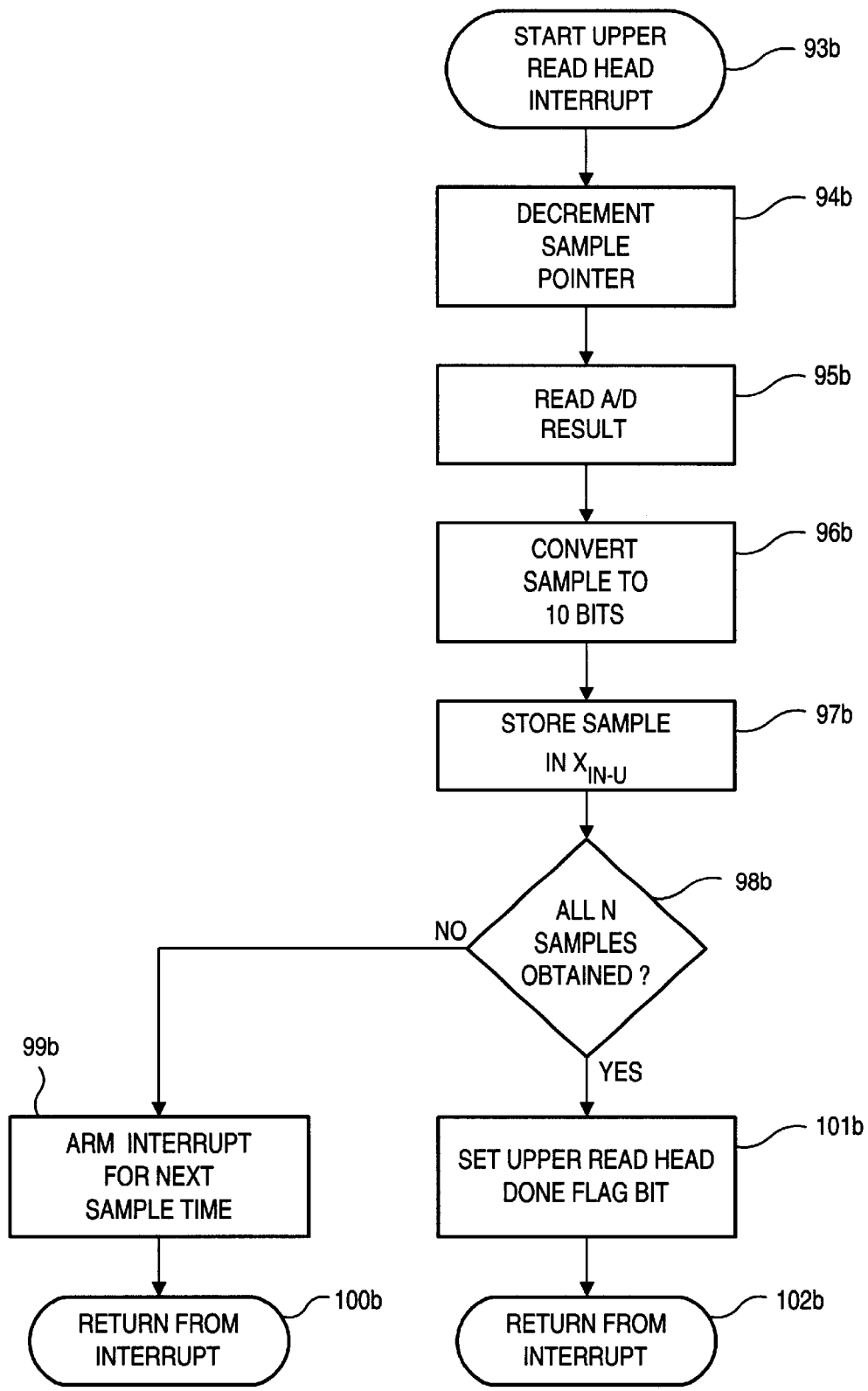
FIG. 11 is a flow chart illustrating the sequential procedure involved in the analog-to-digital conversion routine associated with the upper scanhead.

Referring now to FIGS. 10 and 11 there are shown, respectively, the digitizing routines associated with the lower and upper scanheads. FIG. 10 is a flow chart illustrating the sequential procedure involved in the analog-to-digital conversion routine associated with the lower scanhead. The routine is started at step 93a. Next, the sample pointer is decremented at step 94a so as to maintain an indication of the number of samples remaining to be obtained. The sample pointer provides an indication of the sample being obtained and digitized at a given time. At step 95a, the digital data corresponding to the output of the photodetector associated with the lower scanhead for the current sample is read. The data is converted to its final form at step 96a and stored within a predefined memory segment as $X_{IN-L}$ at step 97a.

Next, at step 98a, a check is made to see if the desired fixed number of samples "N" has been taken. If the answer is found to be negative, step 99a is accessed where the interrupt authorizing the digitization of the succeeding sample is enabled and the program returns from interrupt at step 100a for completing the rest of the digitizing process. However, if the answer at step 98a is found to be positive, i.e., the desired number of samples have already been obtained, a flag, namely the lower scanhead done flag bit, indicating the same is set at step 101a and the program returns from interrupt at step 102a.

FIG. 11 is a flow chart illustrating the sequential procedure involved in the analog-to-digital conversion routine associated with the upper scanhead. The routine is started at step 93b. Next, the sample pointer is decremented at step 94b so as to maintain an indication of the number of samples remaining to be obtained. The sample pointer provides an indication of the sample being obtained and digitized at a given time. At step 95b, the digital data corresponding to the output of the photodetector associated with the upper scanhead for the current sample is read. The data is converted to its final form at step 96b and stored within a pre-defined memory segment as $X_{IN-U}$ at step 97b.

Next, at step 98b, a check is made to see if the desired fixed number of samples "N" has been taken. If the answer is found to be negative, step 99b is accessed where the interrupt authorizing the digitization of the succeeding sample is enabled and the program returns from interrupt at step 100b for completing the rest of the digitizing process. However, if the answer at step 98b is found to be positive, i.e., the desired number of samples have already been obtained, a flag, namely the upper scanhead done flag bit, indicating the same is set at step 101b and the program returns from interrupt at step 102b.

Figure 12:
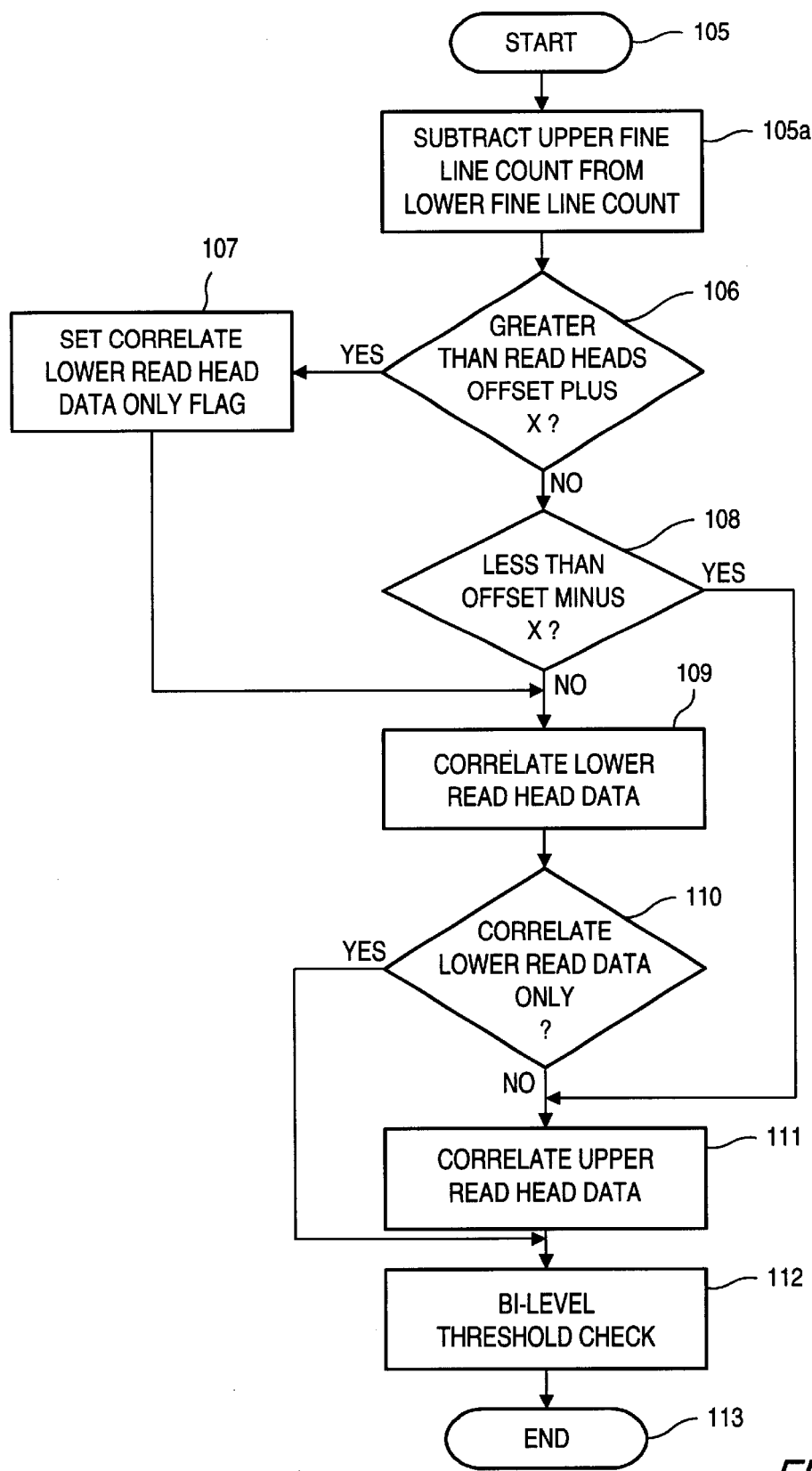
FIG. 12 is a flow chart illustrating the sequential procedure involved in determining which scanhead is scanning the green side of a U.S. currency bill.

The CPU 30 is programmed with the sequence of operations in FIG. 12 to correlate only the test pattern corresponding to the green surface of a scanned bill. The upper scanhead 18a is located slightly upstream adjacent the bill transport path relative to the lower scanhead 18b. The distance between the scanheads 18a, 18b in a direction parallel to the transport path corresponds to a predetermined number of encoder counts. It should be understood that the encoder 32 produces a repetitive tracking signal synchronized with incremental movements of the bill transport mechanism, and this repetitive tracking signal has a repetitive sequence of counts (e.g., 65,535 counts) associated therewith. As a bill is scanned by the upper and lower scanheads 18a, 18b, the CPU 30 monitors the output of the upper scanhead 18a to detect the borderline of a first bill surface facing the upper scanhead 18a. Once this borderline of the first surface is detected, the CPU 30 retrieves and stores a first encoder count in memory. Similarly, the CPU 30 monitors the output of the lower scanhead 18b to detect the borderline of a second bill surface facing the lower scanhead 18b. Once the borderline of the second surface is detected, the CPU 30 retrieves and stores a second encoder count in memory.

Referring to FIG. 12, the CPU 30 is programmed to calculate the difference between the first and second encoder counts (step 105a). If this difference is greater than the predetermined number of encoder counts corresponding to the distance between the scanheads 18a, 18b plus some safety factor number "X", e.g., 20 (step 106), the bill is oriented with its black surface facing the upper scanhead 18a and its green surface facing the lower scanhead 18b. Once the borderline $B_1$ of the black surface passes beneath the upper scanhead 18a and the first encoder count is stored, the borderline $B_2$ still must travel for a distance greater than the distance between the upper and lower scanheads 18a, 18b in order to pass over the lower scanhead 18b. As a result, the difference between the second encoder count associated with the borderline $B_2$ and the first encoder count associated with the borderline $B_1$ will be greater than the predetermined number of encoder counts corresponding to the distance between the scanheads 18a, 18b. With the bill oriented with its green surface facing the lower scanhead, the CPU 30 sets a flag to indicate that the test pattern produced by the lower scanhead 18b should be correlated (step 107). Next, this test pattern is correlated with the master characteristic patterns stored in memory (step 109).

If at step 106 the difference between the first and second encoder counts is less than the predetermined number of encoder counts corresponding to the distance between the scanheads 18a, 18b, the CPU 30 is programmed to determine whether the difference between the first and second encoder counts is less than the predetermined number minus some safety number "X", e.g., 20 (step 108). If the answer is negative, the orientation of the bill relative to the scanheads 18a, 18b is uncertain so the CPU 30 is programmed to correlate the test patterns produced by both the upper and lower scanheads 18a, 18b with the master characteristic patterns stored in memory (steps 109, 110, and 111).

If the answer is affirmative, the bill is oriented with its green surface facing the upper scanhead 18a and its black surface facing the lower scanhead 18b. In this situation, once the borderline $B_2$ of the green surface passes beneath the upper scanhead 18a and the first encoder count is stored, the borderline $B_1$ must travel for a distance less than the distance between the upper and lower scanheads 18a, 18b in order to pass over the lower scanhead 18b. As a result, the difference between the second encoder count associated with the borderline B₁ and the first encoder count associated with the borderline B₂ should be less than the predetermined number of encoder counts corresponding to the distance between the scanheads 18a, 18b. To be on the safe side, it is required that the difference between first and second encoder counts be less than the predetermined number minus the safety number "X". Therefore, the CPU 30 is programmed to correlate the test pattern produced by the upper scanhead 18a (step 111).

After correlating the test pattern associated with either the upper scanhead 18a, the lower scanhead 18b, or both scanheads 18a, 18b, the CPU 30 is programmed to perform the bi-level threshold check (step 112).

A simple correlation procedure is utilized for processing digitized reflectance values into a form which is conveniently and accurately compared to corresponding values pre-stored in an identical format. More specifically, as a first step, the mean value $\overline{X}$ for the set of digitized reflectance samples (comparing "n" samples) obtained $$\overline{X} = \sum_{i=0}^{n} \frac{X_i}{n} \qquad 1$$

for a bill scan run is first obtained as below:

Subsequently, a normalizing factor Sigma ("σ") is determined as being equivalent to the sum of the square of the difference between each sample and the mean, as normalized by the total number n of samples. More specifically, the normalizing factor is calculated as below:

$$\sigma = \sum_{i=0}^{n} \frac{|X_i - \overline{X}|^2}{n} \qquad 2$$

In the final step, each reflectance sample is normalized by obtaining the difference between the sample and the above-calculated mean value and dividing it by the square root of the normalizing factor σ as defined by the following equation:

$$X_n = \frac{X_i - \overline{X}}{(\sigma)^{0/00}} \qquad 3$$

The result of using the above correlation equations is that, subsequent to the normalizing process, a relationship of correlation exists between a test pattern and a master pattern such that the aggregate sum of the products of corresponding samples in a test pattern and any master pattern, when divided by the total number of samples, equals unity if the patterns are identical. Otherwise, a value less than unity is obtained. Accordingly, the correlation number or factor resulting from the comparison of normalized samples within a test pattern to those of a stored master pattern provides a clear indication of the degree of similarity or correlation between the two patterns.

According to one embodiment of this invention, the fixed number of reflectance samples which are digitized and normalized for a bill scan is selected to be 64. It has experimentally been found that the use of higher binary orders of samples (such as 128, 256, etc.) does not provide a correspondingly increased discrimination efficiency relative to the increased processing time involved in implementing the above-described correlation procedure. It has also been found that the use of a binary order of samples lower than 64, such as 32, produces a substantial drop in discrimination efficiency.

The correlation factor can be represented conveniently in binary terms for ease of correlation. In one embodiment, for instance, the factor of unity which results when a hundred percent correlation exists is represented in terms of the binary number $2^{10}$, which is equal to a decimal value of 1024. Using the above procedure, the normalized samples within a test pattern are compared to the master characteristic patterns stored within the system memory in order to determine the particular stored pattern to which the test pattern corresponds most closely by identifying the comparison which yields a correlation number closest to 1024.

A bi-level threshold of correlation is required to be satisfied before a particular call is made, for at least certain denominations of bills. More specifically, the correlation procedure is adapted to identify the two highest correlation numbers resulting from the comparison of the test pattern to one of the stored patterns. At that point, a minimum threshold of correlation is required to be satisfied by these two correlation numbers. It has experimentally been found that a correlation number of about 850 serves as a good cut-off threshold above which positive calls may be made with a high degree of confidence and below which the designation of a test pattern as corresponding to any of the stored patterns is uncertain. As a second thresholding level, a minimum separation is prescribed between the two highest correlation numbers before making a call. This ensures that a positive call is made only when a test pattern does not correspond, within a given range of correlation, to more than one stored master pattern. According to one embodiment, the minimum separation between correlation numbers is set to be 150 when the highest correlation number is between 800 and 850. When the highest correlation number is below 800, no call is made.

Figure 13:
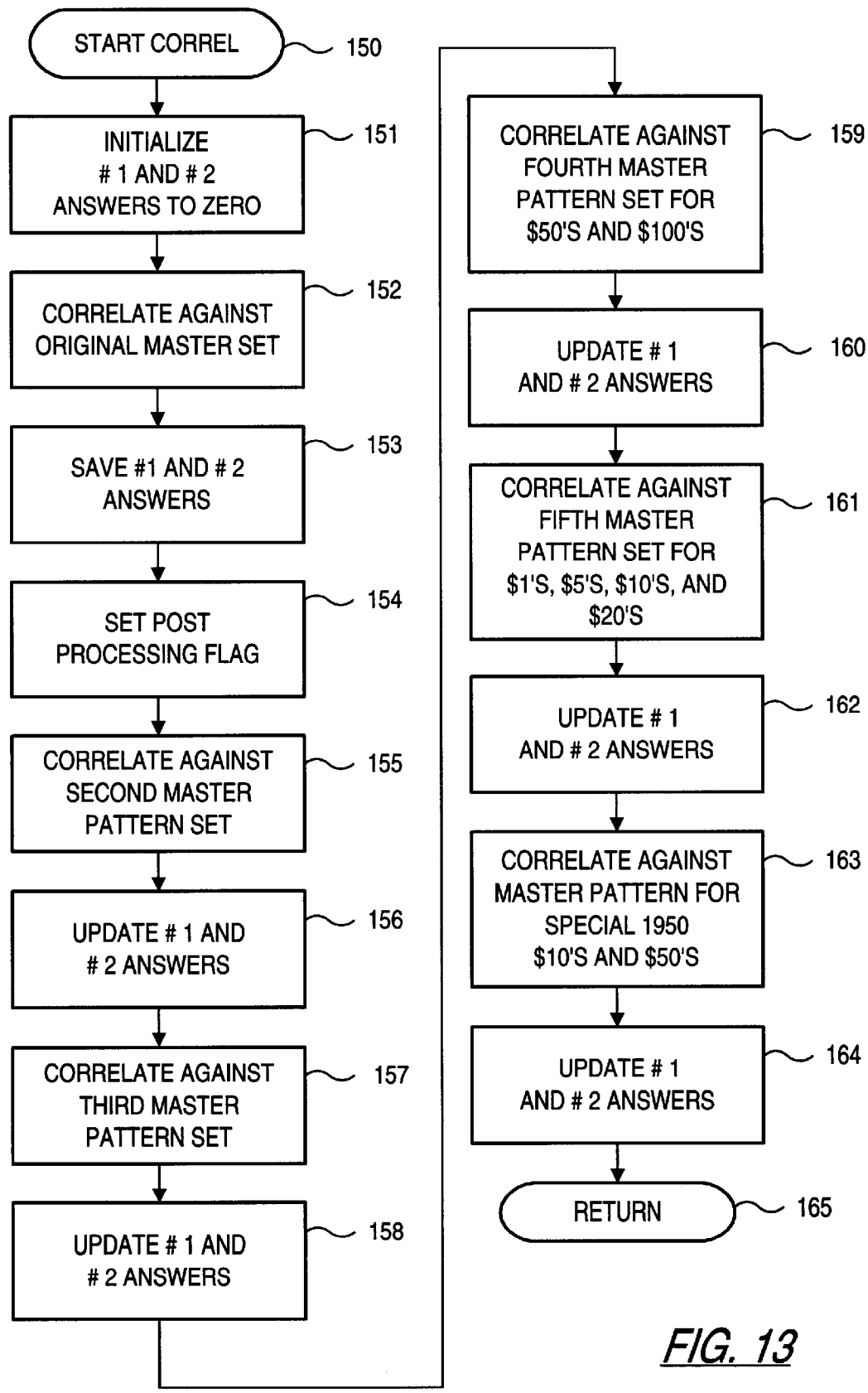
FIG. 13 is a flow chart illustrating the sequential procedure involved in the execution of multiple correlations of the scan data from a single bill.

The procedure involved in comparing test patterns to master patterns is illustrated at FIG. 13 which shows the routine as starting at step 150. At step 151, the best and second best correlation results (referred to in FIG. 13 as the "#1 and #2 answers") are initialized to zero and, at step 152, the test pattern is compared with each of the sixteen original master patterns stored in the memory. At step 153, the calls corresponding to the two highest correlation numbers obtained up to that point are determined and saved. At step 154, a post-processing flag is set. At step 155 the test pattern is compared with each of a second set of 16 master patterns stored in the memory. This second set of master patterns is the same as the 16 original master patterns except that the last sample is dropped and a zero is inserted in front of the first sample. If any of the resulting correlation numbers is higher than the two highest numbers previously saved, the #1 and #2 answers are updated at step 156.

Steps 155 and 156 are repeated at steps 157 and 158, using a third set of master patterns formed by dropping the last two samples from each of the 16 original master patterns and inserting two zeros in front of the first sample. At steps 159 and 160 the same steps are repeated again, but using only $50 and $100 master patterns formed by dropping the last three samples from the original master patterns and adding three zeros in front of the first sample. Steps 161 and 162 repeat the procedure once again, using only $1, $5, $10 and $20 master patterns formed by dropping the 33rd sample whereby original samples 34–64 become samples 33–63 and inserting a 0 as the new last sample. Finally, steps 163 and 164 repeat the same procedure, using master patterns for $10 and $50 bills printed in 1950, which differ significantly from bills of the same denominations printed in later years. This routine then returns to the main program at step 165. The above multiple sets of master patterns may be pre-stored in EPROM 60.

Figure 14:
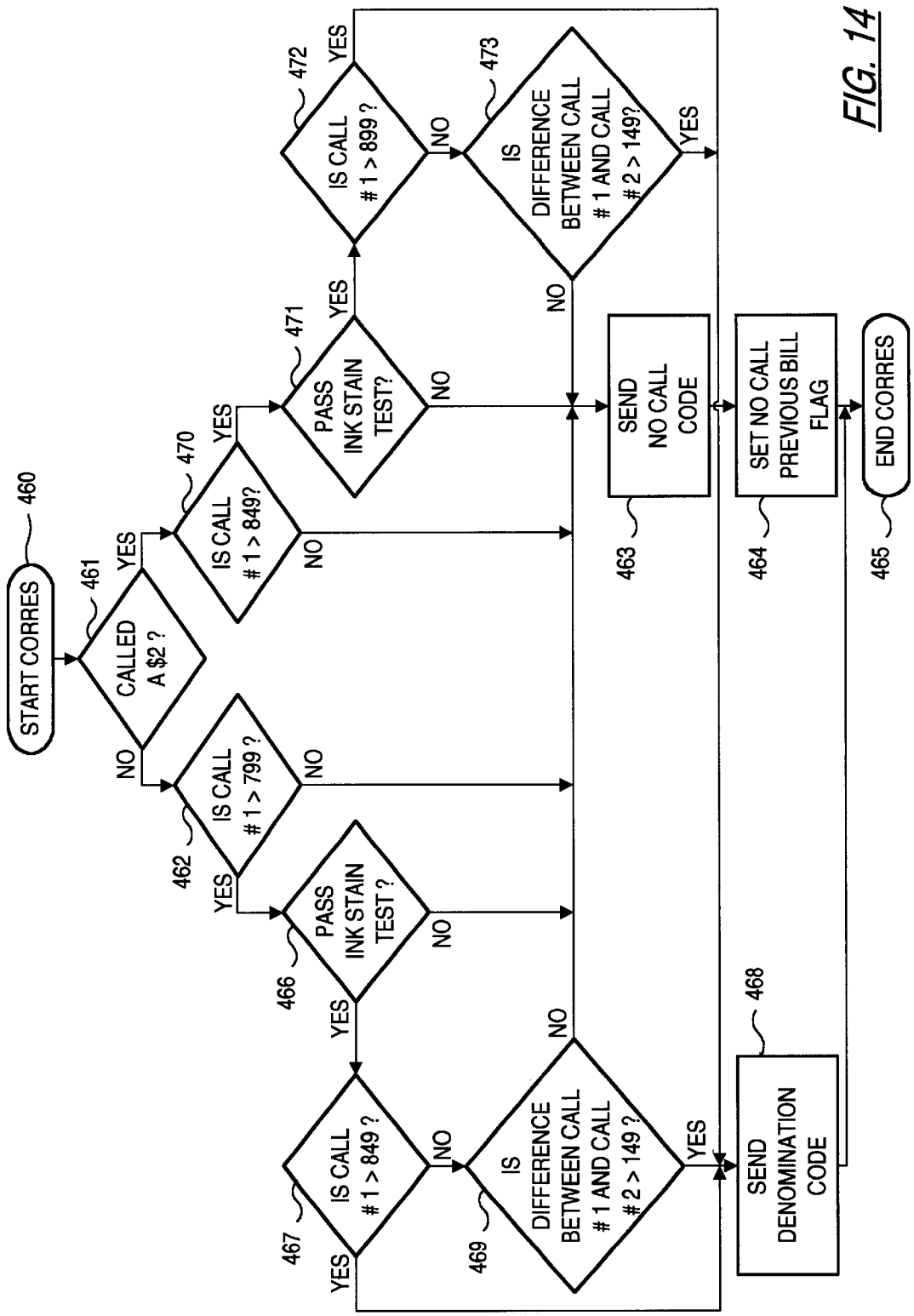
FIG. 14 is a flow chart illustrating the sequence of operations involved in determining the bill denomination from the correlation results.

Next a routine designated as "CORRES" is initiated. The procedure involved in executing the routine CORRES is illustrated at FIG. 14 which shows the routine as starting at step 460. Step 461 determines whether the bill has been identified as a $2 bill, and, if the answer is negative, step 462 determines whether the best correlation number ("call #1") is greater than 799. If the answer is negative, the correlation number is too low to identify the denomination of the bill with certainty, and thus step 463 generates a "no call" code. A "no call previous bill" flag is then set at step 464, and the routine returns to the main program at step 465.

An affirmative answer at step 462 advances the system to step 466, which determines whether the sample data passes an ink stain test (described below). If the answer is negative, a "no call" code is generated at step 463. If the answer is affirmative, the system advances to step 467 which determines whether the best correlation number is greater than 849. An affirmative answer at step 467 indicates that the correlation number is sufficiently high that the denomination of the scanned bill can be identified with certainty without any further checking. Consequently, a "denomination" code identifying the denomination represented by the stored pattern resulting in the highest correlation number is generated at step 468, and the system returns to the main program at step 465.

A negative answer at step 467 indicates that the correlation number is between 800 and 850. It has been found that correlation numbers within this range are sufficient to identify all bills except the $2 bill. Accordingly, a negative response at step 467 advances the system to step 469 which determines whether the difference between the two highest correlation numbers ("call #1" and "call #2") is greater than 149. If the answer is affirmative, the denomination identified by the highest correlation number is acceptable, and thus the "denomination" code is generated at step 468. If the difference between the two highest correlation numbers is less than 150, step 469 produces a negative response which advances the system to step 463 to generate a "no call" code.

Returning to step 461, an affirmative response at this step indicates that the initial call is a $2 bill. This affirmative response initiates a series of steps 470–473 which are identical to steps 462, 466, 467 and 469 described above, except that the numbers 799 and 849 used in steps 462 and 467 are changed to 849 and 899, respectively, in steps 470 and 472. The result is either the generation of a "no call" code at step 463 or the generation of a $2 "denomination" code at step 468.

One problem encountered in currency recognition and counting systems is the difficulty involved in interrupting (for a variety of reasons) and resuming the scanning and counting procedure as a stack of bills is being scanned. If a particular currency recognition unit (CRU) has to be halted in operation due to a "major" system error, such as a bill being jammed along the transport path, there is generally no concern about the outstanding transitional status of the overall recognition and counting process. However, where the CRU has to be halted due to a "minor" error, such as the identification of a scanned bill as being a counterfeit (based on a variety of monitored parameters) or a "no call" (a bill which is not identifiable as belonging to a specific currency denomination based on the plurality of stored master patterns and/or other criteria), it is desirable that the transitional status of the overall recognition and counting process be retained so that the CRU may be restarted without any effective disruptions of the recognition/counting process.

More specifically, once a scanned bill has been identified as a "no call" bill ($B_1$) based on some set of predefined criteria, it is desirable that this bill $B_1$ be transported directly to the system stacker and the CRU brought to a halt with bill $B_1$ being the last bill deposited in the output receptacle, while at the same time ensuring that the following bills are maintained in positions along the bill transport path whereby CRU operation can be conveniently resumed without any disruption of the recognition/counting process.

Since the bill processing speeds at which currency recognition systems must operate are substantially high (speeds of the order of 800 to 1500 bills per minute), it is practically impossible to totally halt the system following a "no call" without the following bill $B_2$ already overlapping the optical scanhead and being partially scanned. As a result, it is virtually impossible for the CRU system to retain the transitional status of the recognition/counting process (particularly with respect to bill $B_2$) in order that the process may be resumed once the bad bill $B_1$ has been transported to the stacker, conveniently removed therefrom, and the system restarted. The basic problem is that if the CRU is halted with bill $B_2$ only partially scanned, it is difficult to reference the data reflectance samples extracted therefrom in such a way that the scanning may be later continued (when the CRU is restarted) from exactly the same point where the sample extraction process was interrupted when the CRU was stopped.

Even if an attempt were made at immediately halting the CRU system following a "no call," any subsequent scanning of bills would be totally unreliable because of mechanical backlash effects and the resultant disruption of the optical encoder routine used for bill scanning. Consequently, when the CRU is restarted, the call for the following bill is also likely to be bad and the overall recognition/counting process is totally disrupted as a result of an endless loop of "no calls."

The above problems are solved by the use of a currency detecting and counting technique whereby a scanned bill identified as a "no call" is transported directly to the top of the system stacker and the CRU is halted without adversely affecting the data collection and processing steps for a succeeding bill. Accordingly, when the CRU is restarted, the overall bill recognition and counting procedure can be resumed without any disruption as if the CRU had never been halted at all.

According to one technique, if the bill is identified as a "no call" based on any of a variety of conventionally defined bill criteria, the CRU is subjected to a controlled deceleration process whereby the speed at which bills are moved across the scanhead is reduced from the normal operating speed. During this deceleration process the "no call" bill ($B_1$) is transported to the top of the stacker and, at the same time, the following bill $B_2$ is subjected to the standard scanning procedure in order to identify the denomination.

The rate of deceleration is such that optical scanning of bill $B_2$ is completed by the time the CRU operating speed is reduced to a predefined operating speed. While the exact operating speed at the end of the scanning of bill $B_2$ is not critical, the objective is to permit complete scanning of bill $B_2$ without subjecting it to backlash effects that would result if the ramping were too fast, while at the same time ensuring that bill $B_1$ has in fact been transported to the stacker.

It has been experimentally determined that at nominal operating speeds of the order of 1000 bills per minute, the deceleration is such that the CRU operating speed is reduced to about one-fifth of its normal operating speed at the end of the deceleration phase, i.e., by the time optical scanning of bill $B_2$ has been completed. It has been determined that at these speed levels, positive calls can be made as to the denomination of bill $B_2$ based on reflectance samples gathered during the deceleration phase with a relatively high degree of certainty (i.e., with a correlation number exceeding about 850).

Once the optical scanning of bill $B_2$ has been completed, the speed is reduced to an even slower speed until the bill $B_2$ has passed bill-edge sensors S1 and S2 described below, and the bill $B_2$ is then brought to a complete stop. At the same time, the results of the processing of scanned data corresponding to bill $B_2$ are stored in system memory. The ultimate result of this stopping procedure is that the CRU is brought to a complete halt following the point where the scanning of bill $B_2$ has been reliably completed, and the scan procedure is not subjected to the disruptive effects (backlash, etc.) which would result if a complete halt were attempted immediately after bill $B_1$ is identified as a "no call."

The reduced operating speed of the machine at the end of the deceleration phase is such that the CRU can be brought to a total halt before the next following bill $B_3$ has been transported over the optical scanhead. Thus, when the CRU is in fact halted, bill $B_1$ is positioned at the top of the system stacker, bill $B_2$ is maintained in transit between the optical scanhead and the stacker after it has been subjected to scanning, and the following bill $B_3$ is stopped short of the optical scanhead.

Figure 15:
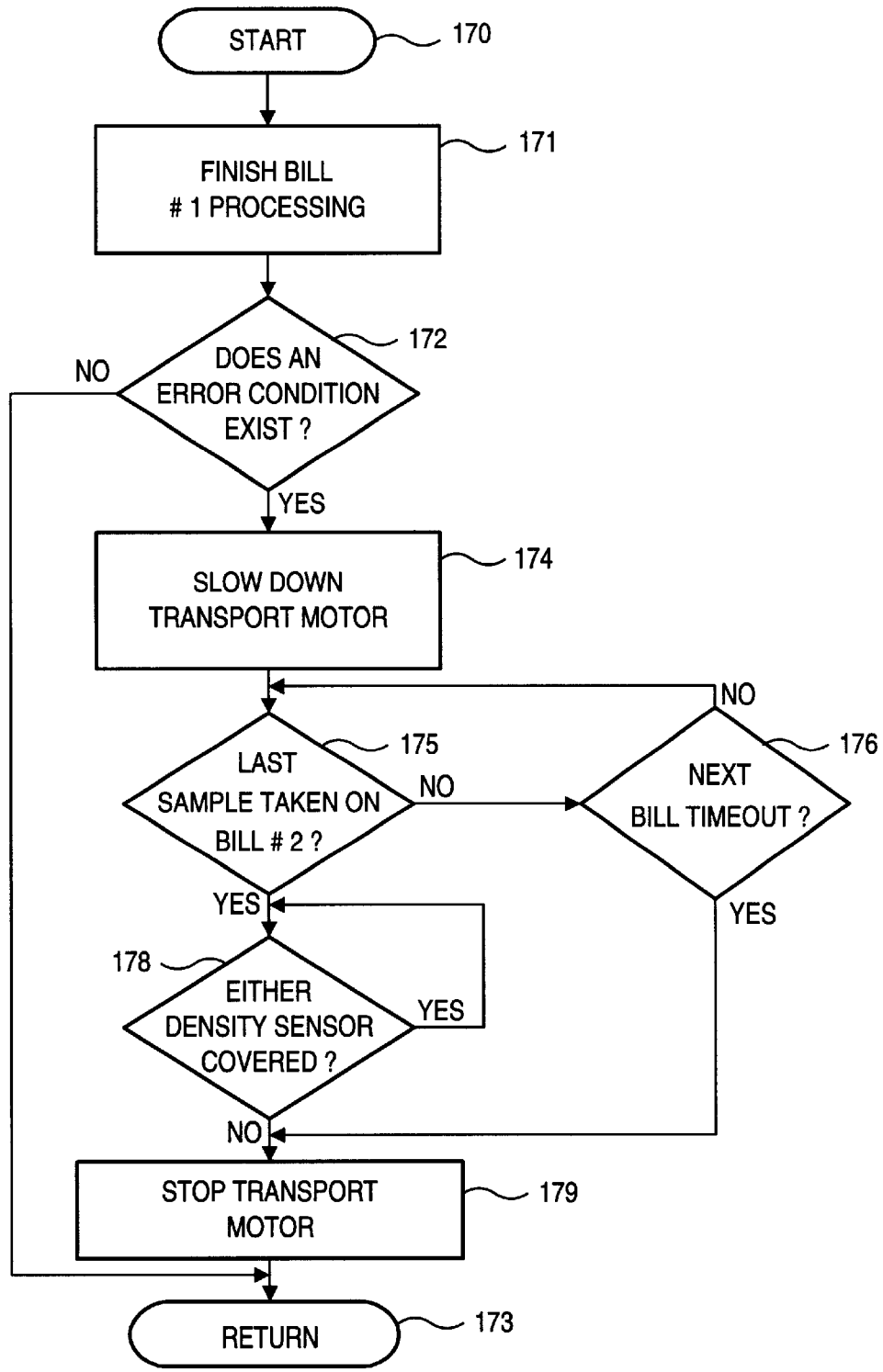
FIG. 15 is a flow chart illustrating the sequential procedure involved in decelerating and stopping the bill transport system in the event of an error.

When the CRU is restarted, presumably after corrective action has been taken in response to the "minor" error which led to the CRU being stopped (such as the removal of the "no call" bill from the output receptacle), the overall scanning operation can be resumed in an uninterrupted fashion by using the stored call results for bill $B_2$ as the basis for updating the system count appropriately, moving bill $B_2$ from its earlier transitional position along the transport path into the stacker, and moving bill $B_3$ along the transport path into the optical scanhead area where it can be subjected to normal scanning and processing. A routine for executing the deceleration/stopping procedure described above is illustrated by the flow chart in FIG. 15. This routine is initiated at step 170 with the CRU in its normal operating mode. At step 171, a test bill $B_1$ is scanned and the data reflectance samples resulting therefrom are processed. Next, at step 172, a determination is made as to whether or not test bill $B_1$ is a "no call" using predefined criteria in combination with the overall bill recognition procedure, such as the routine of FIG. 14. If the answer at step 172 is negative, i.e., the test bill $B_1$ can be identified, step 173 is accessed where normal bill processing is continued in accordance with the procedures described above. If, however, the test bill $B_1$ is found to be a "no call" at step 172, step 174 is accessed where CRU deceleration is initiated, e.g., the transport drive motor speed is reduced to about one-fifth its normal speed.

Subsequently, the "no call" bill $B_1$ is guided to the stacker while, at the same time, the following test bill $B_2$ is brought under the optical scanhead and subjected to the scanning and processing steps. The call resulting from the scanning and processing of bill $B_2$ is stored in system memory at this point. Step 175 determines whether the scanning of bill $B_2$ is complete. When the answer is negative, step 176 determines whether a preselected "bill timeout" period has expired so that the system does not wait for the scanning of a bill that is not present. An affirmative answer at step 176 results in the transport drive motor being stopped at step 179 while a negative answer at step 176 causes steps 175 and 176 to be reiterated until one of them produces an affirmative response.

After the scanning of bill $B_2$ is complete and before stopping the transport drive motor, step 178 determines whether either of the sensors S1 or S2 (described below) is covered by a bill. A negative answer at step 178 indicates that the bill has cleared both sensors S1 and S2, and thus the transport drive motor is stopped at step 179. This signifies the end of the deceleration/stopping process. At this point in time, bill $B_2$ remains in transit while the following bill $B_3$ is stopped on the transport path just short of the optical scanhead.

Following step 179, corrective action responsive to the identification of a "no call" bill is conveniently undertaken; the top-most bill in the stacker is easily removed therefrom and the CRU is then in condition for resuming the scanning process. Accordingly, the CRU can be restarted and the stored results corresponding to bill $B_2$, are used to appropriately update the system count. Next, the identified bill $B_2$ is guided along the transport path to the stacker, and the CRU continues with its normal processing routine. While the above deceleration process has been described in a context of a "no call" error, other minor errors (e.g., suspect bills, stranger bills in stranger mode, etc.) are handled in the same manner.

Figure 16:
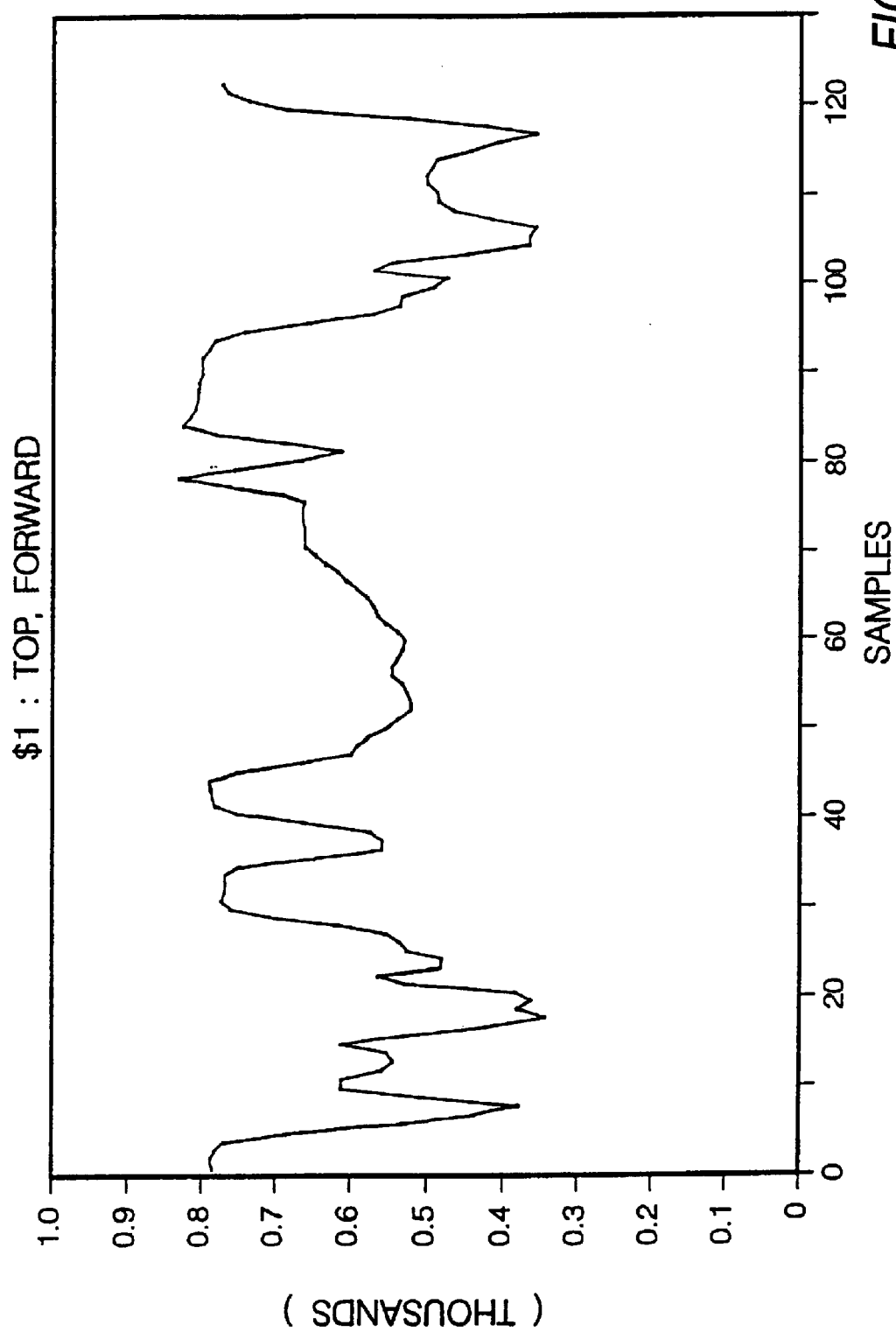
FIG. 16 is a graphical illustration of representative characteristic patterns generated by narrow dimension optical scanning of a $1 currency bill in the forward direction.
Figure 17:
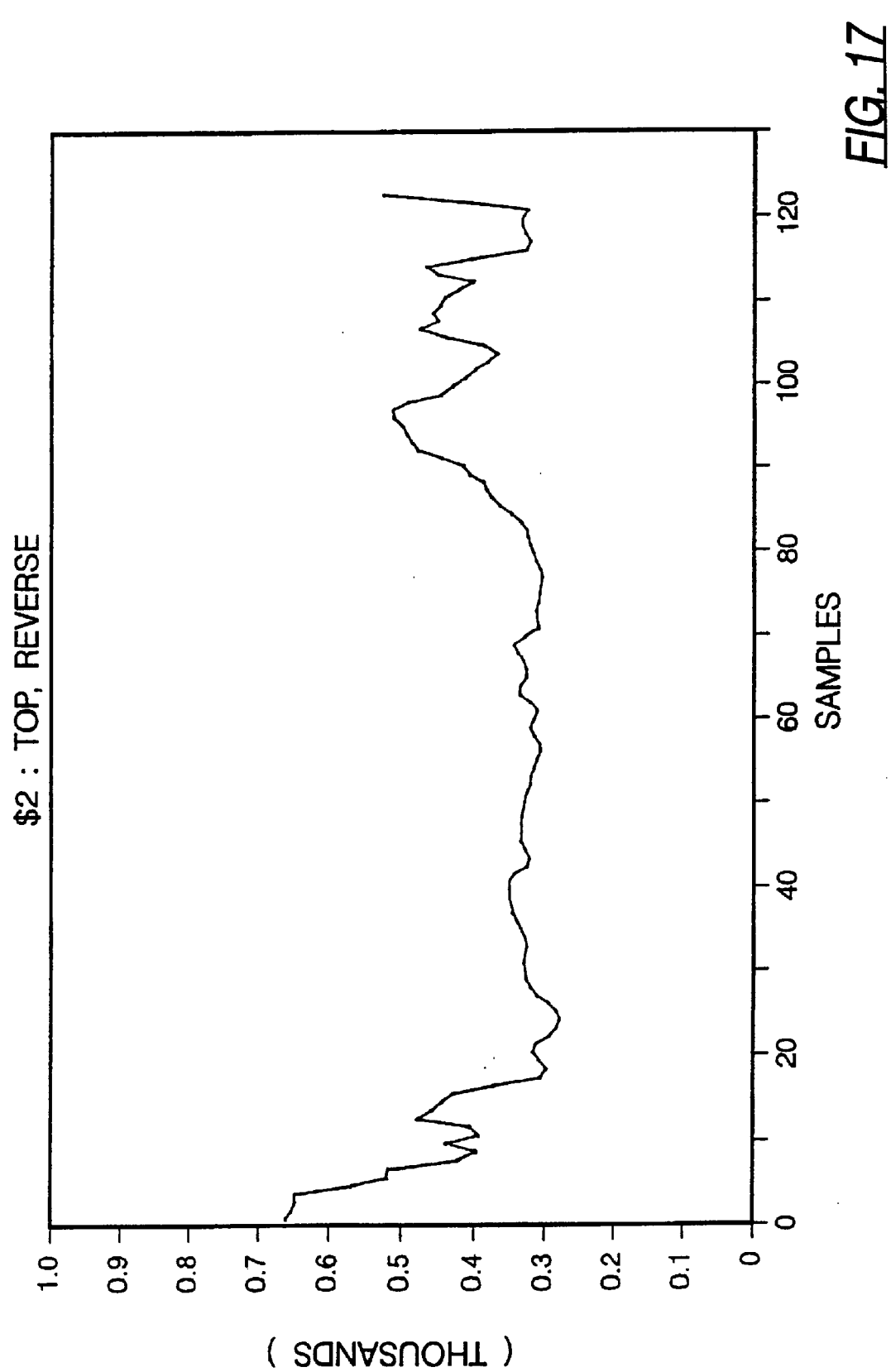
FIG. 17 is a graphical illustration of representative characteristic patterns generated by narrow dimension optical scanning of a $2 currency bill in the reverse direction.
Figure 18:
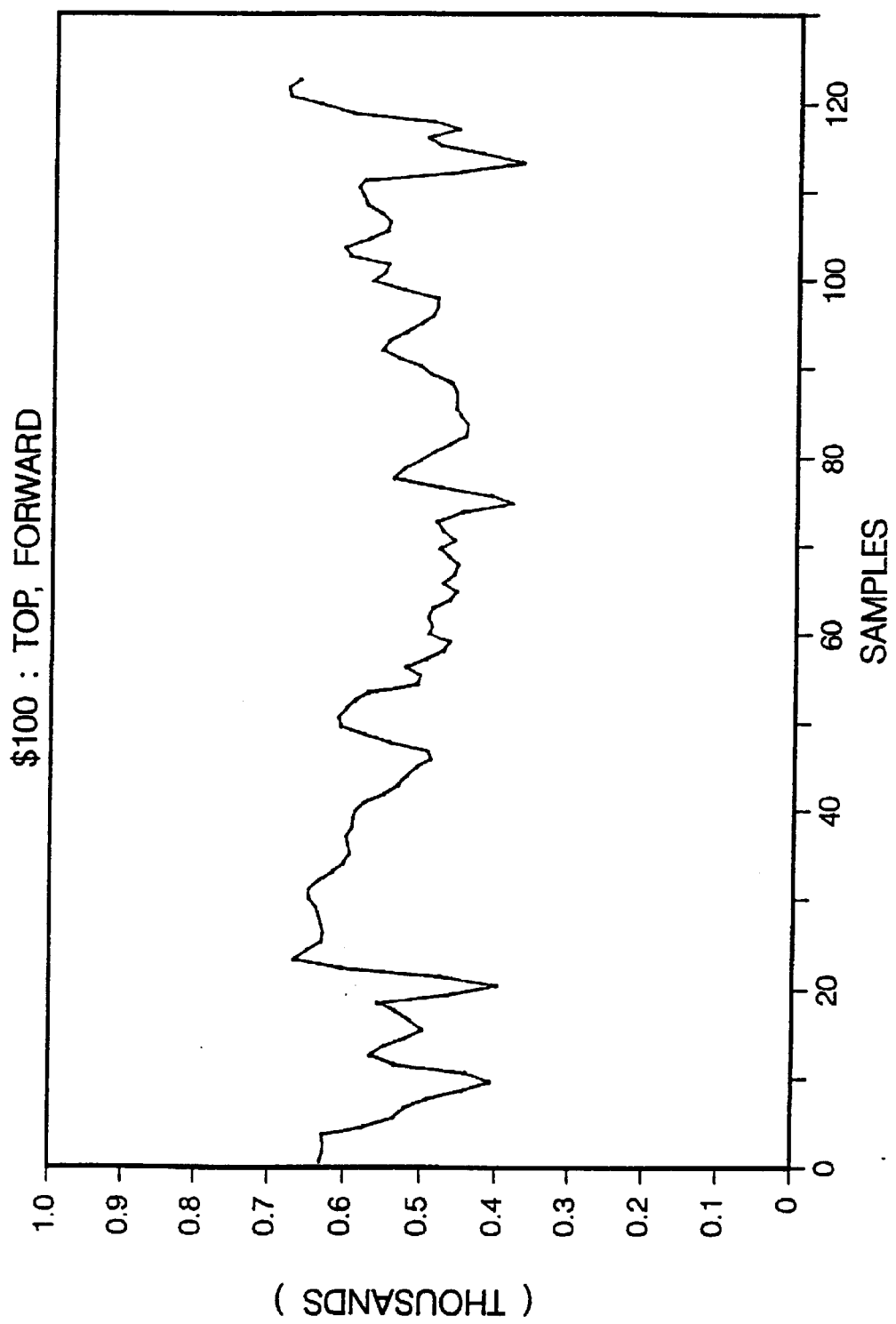
FIG. 18 is a graphical illustration of representative characteristic patterns generated by narrow dimension optical scanning of a $100 currency bill in the forward direction.
Figure 19:
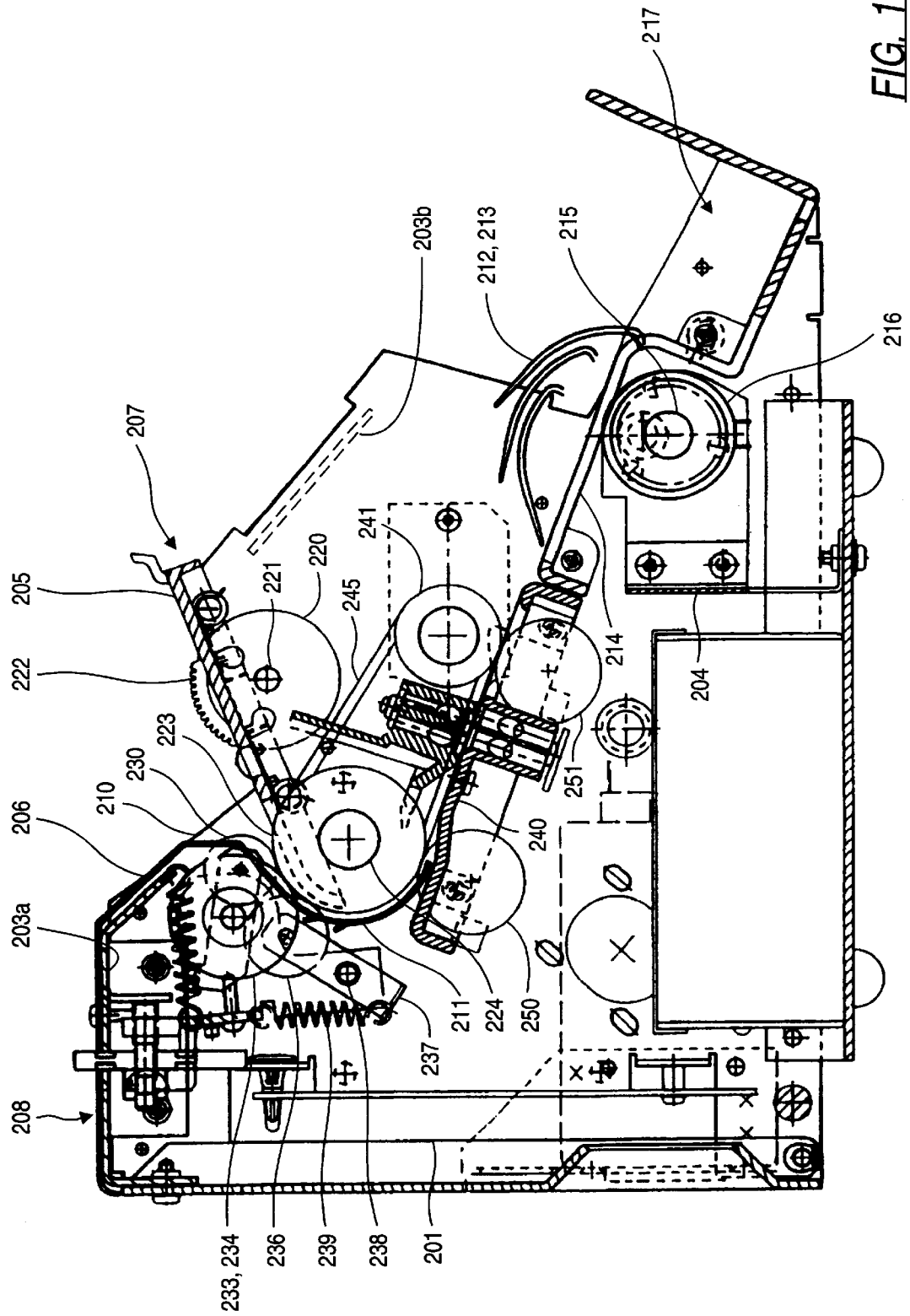
FIG. 19 is an enlarged vertical section taken approximately through the center of the machine, but showing the various transport rolls in side elevation.

FIGS. 16–18 show three test patterns generated, respectively, for the forward scanning of a $1 bill along its green side, the reverse scanning of a $2 bill on its green side, and the forward scanning of a $100 bill on its green side. It should be noted that, for purposes of clarity the test patterns in FIGS. 16–18 were generated by using 128 reflectance samples per bill scan, as opposed to the preferred use of only 64 samples. The marked difference existing between corresponding samples for these three test patterns is indicative of the high degree of confidence with which currency denominations may be called using the foregoing optical sensing and correlation procedure.

The optical sensing and correlation technique described above permits identification of pre-programmed currency denominations with a high degree of accuracy and is based upon a relatively low processing time for digitizing sampled reflectance values and comparing them to the master characteristic patterns. The approach is used to scan currency bills, normalize the scanned data and generate master patterns in such a way that bill scans during operation have a direct correspondence between compared sample points in portions of the bills which possess the most distinguishable printed indicia. A relatively low number of reflectance samples is required in order to be able to adequately distinguish among several currency denominations.

A major advantage with this approach is that it is not required that currency bills be scanned along their wide dimensions. Further, the reduction in the number of samples reduces the processing time to such an extent that additional comparisons can be made during the time available between the scanning of successive bills. More specifically, as described above, it becomes possible to compare a test pattern with multiple stored master characteristic patterns so that the system is made capable of identifying currency which is scanned in the "forward" or "reverse" directions along the green surface of the bill.

Another advantage accruing from the reduction in processing time realized by the above sensing and correlation scheme is that the response time involved in either stopping the transport of a bill that has been identified as "spurious", i.e., not corresponding to any of the stored master characteristic patterns, or diverting such a bill to a separate stacker bin, is correspondingly shortened. Accordingly, the system can conveniently be programmed to set a flag when a scanned pattern does not correspond to any of the master patterns. The identification of such a condition can be used to stop the bill transport drive motor for the mechanism. Since the optical encoder is tied to the rotational movement of the drive motor, synchronism can be maintained between pre- and post-stop conditions.

Referring now to FIGS. 19–22, according to one embodiment, the mechanical portions of a currency discrimination and counting machine include a rigid frame formed by a pair of side plates 201 and 202, a pair of top plates 203a and 203b, and a lower front plate 204. The input receptacle for receiving a stack of bills to be processed is formed by downwardly sloping and converging walls 205 and 206 formed by a pair of removable covers 207 and 208 which snap onto the frame. The rear wall 206 supports a removable hopper 209 which includes a pair of vertically disposed side walls 210a and 210b which complete the receptacle for the stack of currency bills to be processed.

From the input receptacle, the currency bills are moved in seriatim from the bottom of the stack along a curved guideway 211 which receives bills moving downwardly and rearwardly and changes the direction of travel to a forward direction. The curvature of the guideway 211 corresponds substantially to the curved periphery of the drive roll 223 so as to form a narrow passageway for the bills along the rear side of the drive roll. The exit end of the guideway 211 directs the bills onto a linear path where the bills are scanned and stacked. The bills are transported and stacked with the narrow dimension of the bills maintained parallel to the transport path and the direction of movement at all times.

Stacking of the bills is effected at the forward end of the linear path, where the bills are fed into a pair of driven stacking wheels 212 and 213. These wheels project upwardly through a pair of openings in a stacker plate 214 to receive the bills as they are advanced across the downwardly sloping upper surface of the plate. The stacker wheels 212 and 213 are supported for rotational movement about a shaft 215 journalled on the rigid frame and driven by a motor 216. The flexible blades of the stacker wheels deliver the bills into an output receptacle 217 at the forward end of the stacker plate 214. During operation, a currency bill which is delivered to the stacker plate 214 is picked up by the flexible blades and becomes lodged between a pair of adjacent blades which, in combination, define a curved enclosure which decelerates a bill entering therein and serves as a means for supporting and transferring the bill into the output receptacle 217 as the stacker wheels 212, 213 rotate. The mechanical configuration of the stacker wheels, as well as the manner in which they cooperate with the stacker plate, is conventional and, accordingly, is not described in detail herein.

Returning now to the input region of the machine as shown in FIGS. 19–22, bills that are stacked on the bottom wall 205 of the input receptacle are stripped, one at a time, from the bottom of the stack. The bills are stripped by a pair of stripping wheels 220 mounted on a drive shaft 221 which, in turn, is supported across the side walls 201, 202. The stripping wheels 220 project through a pair of slots formed in the cover 207. Part of the periphery of each wheel 220 is provided with a raised high-friction, serrated surface 222 which engages the bottom bill of the input stack as the wheels 220 rotate, to initiate feeding movement of the bottom bill from the stack. The serrated surfaces 222 project radially beyond the rest of the wheel peripheries so that the wheels "jog" the bill stack during each revolution so as to agitate and loosen the bottom currency bill within the stack, thereby facilitating the stripping of the bottom bill from the stack.

The stripping wheels 220 feed each stripped bill B (FIG. 21a) onto a drive roll 223 mounted on a driven shaft 224 supported across the side walls 201 and 202. As can be seen most clearly in FIGS. 21a and 21b, the drive roll 223 includes a central smooth friction surface 225 formed of a material such as rubber or hard plastic. This smooth friction surface 225 is sandwiched between a pair of grooved surfaces 226 and 227 having serrated portions 228 and 229 formed from a high-friction material.

The serrated surfaces 228, 229 engage each bill after it is fed onto the drive roll 223 by the stripping wheels 220, to frictionally advance the bill into the narrow arcuate passageway formed by the curved guideway 211 adjacent the rear side of the drive roll 223. The rotational movement of the drive roll 223 and the stripping wheels 220 is synchronized so that the serrated surfaces on the drive roll and the stripping wheels maintain a constant relationship to each other. Moreover, the drive roll 223 is dimensioned so that the circumference of the outermost portions of the grooved surfaces is greater than the width W of a bill, so that the bills advanced by the drive roll 223 are spaced apart from each other, for the reasons discussed above. That is, each bill fed to the drive roll 223 is advanced by that roll only when the serrated surfaces 228, 229 come into engagement with the bill, so that the circumference of the drive roll 223 determines the spacing between the leading edges of successive bills.

To avoid the simultaneous removal of multiple bills from the stack in the input receptacle, particularly when small stacks of bills are loaded into the machine, the stripping wheels 220 are always stopped with the raised, serrated portions 222 positioned below the bottom wall 205 of the input receptacle. This is accomplished by continuously monitoring the angular position of the serrated portions of the stripping wheels 220 via the encoder 32, and then controlling the stopping time of the drive motor so that the motor always stops the stripping wheels in a position where the serrated portions 222 are located beneath the bottom wall 205 of the input receptacle. Thus, each time a new stack of bills is loaded into the machine, those bills will rest on the smooth portions of the stripping wheels. This has been found to significantly reduce the simultaneous feeding of double or triple bills, particularly when small stacks of bills are involved.

In order to ensure firm engagement between the drive roll 223 and the currency bill being fed, an idler roll 230 urges each incoming bill against the smooth central surface 225 of the drive roll 223. The idler roll 230 is journalled on a pair of arms 231 which are pivotally mounted on a support shaft 232. Also mounted on the shaft 232, on opposite sides of the idler roll 230, are a pair of grooved guide wheels 233 and 234. The grooves in these two wheels 233, 234 are registered with the central ribs in the two grooved surfaces 226, 227 of the drive roll 223. The wheels 233, 234 are locked to the shaft 232, which in turn is locked against movement in the direction of the bill movement (clockwise as view in FIG. 19) by a one-way spring clutch 235. Each time a bill is fed into the nip between the guide wheels 233, 234 and the drive roll 223, the clutch 235 is energized to turn the shaft 232 just a few degrees in a direction opposite the direction of bill movement. These repeated incremental movements distribute the wear uniformly around the circumferences of the guide wheels 233, 234. Although the idler roll 230 and the guide wheels 233, 234 are mounted behind the guideway 211, the guideway is apertured to allow the roll 230 and the wheels 233, 234 to engage the bills on the front side of the guideway.

Beneath the idler roll 230, a spring-loaded pressure roll 236 (FIGS. 19 and 21b) presses the bills into firm engagement with the smooth friction surface 225 of the drive roll as the bills curve downwardly along the guideway 211. This pressure roll 236 is journalled on a pair of arms 237 pivoted on a stationary shaft 238. A spring 239 attached to the lower ends of the arms 237 urges the roll 236 against the drive roll 223, through an aperture in the curved guideway 211.

At the lower end of the curved guideway 211, the bill being transported by the drive roll 223 engages a flat guide plate 240 which carries a lower scan head 18. Currency bills are positively driven along the flat plate 240 by means of a transport roll arrangement which includes the drive roll 223 at one end of the plate and a smaller driven roll 241 at the other end of the plate. Both the driver roll 223 and the smaller roll 241 include pairs of smooth raised cylindrical surfaces 242 and 243 which hold the bill flat against the plate 240. A pair of O rings 244 and 245 fit into grooves formed in both the roll 241 and the roll 223 to engage the bill continuously between the two rolls 223 and 241 to transport the bill while helping to hold the bill flat against the guide plate 240.

The flat guide plate 240 is provided with openings through which the raised surfaces 242 and 243 of both the drive roll 223 and the smaller driven roll 241 are subjected to counter-rotating contact with corresponding pairs of passive transport rolls 250 and 251 having high-friction rubber surfaces. The passive rolls 250, 251 are mounted on the underside of the flat plate 240 in such a manner as to be freewheeling about their axes 254 and 255 and biased into counter-rotating contact with the corresponding upper rolls 223 and 241. The passive rolls 250 and 251 are biased into contact with the driven rolls 223 and 241 by means of a pair of H-shaped leaf springs 252 and 253 (see FIGS. 23 and 24). Each of the four rolls 250, 251 is cradled between a pair of parallel arms of one of the H-shaped leaf springs 252 and 253. The central portion of each leaf spring is fastened to the plate 240, which is fastened rigidly to the machine frame, so that the relatively stiff arms of the H-shaped springs exert a constant biasing pressure against the rolls and push them against the upper rolls 223 and 241.

The points of contact between the driven and passive transport rolls are preferably coplanar with the flat upper surface of the plate 240 so that currency bills can be positively driven along the top surface of the plate in a flat manner. The distance between the axes of the two driven transport rolls, and the corresponding counter-rotating passive rolls, is selected to be just short of the length of the narrow dimension of the currency bills. Accordingly, the bills are firmly gripped under uniform pressure between the upper and lower transport rolls within the scanhead area, thereby minimizing the possibility of bill skew and enhancing the reliability of the overall scanning and recognition process.

The positive guiding arrangement described above is advantageous in that uniform guiding pressure is maintained on the bills as they are transported through the optical scanhead area, and twisting or skewing of the bills is substantially reduced. This positive action is supplemented by the use of the H-springs 252, 253 for uniformly biasing the passive rollers into contact with the active rollers so that bill twisting or skew resulting from differential pressure applied to the bills along the transport path is avoided. The O-rings 244, 245 function as simple, yet extremely effective means for ensuring that the central portions of the bills are held flat.

Figure 23:
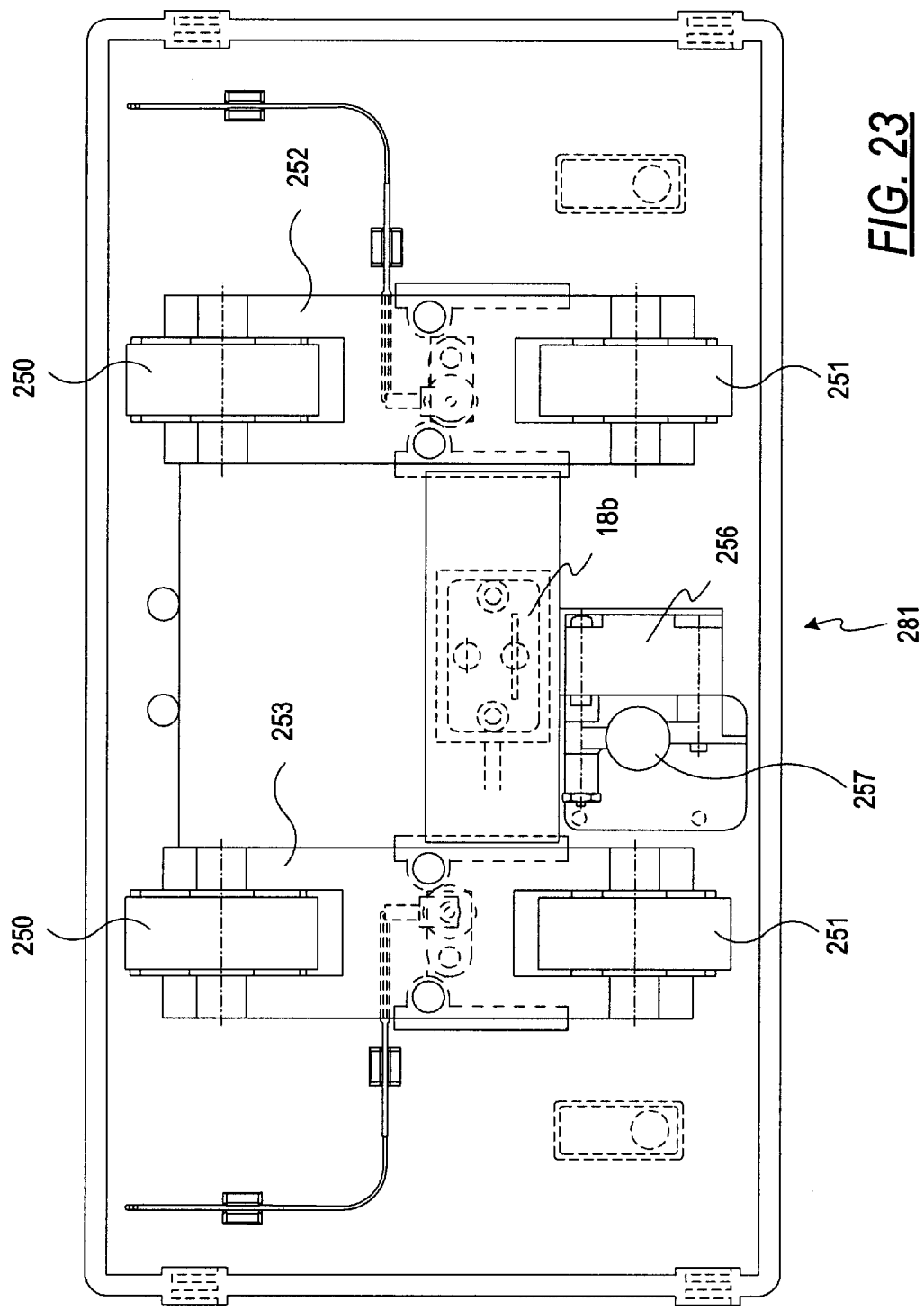
FIG. 23 is an enlarged bottom plan view of the lower support member in the machine of FIG. 1 and the passive transport rolls mounted on that member.
Figure 24:
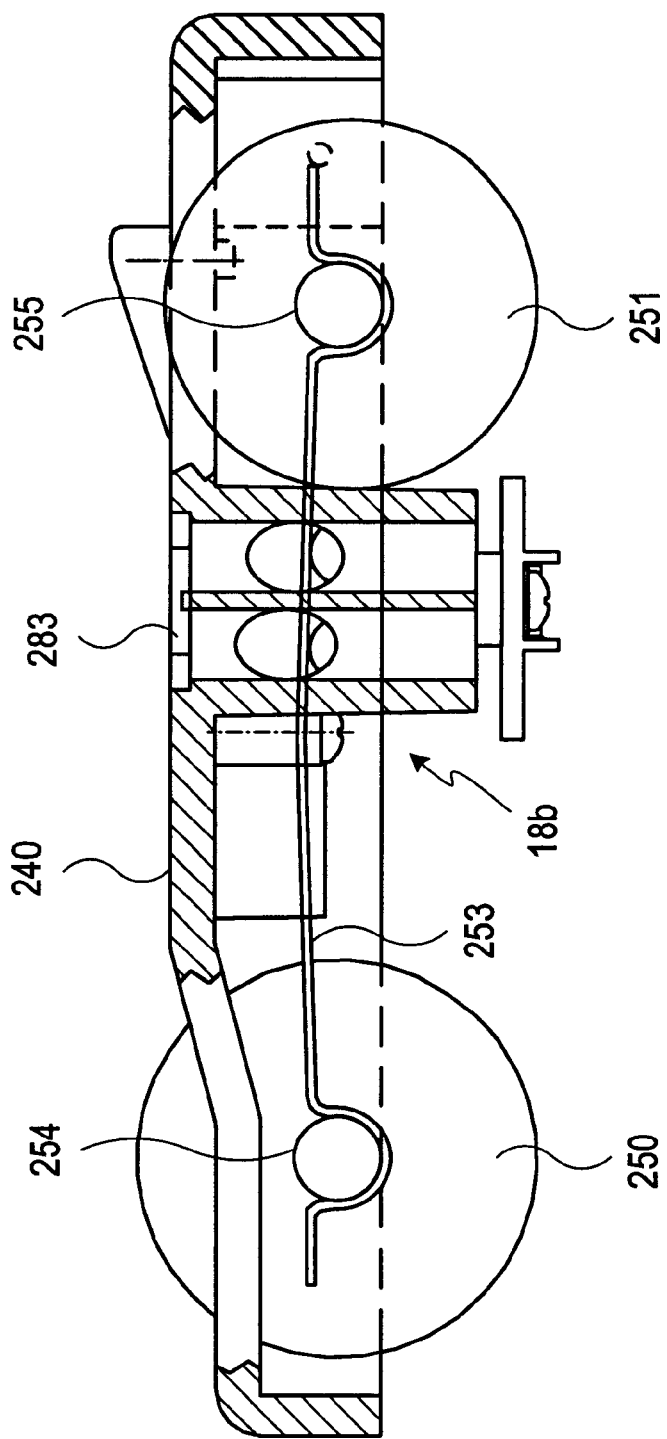
FIG. 24 is a sectional view taken across the center of the bottom support member of FIG. 23 across the narrow dimension thereof.
Figure 26:
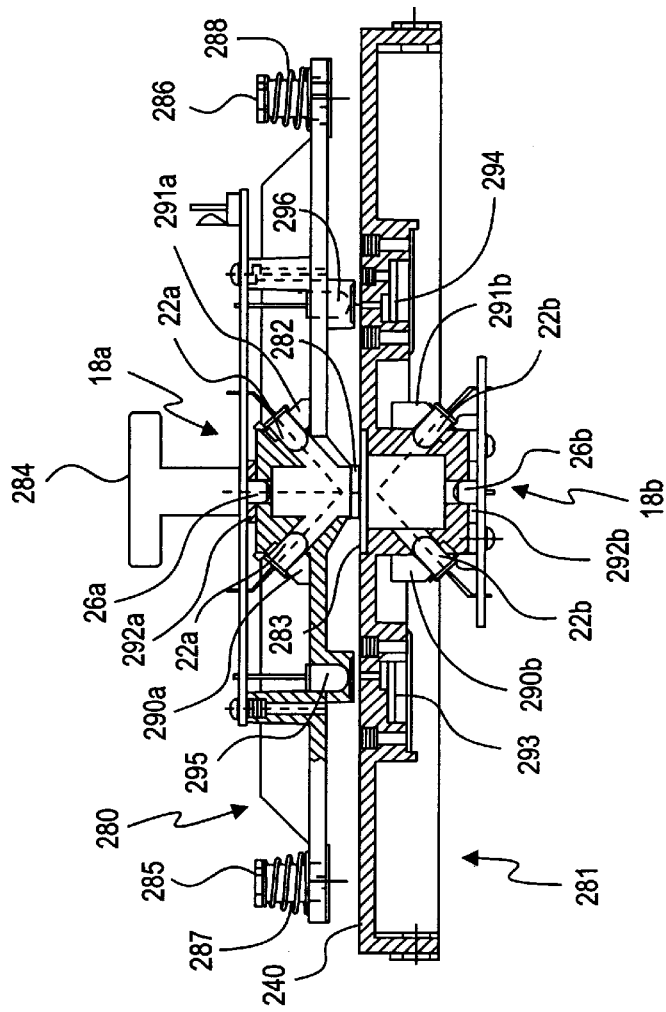
FIG. 26 is a section taken through the centers of both the upper and lower support members, along the long dimension of the lower support member shown in FIG. 23.
Figure 25:
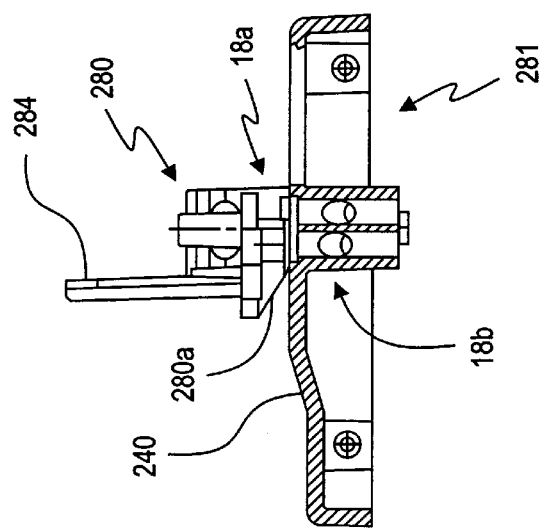
FIG. 25 is an end elevation of the upper support member which includes the upper scanhead in the machine of FIG. 1, and the sectional view of the lower support member mounted beneath the upper support member.
Figure 27:
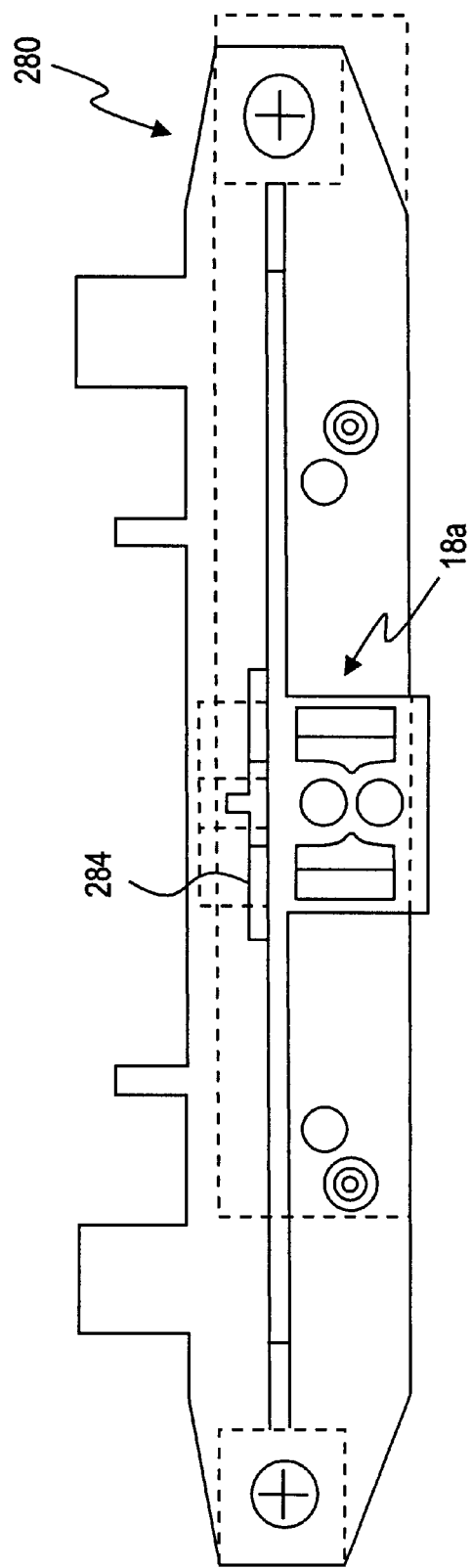
FIG. 27 is a top plan view of the upper support member which includes the upper scanhead.
Figure 28:
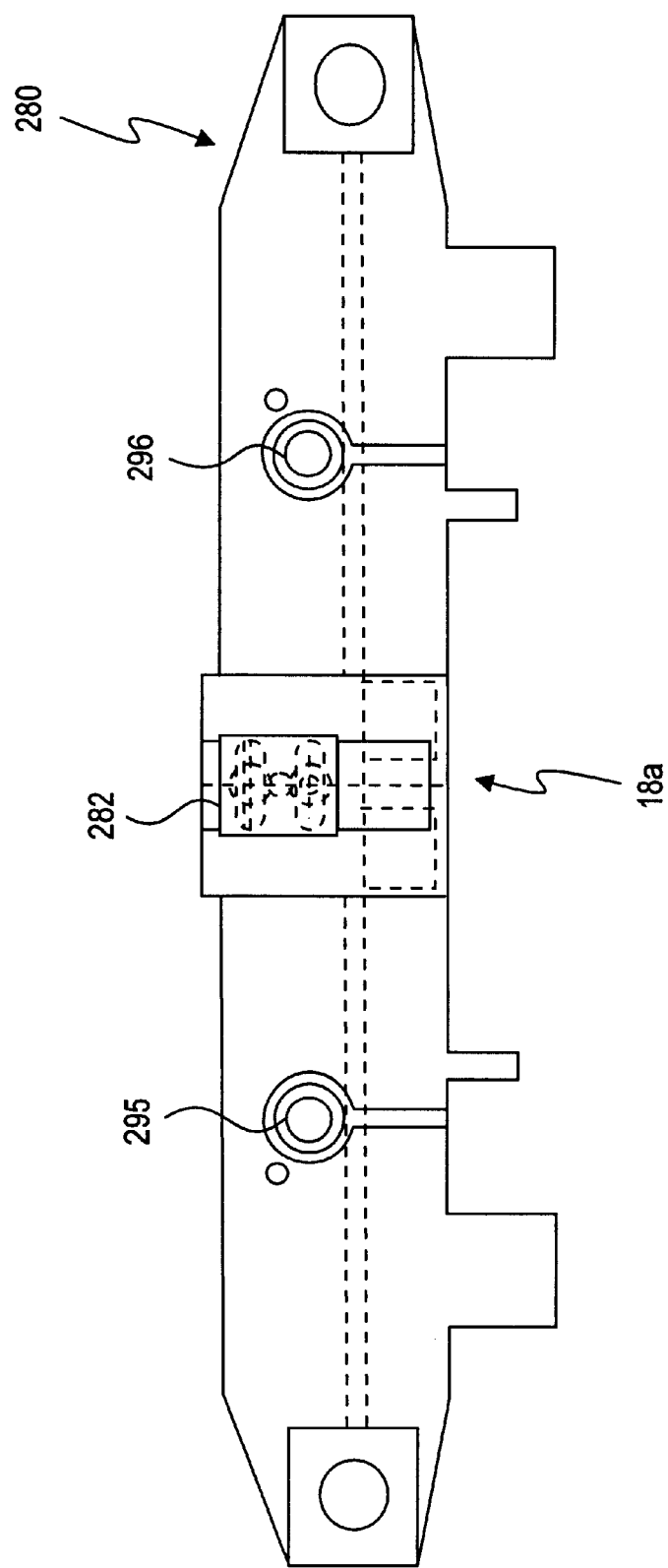
FIG. 28 is a bottom plan view of the upper support member which includes the upper scanhead.

The location of a magnetic head 256 and a magnetic head adjustment screw 257 are illustrated in FIG. 23. The adjustment screw 257 adjusts the proximity of the magnetic head 256 relative to a passing bill and thereby adjusts the strength of the magnetic field in the vicinity of the bill.

Figure 22:
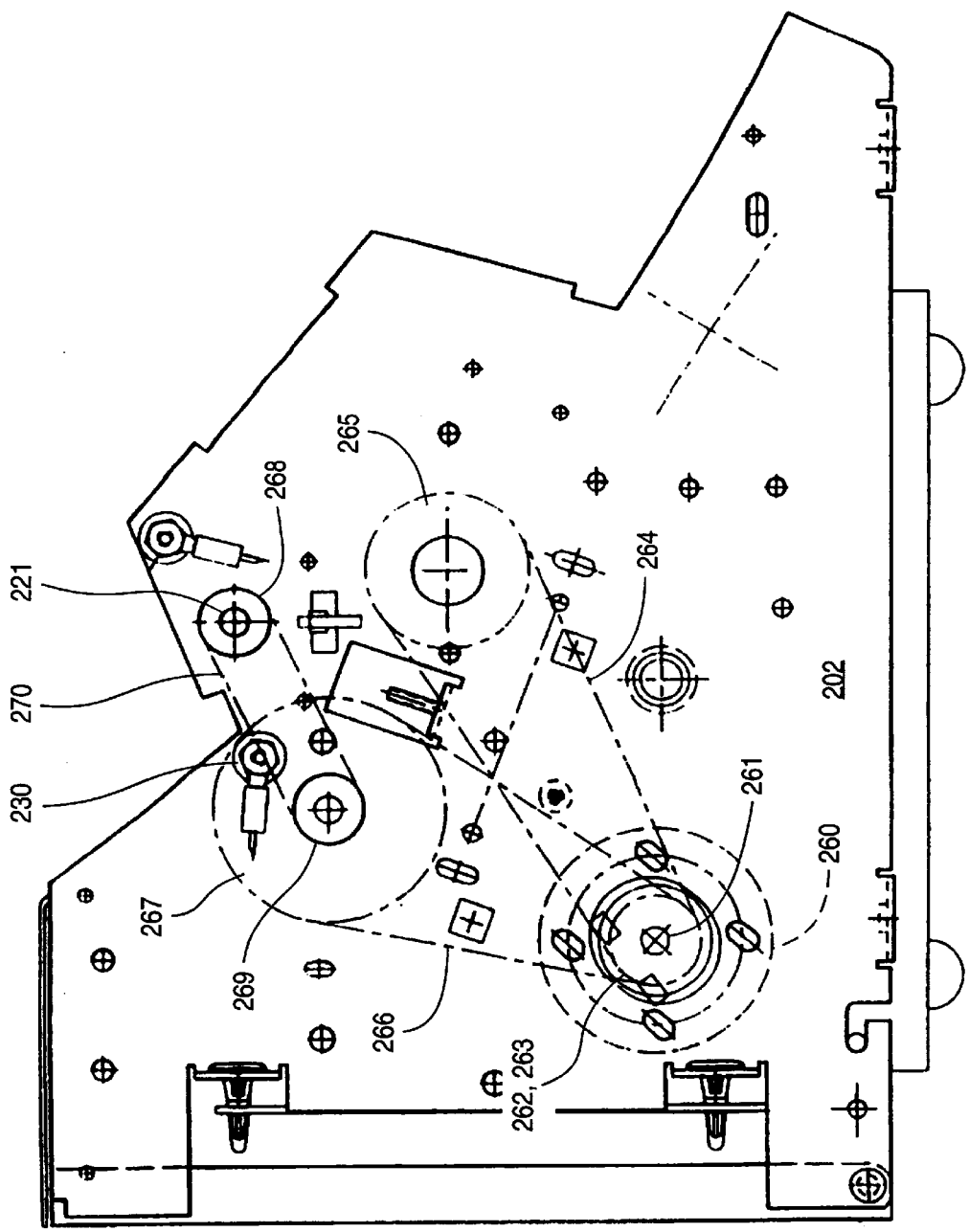
FIG. 22 is a side elevation of the machine of FIG. 1, with the side panel of the housing removed.

FIG. 22 shows the mechanical arrangement for driving the various means for transporting currency bills through the machine. A motor 260 drives a shaft 261 carrying a pair of pulleys 262 and 263. The pulley 262 drives the roll 241 through a belt 264 and pulley 265, and the pulley 263 drives the roll 223 through a belt 266 and pulley 267. Both pulleys 265 and 267 are larger than pulleys 262 and 263 in order to achieve the desired speed reduction from the typically high speed at which the motor 260 operates.

The shaft 221 of the stripping wheels 220 is driven by means of a pulley 268 provided thereon and linked to a corresponding pulley 269 on the shaft 224 through a belt 270. The pulleys 268 and 269 are of the same diameter so that the shafts 221 and 224 rotate in unison.

Figure 20:
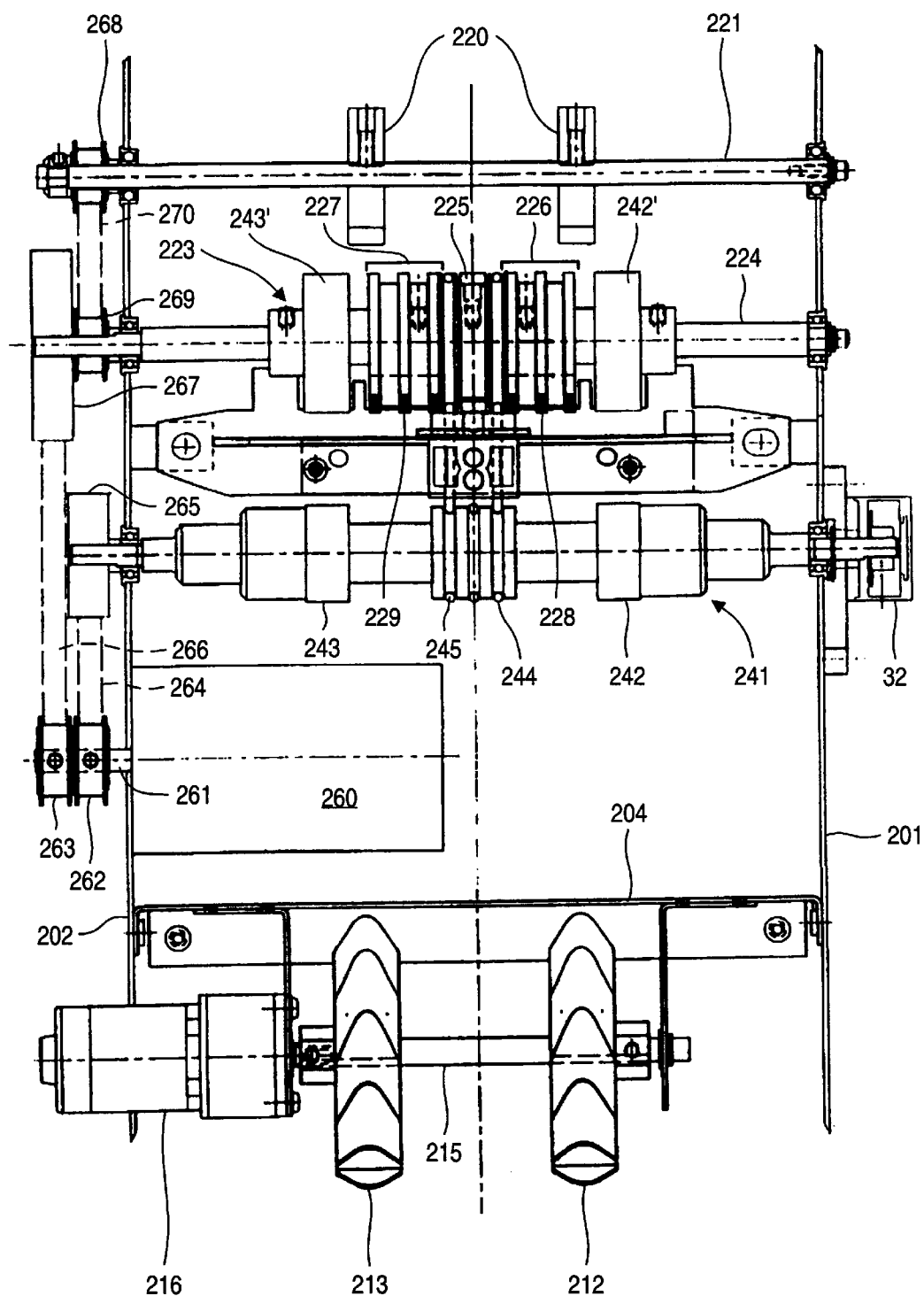
FIG. 20 is a top plan view of the interior mechanism of the machine of FIG. 1 for transporting bills across the optical scanheads, and also showing the stacking wheels at the front of the machine.
Figure 21A:
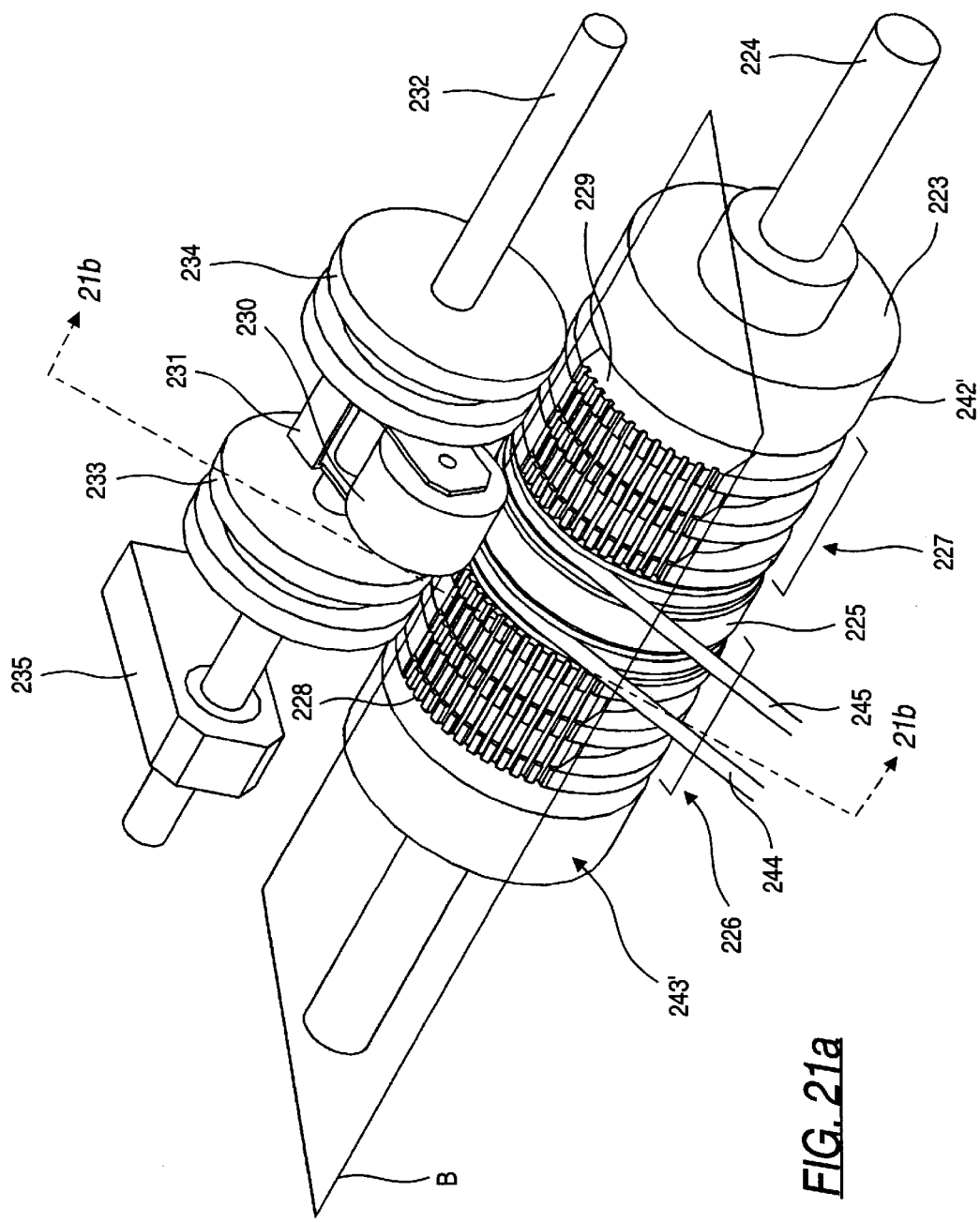
FIG. 21a is an enlarged perspective view of the bill transport mechanism which receives bills from the stripping wheels in the machine of FIG. 1.

As shown in FIG. 20, the optical encoder 32 is mounted on the shaft of the roller 241 for precisely tracking the position of each bill as it is transported through the machine, as discussed in detail above in connection with the optical sensing and correlation technique.

The upper and lower scanhead assemblies are shown most clearly in FIGS. 25–28. It can be seen that the housing for each scanhead is formed as an integral part of a unitary molded plastic support member 280 or 281 that also forms the housings for the light sources and photodetectors of the photosensors PS1 and PS2. The lower member 281 also forms the flat guide plate 240 that receives the bills from the drive roll 223 and supports the bills as they are driven past the scanheads 18a and 18b.

The two support members 280 and 281 are mounted facing each other so that the lenses 282 and 283 of the two scanheads 18a, 18b define a narrow gap through which each bill is transported. Similar, but slightly larger, gaps are formed by the opposed lenses of the light sources and photodetectors of the photosensors PS1 and PS2. The upper support member 280 includes a tapered entry guide 280a which guides an incoming bill into the gaps between the various pairs of opposed lenses.

The lower support member 281 is attached rigidly to the machine frame. The upper support member 280, however, is mounted for limited vertical movement when it is lifted manually by a handle 284, to facilitate the clearing of any paper jams that occur beneath the member 280. To allow for such vertical movement, the member 280 is slidably mounted on a pair of posts 285 and 286 on the machine frame, with a pair of springs 287 and 288 biasing the member 280 to its lowermost position.

Each of the two optical scanheads 18a and 18b housed in the support members 280, 281 includes a pair of light sources acting in combination to uniformly illuminate light strips of the desired dimension on opposite sides of a bill as it is transported across the plate 240. Thus, the upper scanhead 18a includes a pair of LEDs 22a, directing light downwardly through an optical mask on top of the lens 282 onto a bill traversing the flat guide plate 240 beneath the scanhead. The LEDs 22a are angularly disposed relative to the vertical axis of the scanhead so that their respective light beams combine to illuminate the desired light strip defined by an aperture in the mask. The scanhead 18a also includes a photodetector 26a mounted directly over the center of the illuminated strip for sensing the light reflected off the strip. The photodetector 26a is linked to the CPU 30 through the ADC 28 for processing the sensed data as described above.

Figure 29:
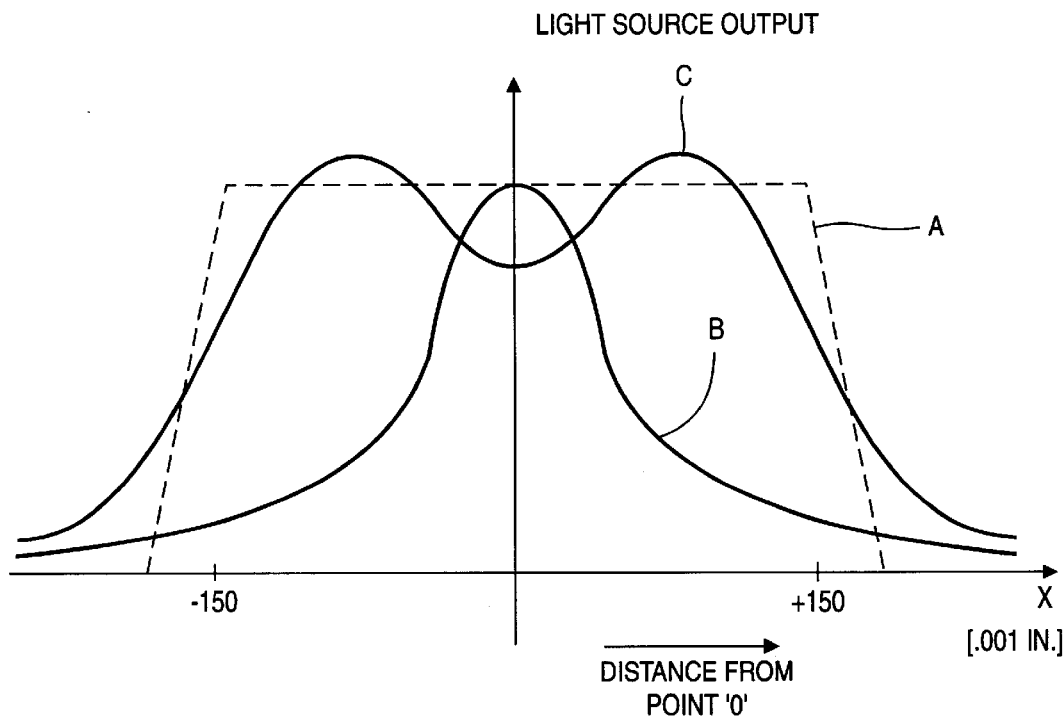
FIG. 29 is an illustration of the light distribution produced about one of the optical scanheads.
Figure 30:
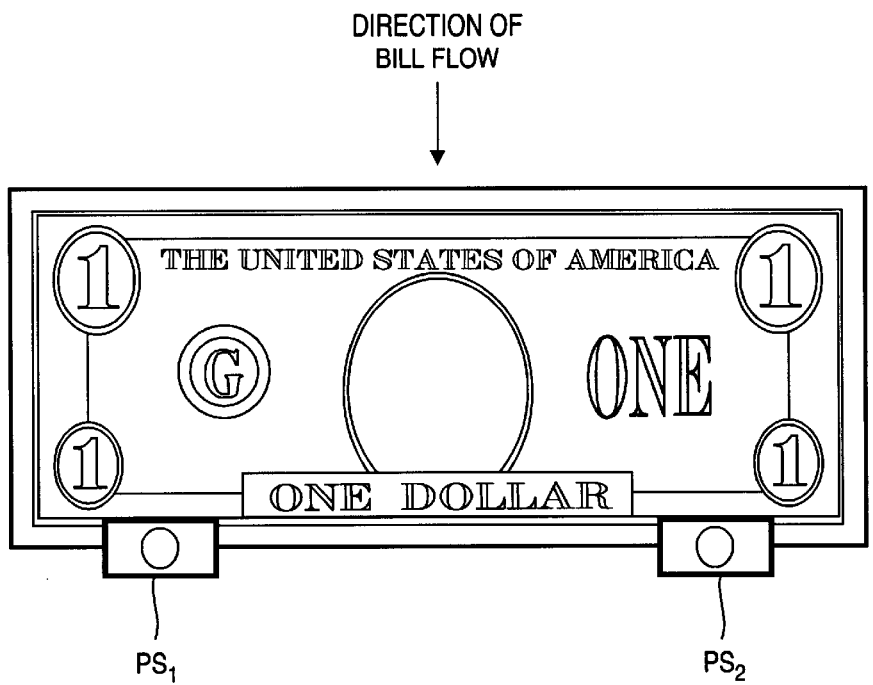
FIG. 30 is a diagrammatic illustration of the location of two auxiliary photo sensors relative to a bill passed thereover by the transport and scanning mechanism shown in FIGS. 19–28.

When the photodetector 26a is positioned on an axis passing through the center of the illuminated strip, the illumination by the LED's as a function of the distance from the central point "0" along the X axis, should optimally approximate a step function as illustrated by the curve A in FIG. 29. With the use of a single light source angularly displaced relative to a vertical axis through the center of the illuminated strip, the variation in illumination by an LED typically approximates a Gaussian function, as illustrated by the curve B in FIG. 29.

The two LEDs 22a are angularly disposed relative to the vertical axis by angles α and β, respectively. The angles α and β are selected to be such that the resultant strip illumination by the LED's is as close as possible to the optimum distribution curve A in FIG. 29. The LED illumination distribution realized by this arrangement is illustrated by the curve designated as "C" in FIG. 29 which effectively merges the individual Gaussian distributions of each light source to yield a composite distribution which sufficiently approximates the optimum curve A.

In the particular embodiment of the scanheads 18a and 18b illustrated in the drawings, each scanhead includes two pairs of LEDs and two photodetectors for illuminating, and detecting light reflected from, strips of two different sizes. Thus, each mask also includes two slits which are formed to allow light from the LEDs to pass through and illuminate light strips of the desired dimensions. More specifically, one slit illuminates a relatively wide strip used for obtaining the reflectance samples which correspond to the characteristic pattern for a test bill. In one embodiment, the wide slit has a length of about 0.500" and a width of about 0.050". The second slit forms a relatively narrow illuminated strip used for detecting the thin borderline surrounding the printed indicia on currency bills, as described above in detail. In one embodiment, the narrow slit 283 has a length of about 0.300" and a width of about 0.010".

In order to prevent dust from fouling the operation of the scanheads, each scanhead includes three resilient seals or gaskets 290, 291, and 292. The two side seals 290 and 291 seal the outer ends of the LEDs 22, while the center seal 292 seals the outer end of the photodetector 26. Thus, dust cannot collect on either the light sources or the photodetectors, and cannot accumulate and block the slits through which light is transmitted from the sources to the bill, and from the bill to the photodetectors.

Doubling or overlapping of bills in the illustrative transport system is detected by two photosensors PS1 and PS2 which are located on a common transverse axis that is perpendicular to the direction of bill flow. The photosensors PS1 and PS2 include photodetectors 293 and 294 mounted within the lower support member 281 in immediate opposition to corresponding light sources 295 and 296 mounted in the upper support member 280. The photodetectors 293, 294 detect beams of light directed downwardly onto the bill transport path from the light sources 295, 296 and generate analog outputs which correspond to the sensed light passing through the bill. Each such output is converted into a digital signal by a conventional ADC convertor unit (not shown) whose output is fed as a digital input to and processed by the system CPU.

The presence of a bill adjacent the photosensors PS1 and PS2 causes a change in the intensity of the detected light, and the corresponding changes in the analog outputs of the photodetectors 293 and 294 serve as a convenient means for density-based measurements for detecting the presence of "doubles" (two or more overlaid or overlapped bills) during the currency scanning process. For instance, the photosensors may be used to collect a predefined number of density measurements on a test bill, and the average density value for a bill may be compared to predetermined density thresholds (based, for instance, on standardized density readings for master bills) to determine the presence of overlaid bills or doubles.

In order to prevent the accumulation of dirt on the light sources 295 and 296 and/or the photodetectors 293, 294 of the photosensors PS1 and PS2, both the light sources and the photodetectors are enclosed by lenses mounted so close to the bill path that they are continually wiped by the bills. This provides a self-cleaning action which reduces maintenance problems and improves the reliability of the outputs from the photosensors over long periods of operation.

The CPU 30, under control of software stored in the EPROM 34, monitors and controls the speed at which the bill transport mechanism 16 transports bills from the bill separating station 14 to the bill stacking unit. Flowcharts of the speed control routines stored in the EPROM 34 are depicted in FIGS. 31–35. To execute more than the first step in any given routine, the currency discriminating system 10 must be operating in a mode requiring the execution of the routine.

Figure 31:
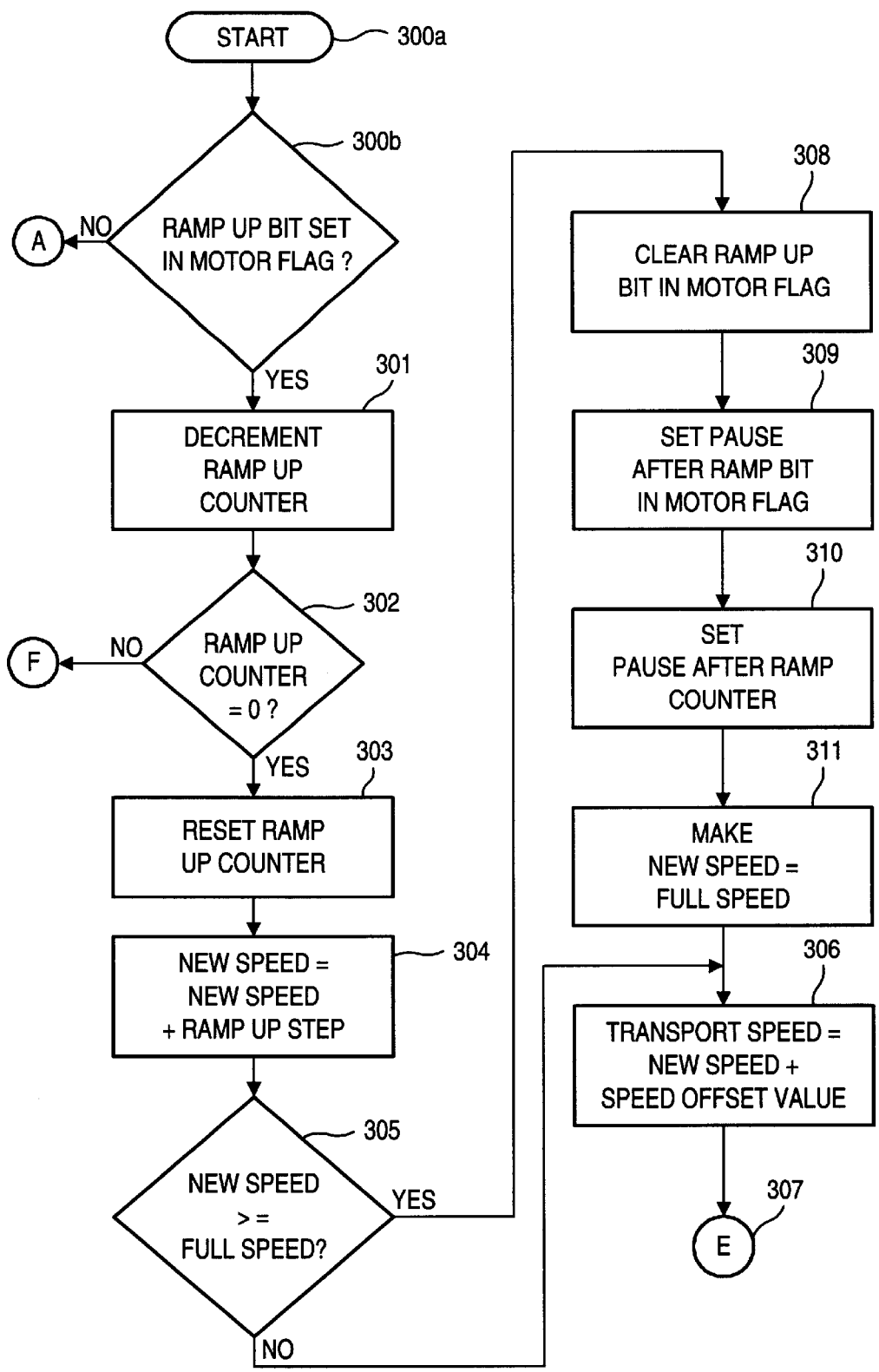
FIG. 31 is a flow chart illustrating the sequential procedure involved in a ramp-up routine for increasing the transport speed of the bill transport mechanism from zero to top speed.

Referring first to FIG. 31, when a user places a stack of bills in the bill accepting station 12 for counting, the transport speed of the bill transport mechanism 16 must accelerate or "ramp up" from zero to top speed. Therefore, in response to receiving the stack of bills in the bill accepting station 12, the CPU 30 sets a ramp-up bit in a motor flag stored in the memory unit 38. Setting the ramp-up bit causes the CPU 30 to proceed beyond step 300b of the ramp-up routine. If the ramp-up bit is set, the CPU 30 utilizes a ramp-up counter and a fixed parameter "ramp-up step" to incrementally increase the transport speed of the bill transport mechanism 16 until the bill transport mechanism 16 reaches its top speed. The "ramp-up step" is equal to the incremental increase in the transport speed of the bill transport mechanism 16, and the ramp-up counter determines the amount of time between incremental increases in the bill transport speed. The greater the value of the "ramp-up step", the greater the increase in the transport speed of the bill transport mechanism 16 at each increment. The greater the maximum value of the ramp-up counter, the greater the amount of time between increments. Thus, the greater the value of the "ramp-up step" and the lesser the maximum value of the ramp-up counter, the lesser the time it takes the bill transport mechanism 16 to reach its top speed.

The ramp-up routine in FIG. 31 employs a variable parameter "new speed", a fixed parameter "full speed", and the variable parameter "transport speed". The "full speed" represents the top speed of the bill transport mechanism 16, while the "new speed" and "transport speed" represent the desired current speed of the bill transport mechanism 16. To account for operating offsets of the bill transport mechanism 16, the "transport speed" of the bill transport mechanism 16 actually differs from the "new speed" by a "speed offset value". Outputting the "transport speed" to the bill transport mechanism 16 causes the bill transport mechanism 16 to operate at the transport speed.

To incrementally increase the speed of the bill transport mechanism 16, the CPU 30 first decrements the ramp-up counter from its maximum value (step 301). If the maximum value of the ramp-up counter is greater than one at step 302, the CPU 30 exits the speed control software in FIGS. 31–35 and repeats steps 300b, 301, and 302 during subsequent iterations of the ramp-up routine until the ramp-up counter is equal to zero. When the ramp-up counter is equal to zero, the CPU 30 resets the ramp-up counter to its maximum value (step 303). Next, the CPU 30 increases the "new speed" by the "ramp-up step" (step 304). If the "new speed" is not yet equal to the "full speed" at step 305, the "transport speed" is set equal to the "new speed" plus the "speed offset value" (step 306). The "transport speed" is output to the bill transport mechanism 16 at step 307 of the routine in FIG. 31 to change the speed of the bill transport mechanism 16 to the "transport speed". During subsequent iterations of the ramp-up routine, the CPU 30 repeats steps 300b–306 until the "new speed" is greater than or equal to the "full speed".

Once the "new speed" is greater than or equal to the "full speed" at step 305, the ramp-up bit in the motor flag is cleared (step 308), a pause-after-ramp bit in the motor flag is set (step 309), a pause-after-ramp counter is set to its maximum value (step 310), and the parameter "new speed" is set equal to the "full speed" (step 311). Finally, the "transport speed" is set equal to the "new speed" plus the "speed offset value" (step 306). Since the "new speed" is equal to the "full speed", outputting the "transport speed" to the bill transport mechanism 16 causes the bill transport mechanism 16 to operate at its top speed. The ramp-up routine in FIG. 31 smoothly increases the speed of the bill transport mechanism without causing jerking or motor spikes. Motor spikes could cause false triggering of the optical scanhead 18 such that the scanhead 18 scans non-existent bills.

Figure 32:
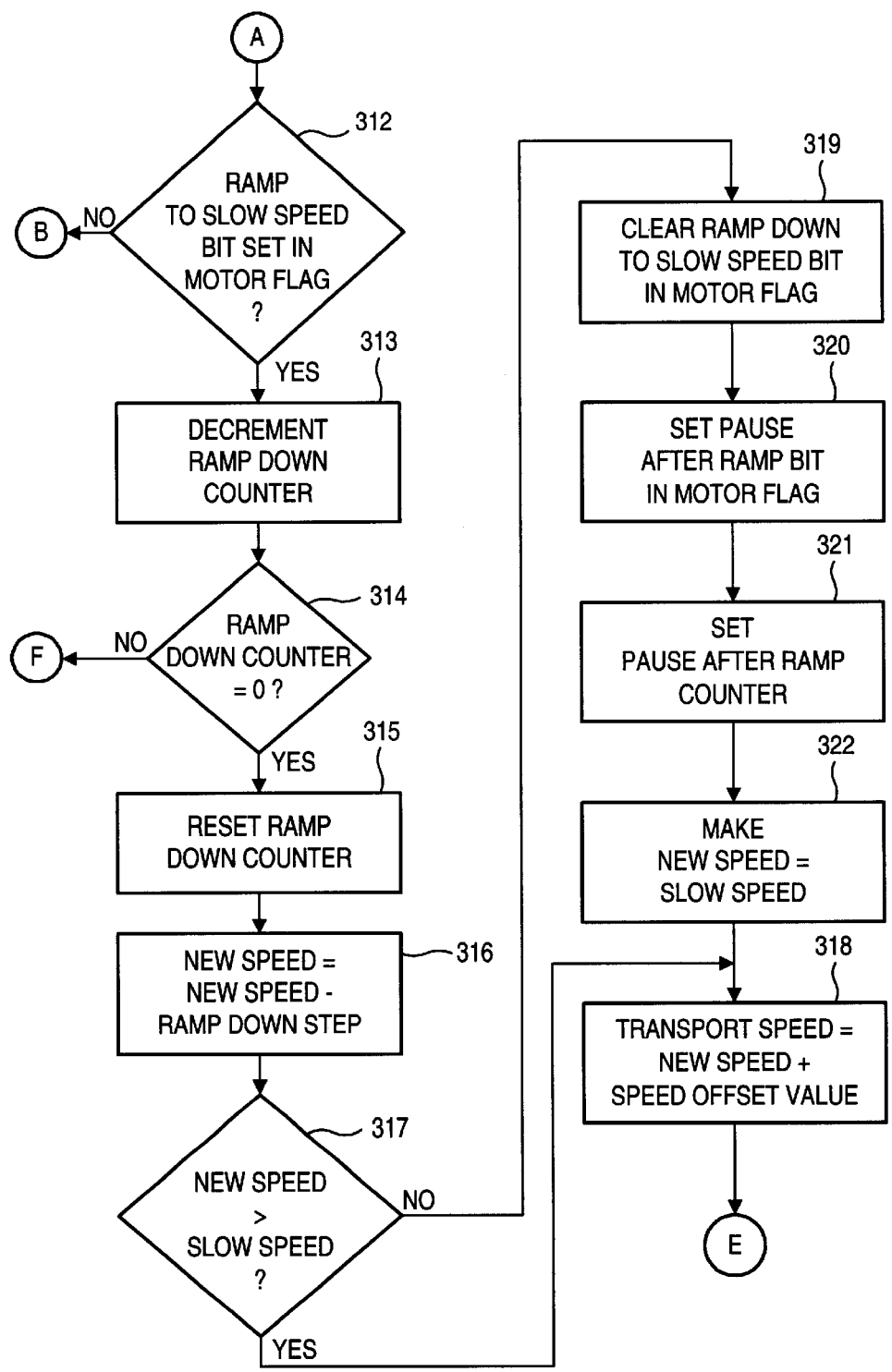
FIG. 32 is a flow chart illustrating the sequential procedure involved in a ramp-to-slow-speed routine for decreasing the transport speed of the bill transport mechanism from top speed to slow speed.

During normal counting, the bill transport mechanism 16 transports bills from the bill separating station 14 to the bill stacking unit at its top speed. In response to the optical scanhead 18 detecting a stranger, suspect or no call bill, however, the CPU 30 sets a ramp-to-slow-speed bit in the motor flag. Setting the ramp-to-slow-speed bit causes the CPU 30 to proceed beyond step 312 of the ramp-to-slow-speed routine in FIG. 32 on the next iteration of the software in FIGS. 31–35. Using the ramp-to-slow-speed routine in FIG. 32, the CPU 30 causes the bill transport mechanism 16 to controllably decelerate or "ramp down" from its top speed to a slow speed. As the ramp-to-slow speed routine in FIG. 32 is similar to the ramp-up routine in FIG. 31, it is not described in detail herein.

It suffices to state that if the ramp-to-slow-speed bit is set in the motor flag, the CPU 30 decrements a ramp-down counter (step 313) and determines whether or not the ramp-down counter is equal to zero (step 314). If the ramp-down counter is not equal to zero, the CPU 30 exits the speed control software in FIGS. 31–35 and repeats steps 312, 313, and 314 of the ramp-to-slow-speed routine in FIG. 32 during subsequent iterations of the speed control software until the ramp-down counter is equal to zero. Once the ramp-down counter is equal to zero, the CPU 30 resets the ramp-down counter to its maximum value (step 315) and subtracts a "ramp-down step" from the variable parameter "new speed" (step 316). The "new speed" is equal to the fixed parameter "full speed" prior to initiating the ramp-to-slow-speed routine in FIG. 32.

After subtracting the "ramp-down step" from the "new speed", the "new speed" is compared to a fixed parameter "slow speed" (step 317). If the "new speed" is greater than the "slow speed", the "transport speed" is set equal to the "new speed" plus the "speed offset value" (step 318) and this "transport speed" is output to the bill transport mechanism 16 (step 307 of FIG. 31). During subsequent iterations of the ramp-to-slow-speed routine, the CPU 30 continues to decrement the "new speed" by the "ramp-down step" until the "new speed" is less than or equal to the "slow speed". Once the "new speed" is less than or equal to the "slow speed" at step 317, the CPU 30 clears the ramp-to-slow-speed bit in the motor flag (step 319), sets the pause-after-ramp bit in the motor flag (step 320), sets the pause-after-ramp counter (step 321), and sets the "new speed" equal to the "slow speed" (step 322). Finally, the "transport speed" is set equal to the "new speed" plus the "speed offset value" (step 318). Since the "new speed" is equal to the "slow speed", outputting the "transport speed" to the bill transport mechanism 16 causes the bill transport mechanism 16 to operate at its slow speed. The ramp-to-slow-speed routine in FIG. 32 smoothly decreases the speed of the bill transport mechanism 16 without causing jerking or motor spikes.

Figure 33:
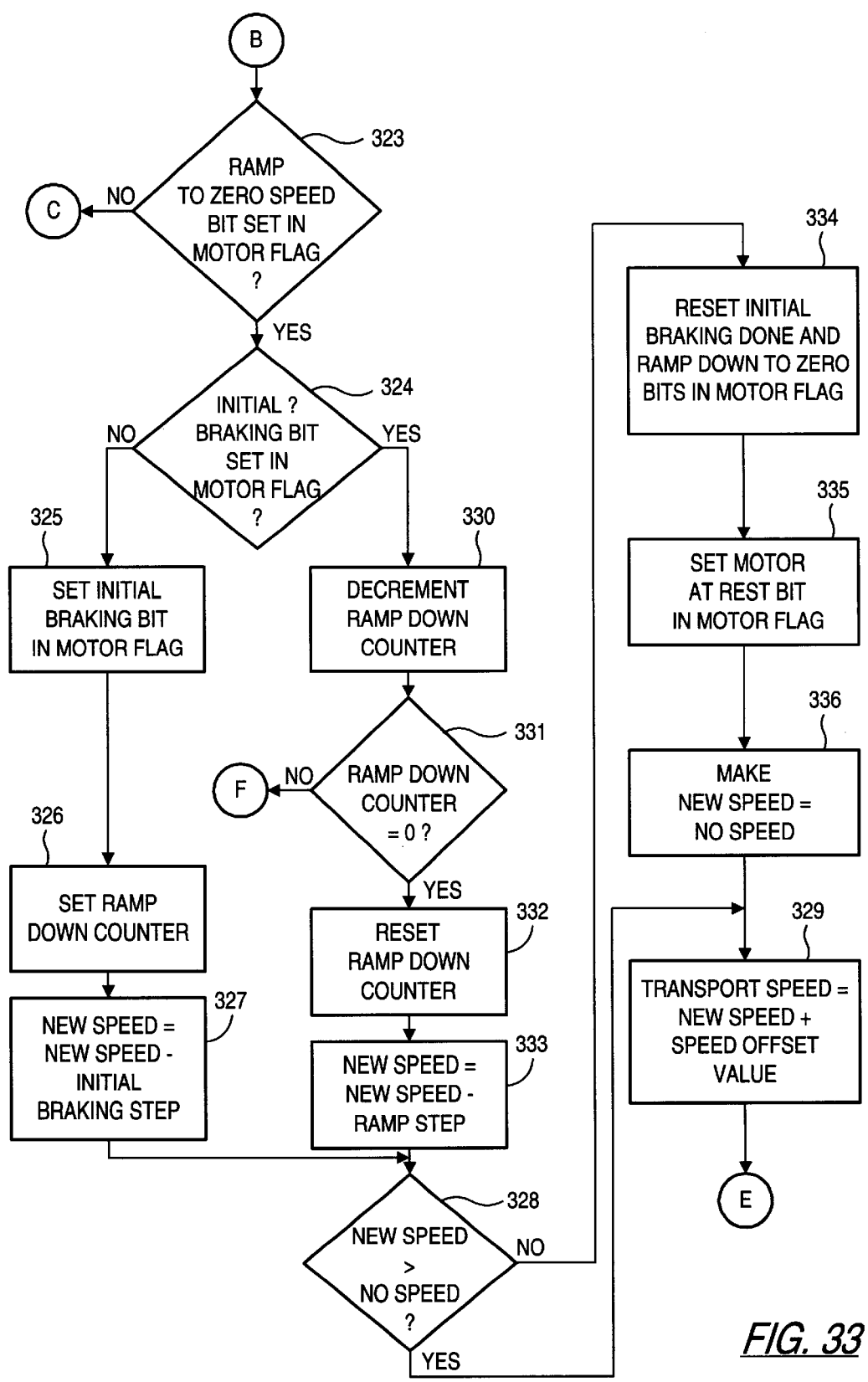
FIG. 33 is a flow chart illustrating the sequential procedure involved in a ramp-to-zero-speed routine for decreasing the transport speed of the bill transport mechanism to zero.

FIG. 33 depicts a ramp-to-zero-speed routine in which the CPU 30 ramps down the transport speed of the bill transport mechanism 16 to zero either from its top speed or its slow speed. In response to completion of counting of a stack of bills, the CPU 30 enters this routine to ramp down the transport speed of the bill transport mechanism 16 from its top speed to zero. Similarly, in response to the optical scanhead 18 detecting a stranger, suspect, or no call bill and the ramp-to-slow-speed routine in FIG. 32 causing the transport speed to be equal to a slow speed, the CPU 30 enters the ramp-to-zero-speed routine to ramp down the transport speed from the slow speed to zero.

With the ramp-to-zero-speed bit set at step 323, the CPU 30 determines whether or not an initial-braking bit is set in the motor flag (step 324). Prior to ramping down the transport speed of the bill transport mechanism 16, the initial-braking bit is clear. Therefore, flow proceeds to the left branch of the ramp-to-zero-speed routine in FIG. 33. In this left branch, the CPU 30 sets the initial-braking bit in the motor flag (step 325), resets the ramp-down counter to its maximum value (step 326), and subtracts an "initial-braking step" from the variable parameter "new speed" (step 327). Next, the CPU 30 determines whether or not the "new speed" is greater than zero (step 328). If the "new speed" is greater than zero at step 328, the variable parameter "transport speed" is set equal to the "new speed" plus the "speed offset value" (step 329) and this "transport speed" is output to the bill transport mechanism 16 at step 307 in FIG. 31.

During the next iteration of the ramp-to-zero-speed routine in FIG. 33, the CPU 30 enters the right branch of the routine at step 324 because the initial-braking bit was set during the previous iteration of the ramp-to-zero-speed routine. With the initial-braking bit set, the CPU 30 decrements the ramp-down counter from its maximum value (step 330) and determines whether or not the ramp-down counter is equal to zero (step 331). If the ramp-down counter is not equal to zero, the CPU 30 immediately exits the speed control software in FIGS. 31–35 and repeats steps 323, 324, 330, and 331 of the ramp-to-slow-speed routine during subsequent iterations of the speed control software until the ramp-down counter is equal to zero. Once the ramp-down counter is equal to zero, the CPU 30 resets the ramp-down counter to its maximum value (step 332) and subtracts a "ramp-down step" from the variable parameter "new speed" (step 333). This "ramp-down step" is smaller than the "initial-braking step" so that the "initial-braking step" causes a larger decremental change in the transport speed of the bill transport mechanism 16 than that caused by the "ramp-down step".

Next, the CPU 30 determines whether or not the "new speed" is greater than zero (step 328). If the "new speed" is greater than zero, the "transport speed" is set equal to the "new speed" plus the "speed offset value" (step 329) and this "transport speed" is outputted to the bill transport mechanism 16 (step 307 in FIG. 31). During subsequent iterations of the speed control software, the CPU 30 continues to decrement the "new speed" by the "ramp-down step" at step 333 until the "new speed" is less than or equal to zero at step 328. Once the "new speed" is less than or equal to the zero at step 328, the CPU 30 clears the ramp-to-zero-speed bit and the initial-braking bit in the motor flag (step 334), sets a motor-at-rest bit in the motor flag (step 335), and sets the "new speed" equal to zero (step 336). Finally, the "transport speed" is set equal to the "new speed" plus the "speed offset value" (step 329). Since the "new speed" is equal to zero, outputting the "transport speed" to the bill transport mechanism 16 at step 307 in FIG. 31 halts the bill transport mechanism 16.

Figure 34:
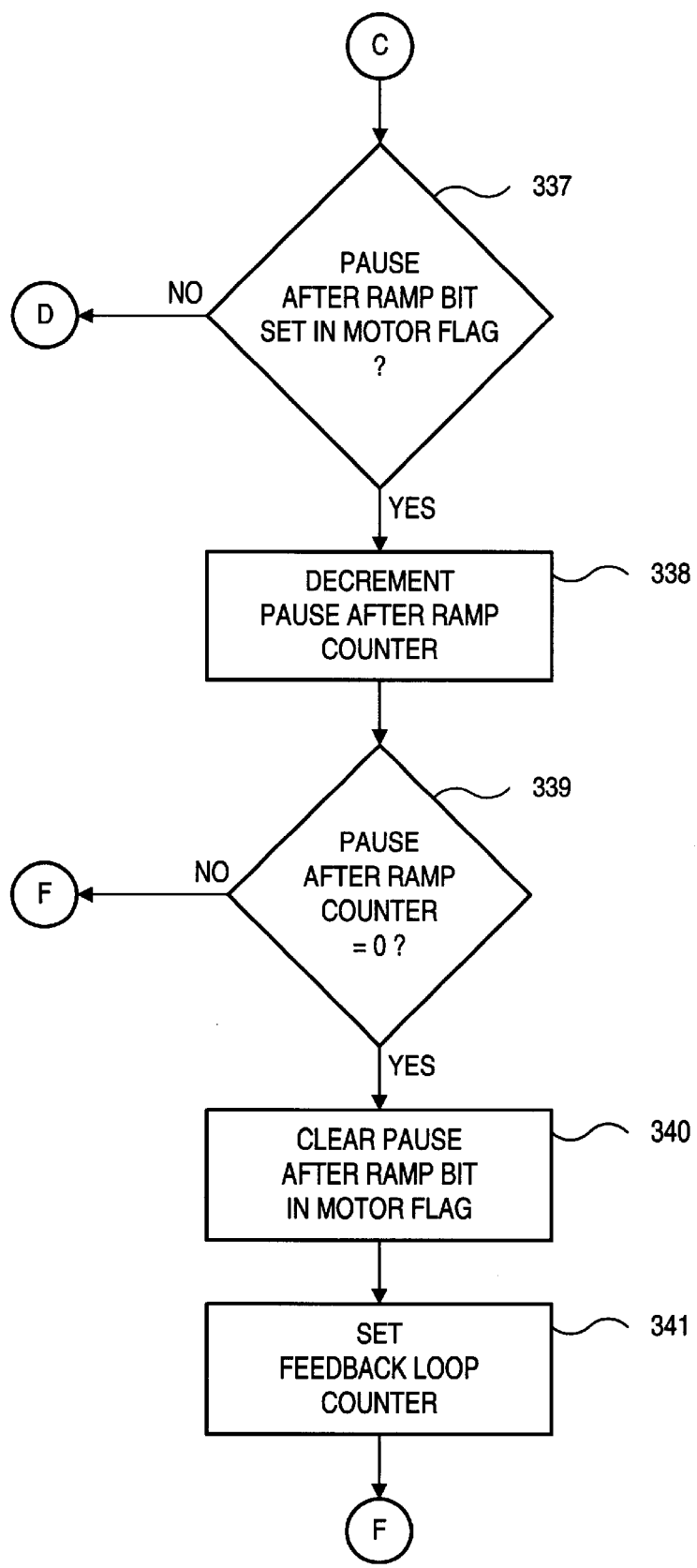
FIG. 34 is a flow chart illustrating the sequential procedure involved in a pause-after-ramp routine for delaying the feedback loop while the bill transport mechanism changes speeds.
Figure 35:
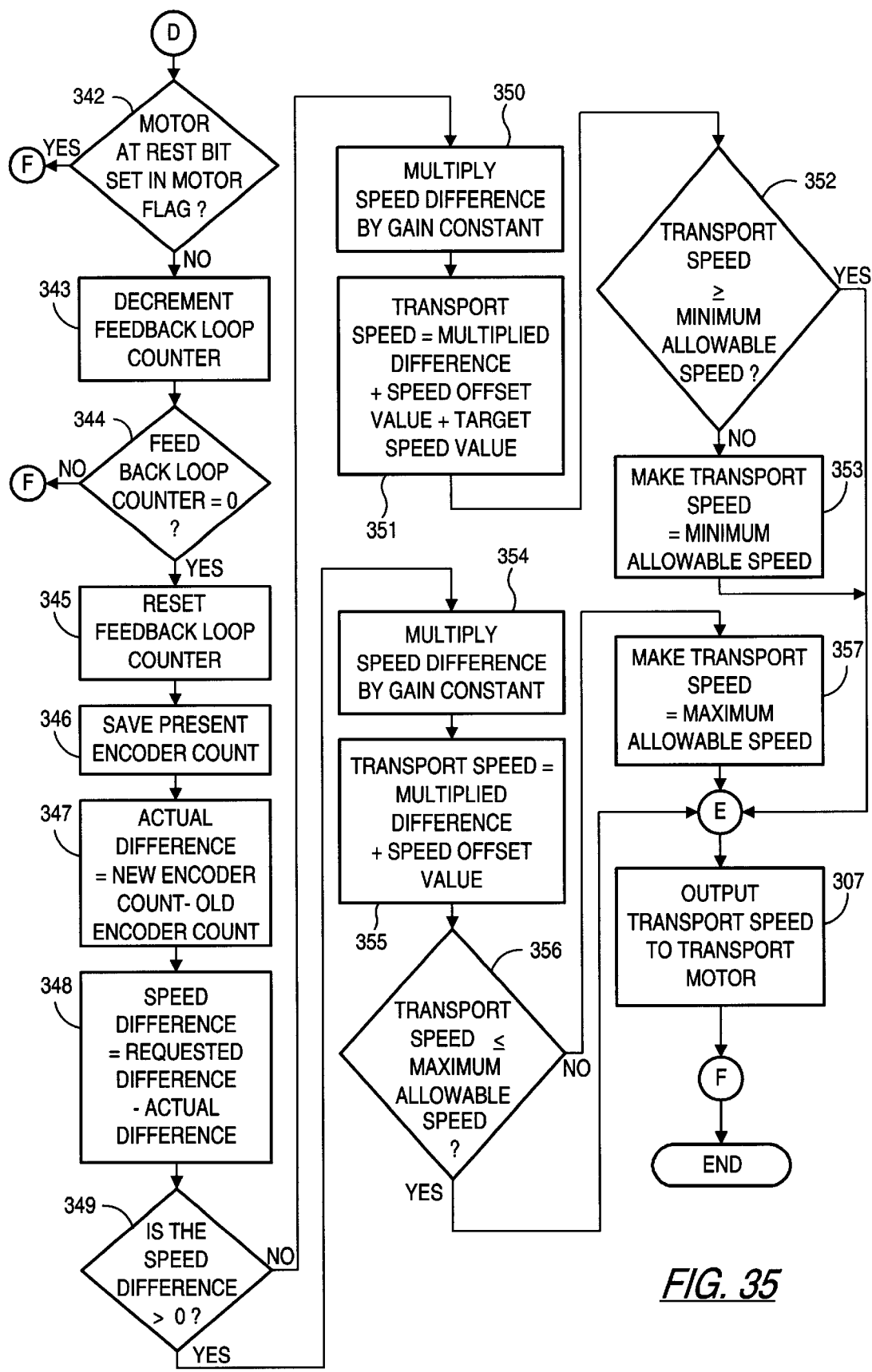
FIG. 35 is a flow chart illustrating the sequential procedure involved in a feedback loop routine for monitoring and stabilizing the transport speed of the bill transport mechanism.

Using the feedback loop routine in FIG. 35, the CPU 30 monitors and stabilizes the transport speed of the bill transport mechanism 16 when the bill transport mechanism 16 is operating at its top speed or at slow speed. To measure the transport speed of the bill transport mechanism 16, the CPU 30 monitors the optical encoder 32. While monitoring the optical encoder 32, it is important to synchronize the feedback loop routine with any transport speed changes of the bill transport mechanism 16. To account for the time lag between execution of the ramp-up or ramp-to-slow-speed routes in FIGS. 31–32 and the actual change in the transport speed of the bill transport mechanism 16, the CPU 30 enters a pause-after-ramp routine in FIG. 34 prior to entering the feedback loop routine in FIG. 35 if the bill transport mechanism 16 completed ramping up to its top speed or ramping down to slow speed during the previous iteration of the speed control software in FIGS. 31–35.

The pause-after-ramp routine in FIG. 34 allows the bill transport mechanism 16 to "catch up" to the CPU 30 so that the CPU 30 does not enter the feedback loop routine in FIG. 35 prior to the bill transport mechanism 16 changing speeds. As stated previously, the CPU 30 sets a pause-after-ramp bit during step 309 of the ramp-up routine in FIG. 31 or step 320 of the ramp-to-slow-speed routine in FIG. 32. With the pause-after-ramp bit set, flow proceeds from step 337 of the pause-after-ramp routine to step 338, where the CPU 30 decrements a pause-after-ramp counter from its maximum value. If the pause-after-ramp counter is not equal to zero at step 339, the CPU 30 exits the pause-after-ramp routine in FIG. 34 and repeats steps 337, 338, and 339 of the pause-after-ramp routine during subsequent iterations of the speed control software until the pause-after-ramp counter is equal to zero. Once the pause-after-ramp counter decrements to zero, the CPU 30 clears the pause-after-ramp bit in the motor flag (step 340) and sets the feedback loop counter to its maximum value (step 341). The maximum value of the pause-after-ramp counter is selected to delay the CPU 30 by an amount of time sufficient to permit the bill transport mechanism 16 to adjust to a new transport speed prior to the CPU 30 monitoring the new transport speed with the feedback loop routine in FIG. 35.

Referring now to the feedback loop routine in FIG. 35, if the motor-at-rest bit in the motor flag is not set at step 342, the CPU 30 decrements a feedback loop counter from its maximum value (step 343). If the feedback loop counter is not equal to zero at step 344, the CPU 30 immediately exits the feedback loop routine in FIG. 35 and repeats steps 342, 343, and 344 of the feedback loop routine during subsequent iterations of the speed control software in FIGS. 31–36 until the feedback loop counter is equal to zero. Once the feedback loop counter is decremented to zero, the CPU 30 resets the feedback loop counter to its maximum value (step 345), stores the present count of the optical encoder 32 (step 346), and calculates a variable parameter "actual difference" between the present count and a previous count of the optical encoder 32 (step 347). The "actual difference" between the present and previous encoder counts represents the transport speed of the bill transport mechanism 16. The larger the "actual difference" between the present and previous encoder counts, the greater the transport speed of the bill transport mechanism. The CPU 30 subtracts the "actual difference" from a fixed parameter "requested difference" to obtain a variable parameter "speed difference" (step 348).

If the "speed difference" is greater than zero at step 349, the bill transport speed of the bill transport mechanism 16 is too slow. To counteract slower than ideal bill transport speeds, the CPU 30 multiplies the "speed difference" by a "gain constant" (step 354) and sets the variable parameter "transport speed" equal to the multiplied difference from step 354 plus the "speed offset value" plus a fixed parameter "target speed" (step 355). The "target speed" is a value that, when added to the "speed offset value", produces the ideal transport speed. The calculated "transport speed" is greater than this ideal transport speed by the amount of the multiplied difference. If the calculated "transport speed" is nonetheless less than or equal to a fixed parameter "maximum allowable speed" at step 356, the calculated "transport speed" is output to the bill transport mechanism 16 at step 307 so that the bill transport mechanism 16 operates at the calculated "transport speed". If, however, the calculated "transport speed" is greater than the "maximum allowable speed" at step 356, the parameter "transport speed" is set equal to the "maximum allowable speed" (step 357) and is output to the bill transport mechanism 16 (step 307).

If the "speed difference" is less than or equal to zero at step 349, the bill transport speed of the bill transport mechanism 16 is too fast or is ideal. To counteract faster than ideal bill transport speeds, the CPU 30 multiplies the "speed difference" by a "gain constant" (step 350) and sets the variable parameter "transport speed" equal to the multiplied difference from step 350 plus the "speed offset value" plus a fixed parameter "target speed" (step 351). The calculated "transport speed" is less than this ideal transport speed by the amount of the multiplied difference. If the calculated "transport speed" is nonetheless greater than or equal to a fixed parameter "minimum allowable speed" at step 352, the calculated "transport speed" is output to the bill transport mechanism 16 at step 307 so that the bill transport mechanism 16 operates at the calculated "transport speed". If, however, the calculated "transport speed" is less than the "minimum allowable speed" at step 352, the parameter "transport speed" is set equal to the "minimum allowable speed" (step 353) and is output to the bill transport mechanism 16 (step 307).

It should be apparent that the smaller the value of the "gain constant", the smaller the variations of the bill transport speed between successive iterations of the feedback control routine in FIG. 35 and, accordingly, the less quickly the bill transport speed is adjusted toward the ideal transport speed. Despite these slower adjustments in the bill transport speed, it is generally preferred to use a relatively small "gain constant" to prevent abrupt fluctuations in the bill transport speed and to prevent overshooting the ideal bill transport speed.

Figure 36:
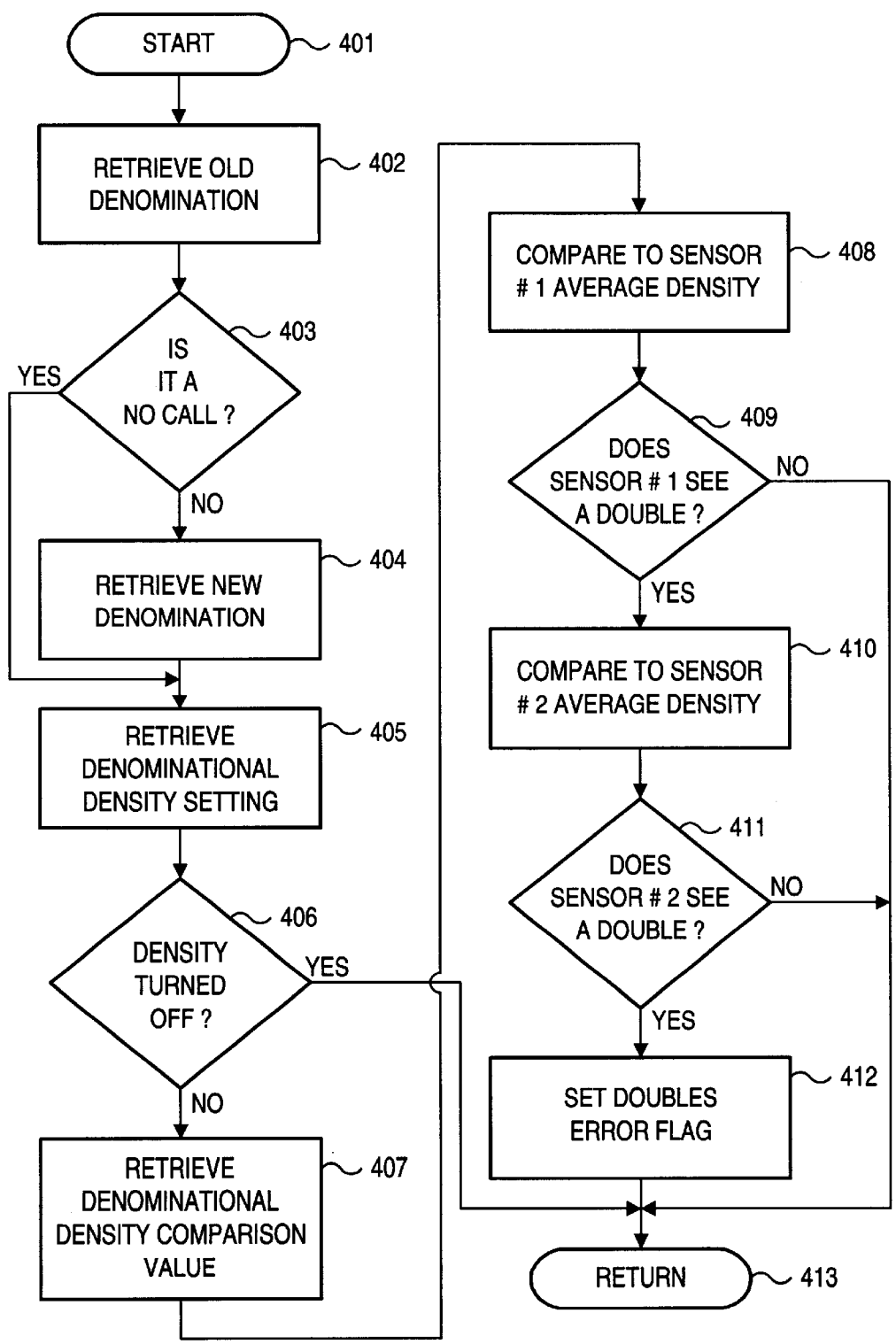
FIG. 36 is a flow chart illustrating the sequential procedure involved in a doubles detection routine for detecting overlapped bills.

A routine for using the outputs of the two photosensors PS1 and PS2 to detect any doubling or overlapping of bills is illustrated in FIG. 36 by sensing the optical density of each bill as it is scanned. This routine starts at step 401 and retrieves the denomination determined for the previously scanned bill at step 402 This previously determined denomination is used for detecting doubles in the event that the newly scanned bill is a "no call", as described below. Step 403 determines whether the current bill is a "no call," and if the answer is negative, the denomination determined for the new bill is retrieved at step 404.

If the answer at step 403 is affirmative, the system jumps to step 405, so that the previous denomination retrieved at step 402 is used in subsequent steps. To permit variations in the sensitivity of the density measurement, a "density setting" is retrieved from memory at step 405. The operator makes this choice manually, according to whether the bills being scanned are new bills, requiring a high degree of sensitivity, or used bills, requiring a lower level of sensitivity. If the "density setting" has been turned off, this condition is sensed at step 406, and the system returns to the main program at step 413. If the "density setting" is not turned off, a denominational density comparison value is retrieved from memory at step 407.

According to one embodiment, the memory contains five different density values (for five different density settings, i.e., degrees of sensitivity) for each denomination. Thus, for a currency set containing seven different denominations, the memory contains 35 different values. The denomination retrieved at step 404 (or step 402 in the event of a "no call"), and the density setting retrieved at step 405, determine which of the 35 stored values is retrieved at step 407 for use in the comparison steps described below.

At step 408, the density comparison value retrieved at step 407 is compared to the average density represented by the output of the photosensor PS1. The result of this comparison is evaluated at step 409 to determine whether the output of sensor S1 identifies a doubling of bills for the particular denomination of bill determined at step 402 or 404. If the answer is negative, the system returns to the main program at step 413. If the answer is affirmative, step 410 then compares the retrieved density comparison value to the average density represented by the output of the second sensor PS2. The result of this comparison is evaluated at step 411 to determine whether the output of the photosensor PS2 identifies a doubling of bills. Affirmative answers at both step 409 and step 411 result in the setting of a "doubles error" flag at step 412, and the system then returns to the main program at step 413. The "doubles error" flag can, of course, be used to stop the bill transport motor.

Figure 37:
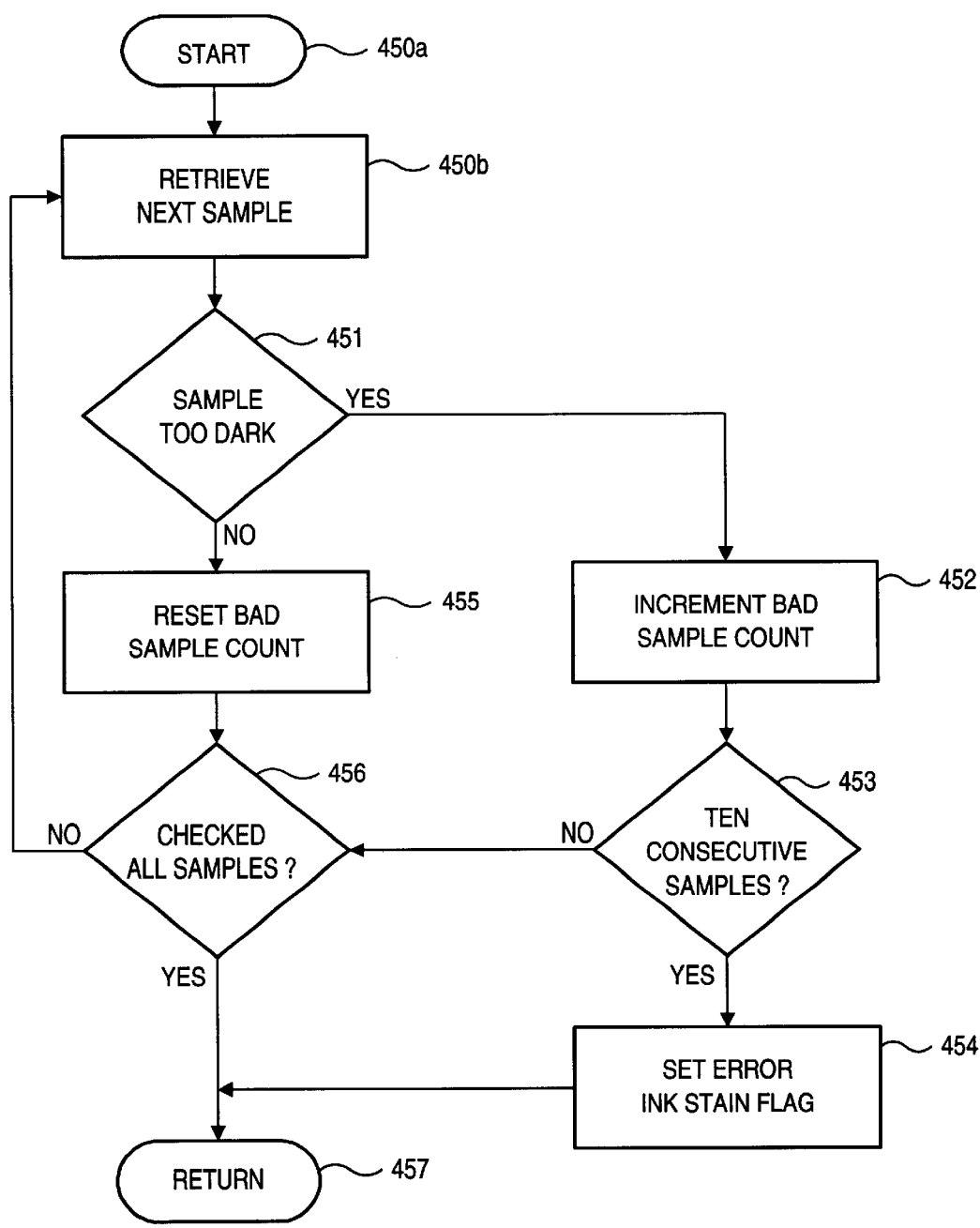
FIG. 37 is a flow chart illustrating the sequential procedure involved in a routine for detecting sample data representing dark blemishes on a bill.

FIG. 37 illustrates a routine that enables the system to detect bills which have been badly defaced by dark marks such as ink blotches, felt-tip pen marks and the like. Such severe defacing of a bill can result in such distorted scan data that the data can be interpreted to indicate the wrong denomination for the bill. Consequently, it is desirable to detect such severely defaced bills and then stop the bill transport mechanism so that the bill in question can be examined by the operator.

The routine of FIG. 37 retrieves each successive data sample at step 450b and then advances to step 451 to determine whether that sample is too dark. As described above, the output voltage from the photodetector 26 decreases as the darkness of the scanned area increases. Thus, the lower the output voltage from the photodetector, the darker the scanned area. For the evaluation carried out at step 451, a preselected threshold level for the photodetector output voltage, such as a threshold level of about 1 volt, is used to designate a sample that is "too dark."

An affirmative answer at step 451 advances the system to step 452 where a "bad sample" count is incremented by one. A single sample that is too dark is not enough to designate the bill as seriously defaced. Thus, the "bad sample" count is used to determine when a preselected number of consecutive samples, e.g., ten consecutive samples, are determined to be too dark. From step 452, the system advances to step 453 to determine whether ten consecutive bad samples have been received. If the answer is affirmative, the system advances to step 454 where an error flag is set. This represents a "no call" condition, which causes the bill transport system to be stopped in the same manner discussed above.

When a negative response is obtained at step 451, the system advances to step 455 where the "bad sample" count is reset to zero, so that this count always represents the number of consecutive bad samples received. From step 455 the system advances to step 456 which determines when all the samples for a given bill have been checked. As long as step 456 yields a negative answer, the system continues to retrieve successive samples at step 450b. When an affirmative answer is produced at step 456, the system returns to the main program at step 457.

Figure 38:
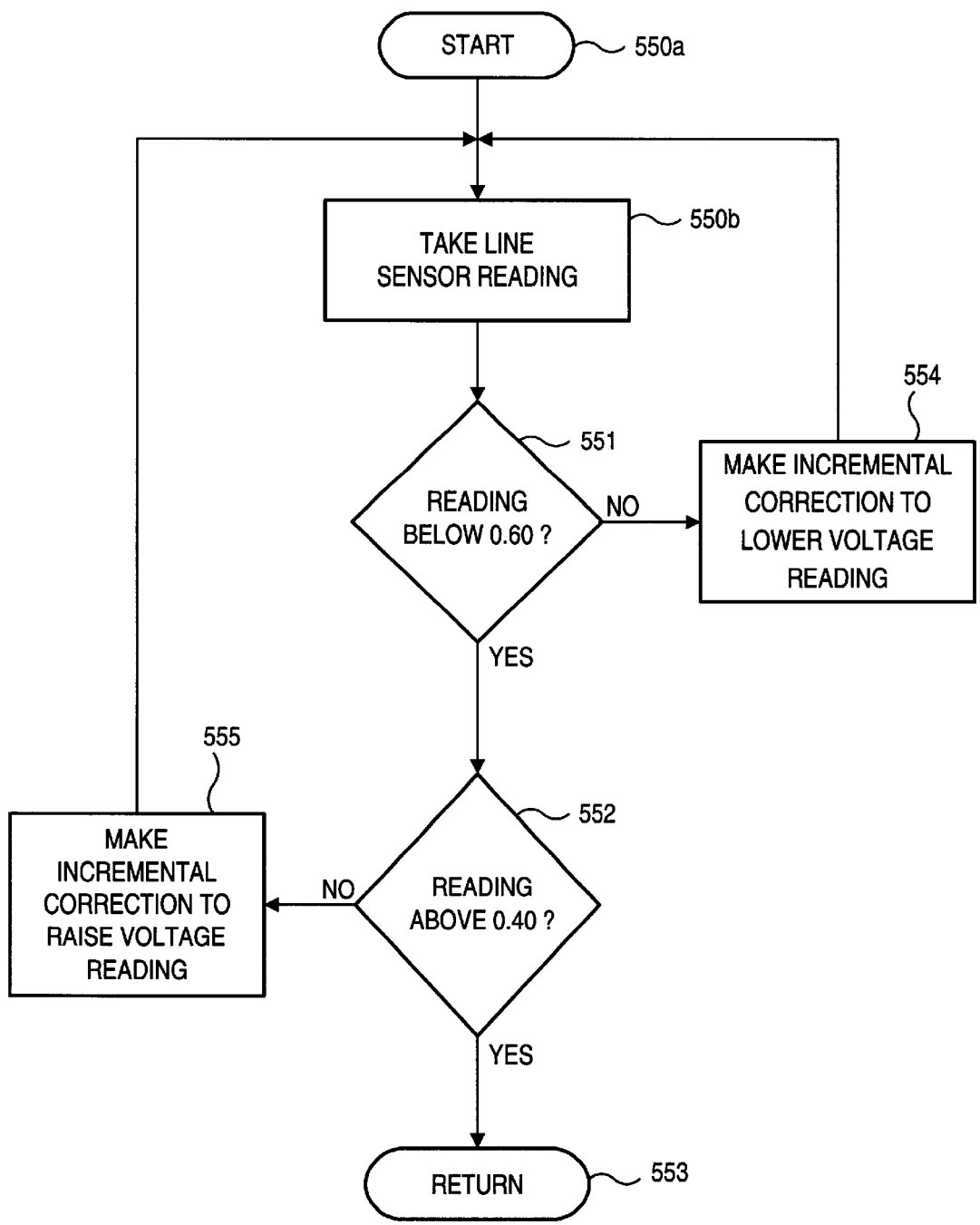
FIG. 38 is a flow chart illustrating the sequential procedure involved in a routine for maintaining a desired readhead voltage level.

A routine for automatically monitoring and making any necessary corrections in various line voltages is illustrated in FIG. 38. This routine is useful in automatically compensating for voltage drifts due to temperature changes, aging of components and the like. The routine starts at step 550 and reads the output of a line sensor which is monitoring a selected voltage at step 550b. Step 551 determines whether the reading is below 0.60, and if the answer is affirmative, step 552 determines whether the reading is above 0.40. If step 552 also produces an affirmative response, the voltage is within the required range and thus the system returns to the main program step 553. If step 551 produces a negative response, an incremental correction is made at step 554 to reduce the voltage in an attempt to return it to the desired range. Similarly, if a negative response is obtained at step 552, an incremental correction is made at step 555 to increase the voltage toward the desired range.

Figure 39:
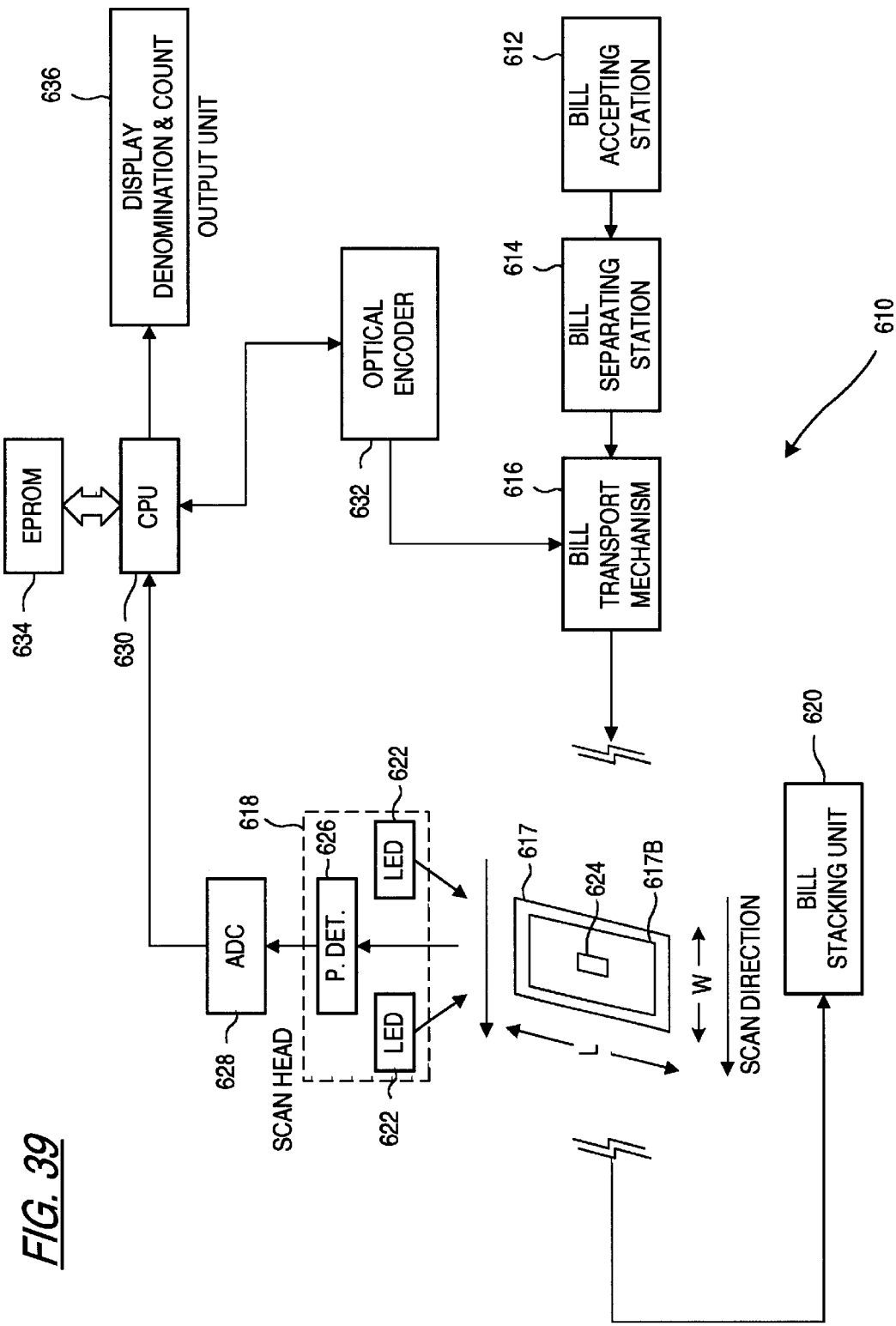
FIG. 39 is a functional block diagram illustrating the conceptual basis for the optical sensing and correlation method and apparatus, according to one embodiment of a system according to the present invention.

Referring now to FIG. 39, there is shown a functional block diagram illustrating the optical sensing and correlation system according to this invention. The system 610 includes a bill accepting station 612 where stacks of currency bills that need to be identified and counted are positioned. Accepted bills are acted upon by a bill separating station 614 which functions to pick out or separate one bill at a time for being sequentially relayed by a bill transport mechanism 616, according to a precisely predetermined transport path, across a pair of optical scanheads 618 (only one is illustrated in FIG. 39) where the currency denomination of the bill is scanned, identified, and counted at a rate in excess of 800 bills per minute. The scanned bill is then transported to a bill stacking station 620 where bills so processed are stacked for subsequent removal.

Figure 44A:
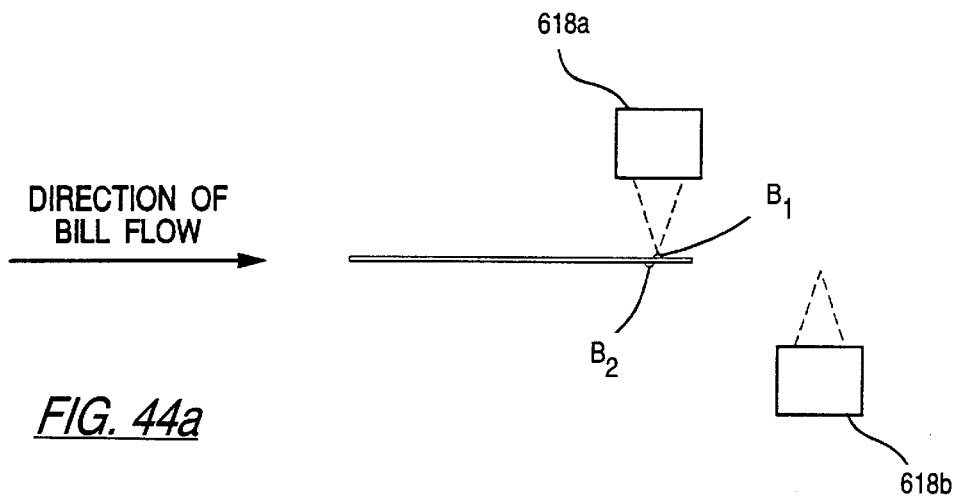
FIG. 44a is a side elevation showing the first surface of a bill scanned by an upper scanhead and the second surface of the bill scanned by a lower scanhead.
Figure 44B:
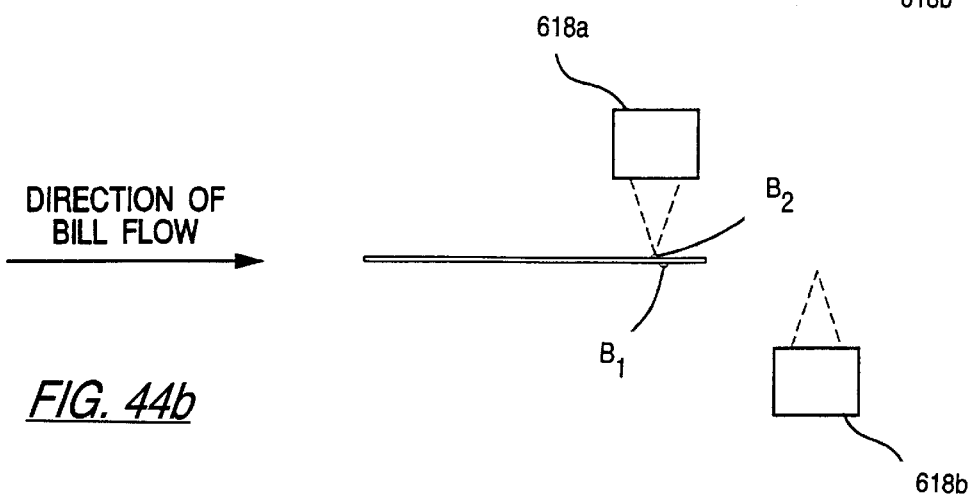
FIG. 44b is a side elevation showing the first surface of a bill scanned by a lower scanhead and the second surface of the bill scanned by an upper scanhead.

The pair of optical scanheads 618 are disposed on opposite sides of the transport path to permit optical scanning of both opposing surfaces of a bill (see FIGS. 44a and 44b). With respect to United States currency, these opposing surfaces correspond to the black and green surfaces of a bill. While FIG. 39 only illustrates a single scanhead 618, it should be understood that another scanhead is substantially identical in construction to the illustrated scanhead. Each optical scanhead 618 comprises at least one light source 622 directing a beam of coherent light onto the bill transport path so as to illuminate a substantially rectangular light strip 624 upon a currency bill 617 positioned on the transport path adjacent the scanhead 618. One of the optical scanheads 618 (the "upper" scanhead 618A in FIG. 44) is positioned above the transport path and illuminates a light strip upon a first surface of the bill, while the other of the optical scanheads 618 (the "lower" scanhead 618B in FIG. 44) is positioned below the transport path and illuminates a light strip upon the second surface of the bill. The surface of the bill scanned by each scanhead 618 is determined by the orientation of the bill relative to the scanheads 618. The upper scanhead 618A is located slightly upstream relative to the lower scanhead 618B. Light reflected off the illuminated strip 624 is sensed by a photodetector 626 positioned directly adjacent the strip.

The photodetector of the upper scanhead 618A produces a first analog output corresponding to the first surface of the bill, while the photodetector of the lower scanhead 618B produces a second analog output corresponding to the second surface of the bill. The first and second analog outputs are converted into respective first and second digital outputs by means of respective analog-to-digital (ADC) convertor units 628 whose outputs are fed as digital inputs to a central processing unit (CPU) 630. As described in detail below, the CPU 630 uses the sequence of operations illustrated in FIG. 45 to determine which of the first and second digital outputs corresponds to the green surface of the bill, and then selects the "green" digital output for subsequent correlation to a series of master characteristic patterns stored in EPROM 634. As explained below, the master characteristic patterns, according to one embodiment, are generated by performing scans on the green surfaces, not black surfaces, of bills of different denominations. The analog output corresponding to the black surface of the bill is not used for subsequent correlation.

The bill transport path is defined in such a way that the transport mechanism 616 moves currency bills with the narrow dimension "W" of the bills being parallel to the transport path and the scan direction. Thus, as a bill 617 moves on the transport path across each scanhead 618, the coherent light strip 624 effectively scans the bill across the narrow dimension "W" of the bill. According to one embodiment, the transport path is so arranged that a currency bill 617 is scanned approximately about the central section of the bill along its narrow dimension, as best shown in FIG. 39. Each scanhead 618 functions to detect light reflected from the respective surface of the bill as it moves across the illuminated light strip 624 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system of this invention is programmed to handle. In an alternative embodiment, the bills are moved with the wide dimension "L" of the bills positioned parallel to the transport path and the scan direction.

The analog outputs of the photodetectors 626 of each scanhead 618 are digitized under control of the CPU 630 to yield first and second digital outputs corresponding to the respective scanheads 618 with each digital output containing a fixed number of digital reflectance data samples. After selecting the digital output corresponding to the green surface of the bill, the data samples are subjected to a digitizing process which includes a normalizing routine for processing the sampled data for improved correlation and for smoothing out variations due to "contrast" fluctuations in the printed pattern existing on the bill surface. The normalized reflectance data so digitized represents a characteristic pattern that is fairly unique for a given bill denomination and provides sufficient distinguishing features between characteristic patterns for different currency denominations. This process is more fully explained in U.S. application Ser. No. 07/885,648, filed on May 19, 1992 and entitled "Method and Apparatus for Currency Discrimination and Counting," which is incorporated herein by reference in its entirety.

In order to ensure strict correspondence between reflectance samples obtained by narrow dimension scanning of successive bills, the initiation of the reflectance sampling process is, according to one embodiment, controlled through the CPU 630 by means of an optical encoder 632 which is linked to the bill transport mechanism 616 and precisely tracks the physical movement of the bill 617 across the scanhead 618. More specifically, the optical encoder 632 is linked to the rotary motion of the drive motor which generates the movement imparted to the bill as it is relayed along the transport path. In addition, it is ensured that positive contact is maintained between the bill and the transport path, particularly when the bill is being scanned by each scanhead 618. Under these conditions, the optical encoder is capable of precisely tracking the movement of the bill relative to the light strip generated by each scanhead by monitoring the rotary motion of the drive motor.

The output of the photodetector 626 of each scanhead 618 is monitored by the CPU 630 to detect the starting point of the printed pattern on the bill, as represented by the thin borderline 617B which typically encloses the printed indicia on currency bills. The printed pattern on the black and green surfaces of the bill are each enclosed by respective thin borderlines 617B. Once the borderline 617B has been detected, the optical encoder 632 is used to control the timing and number of reflectance samples that are obtained from the output of the photodetector 626 of each scanhead 618 as the bill 617 moves across each scanhead 618 and is scanned along its narrow dimension.

The detection of the borderline constitutes an important step and realizes improved discrimination efficiency since the borderline serves as an absolute reference point for initiation of sampling. If the edge of a bill were to be used as a reference point, relative displacement of sampling points can occur because of the random manner in which the distance from the edge to the borderline varies from bill to bill due to the relatively large range of tolerances permitted during printing and cutting of currency bills. As a result, it becomes difficult to establish direct correspondence between sample points in successive bill scans and the discrimination efficiency is adversely affected.

The use of the optical encoder for controlling the sampling process relative to the physical movement of a bill across each scanhead is also advantageous in that the encoder can be used to provide a predetermined delay following detection of the borderline prior to initiation of samples. The encoder delay can be adjusted in such a way that the bill is scanned only across those segments along its narrow dimension which contain the most distinguishable printed indicia relative to the different currency denominations.

In the case of U.S. currency, for instance, it has been determined that the central, approximately two-inch portion of currency bills, as scanned across the central section of the narrow dimension of the bill, provides sufficient data for distinguishing among the various U.S. currency denominations on the basis of the correlation technique used in this invention. Accordingly, the optical encoder can be used to control the scanning process so that reflectance samples are taken for a set period of time and only after a certain period of time has elapsed since the borderline has been detected, thereby restricting the scanning to the desired central portion of the narrow dimension of the bill.

Figure 40:
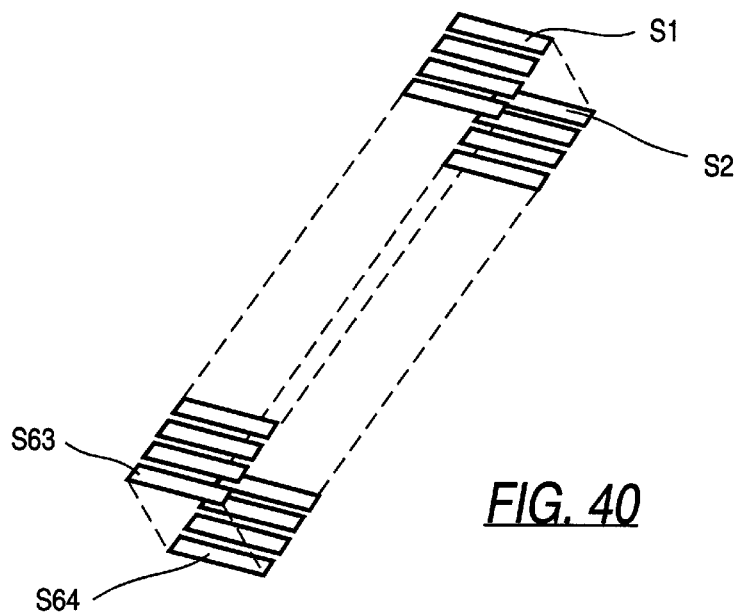
FIG. 40 is a diagrammatic perspective illustration of the successive areas of a surface scanned during the traversing movement of a single bill across one of the two scanheads employed in one embodiment of the present invention.
Figure 41:
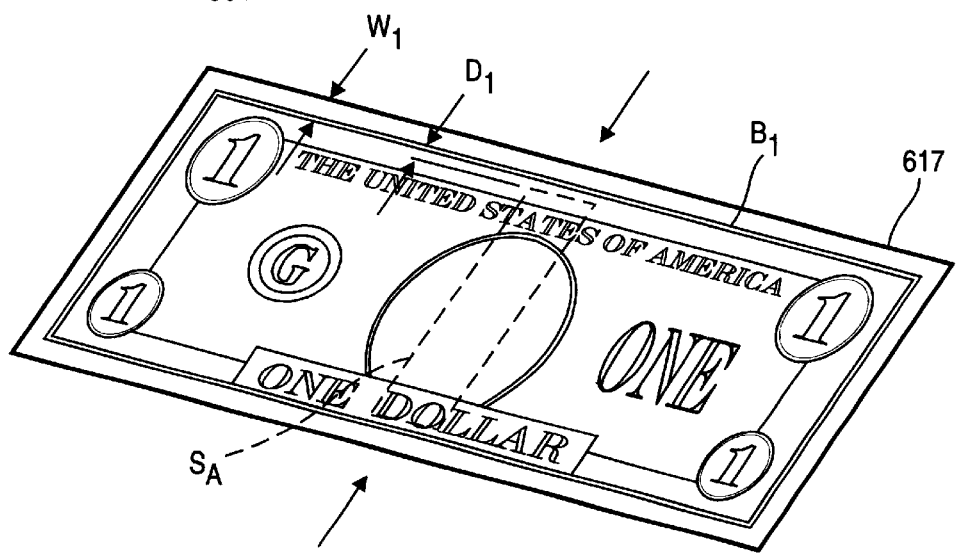
FIG. 41 is a perspective view of a bill showing an area of a first surface to be scanned by one of the two scanheads employed in an embodiment of the present invention.

FIGS. 40–43 illustrate the scanning process in more detail. As a bill is advanced in a direction parallel to the narrow edges of the bill, scanning via the wide slit of one of the scanheads is effected along a segment $S_A$ of the central portion of the black surface of the bill (FIG. 41). As previously stated, the orientation of the bill along the transport path determines whether the upper or lower scanhead scans the black surface of the bill. This segment $S_A$ begins a fixed distance $D_1$ inboard of the border line $B_1$, which is located a distance $W_1$ from the edge of the bill. As the bill traverses the scanhead, a strip s of the segment $S_A$ is always illuminated, and the photodetector produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

Figure 43:
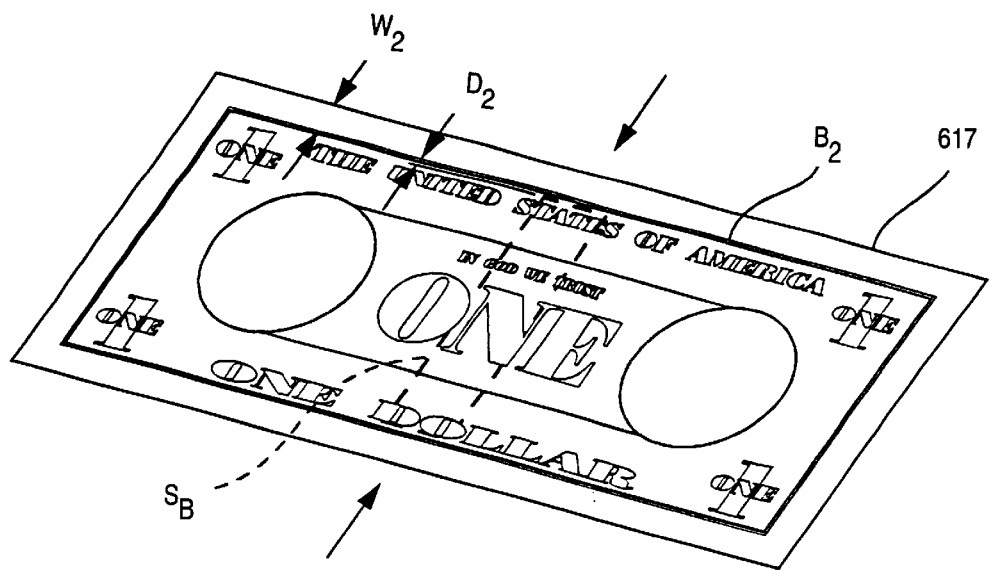
FIG. 43 is another perspective view of the bill in FIG. 41 showing the an area of a second surface to be scanned by the other of the scanheads employed in an embodiment of the present invention.

Similarly, the other of the two scanheads scans a segment $S_B$ of the central portion of the green surface of the bill (FIG. 43). The orientation of the bill along the transport path determines whether the upper or lower scanhead scans the green surface of the bill. This segment $S_B$ begins a fixed distance $D_2$ inboard of the border line $B_2$, which is located a distance $W_2$ from the edge of the bill. For U.S. currency, the distance $W_2$ on the green surface is greater than the distance $W_1$ on the black surface. It is this feature of U.S. currency which permits one to determine the orientation of the bill relative to the upper and lower scanheads 618, thereby permitting one to select only the data samples corresponding to the green surface for correlation to the master characteristic patterns in the EPROM 634. As the bill traverses the scanhead, a strip s of the segment $S_B$ is always illuminated, and the photodetector produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

Figure 42:
FIG. 42 is a diagrammatic side elevation of the scan areas illustrated in FIG. 40, to show the overlapping relationship of those areas.

As illustrated in FIGS. 40 and 42, the sampling intervals are selected so that the strips s that are illuminated for successive samples overlap one another. The odd-numbered and even-numbered sample strips have been separated in FIGS. 40 and 42 to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch wide at 0.029 inch intervals, along segments $S_A$ and $S_B$ that are each 1.83 inch long (64 samples).

The optical sensing and correlation technique is based upon using the above process to generate a series of master characteristic patterns using standard bills for each denomination of currency that is to be detected. According to one embodiment, two or four characteristic patterns are generated and stored within system memory, in the form of, for example, the EPROM 634 (see FIG. 39), for each detectable currency denomination. The characteristic patterns for each bill are generated from optical scans, performed on the green surface of the bill and taken along both the "forward" and "reverse" directions relative to the pattern printed on the bill.

In adapting this technique to U.S. currency, for example, characteristic patterns are generated and stored for seven different denominations of U.S. currency, i.e., $1, $2, $5, $10, $20, $50 and $100. Four characteristic patterns are generated for the $10 bill and the $2 bill, and two characteristic patterns are generated for each of the other denominations. Accordingly, a master set of 18 different characteristic patterns is stored within the system memory for subsequent correlation purposes. Once the master characteristic patterns have been stored, the digitized data samples (i.e., test pattern) corresponding to the green surface of a scanned bill are selected using the sequence of operations in FIG. 45 and are compared by the CPU 630 with each of the 18 pre-stored master characteristic patterns to generate, for each comparison, a correlation number representing the extent of correlation, i.e., similarity between corresponding ones of the plurality of data samples, for the patterns being compared.

The CPU 630 is programmed to identify the denomination of the scanned bill as corresponding to the stored characteristic pattern for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is required to be satisfied before a particular call is made, for at least certain denominations of bills. More specifically, the correlation procedure is adapted to identify the two highest correlation numbers resulting from the comparison of the test pattern to one of the stored patterns. At that point, a minimum threshold of correlation is required to be satisfied by the higher of these two correlation numbers. As a second threshold level, a minimum separation is prescribed between the two highest correlation numbers before making a call. This ensures that a positive call is made only when a test pattern does not correspond, within a given range of correlation, to more than one stored master pattern. If both of the foregoing two thresholds are satisfied, the CPU 630 positively identifies the denomination of the bill.

Using the above sensing and correlation approach, the CPU 630 is programmed to count the number of bills belonging to a particular currency denomination as part of a given set of bills that have been scanned for a given scan batch, and to determine the aggregate total of the currency amount represented by the bills scanned during a scan batch. The CPU 630 is also linked to an output unit 636 which is adapted to provide a display of the number of bills counted, the breakdown of the bills in terms of currency denomination, and the aggregate total of the currency value represented by counted bills. The output unit 636 can also be adapted to provide a print-out of the displayed information in a desired format.

Figure 45:
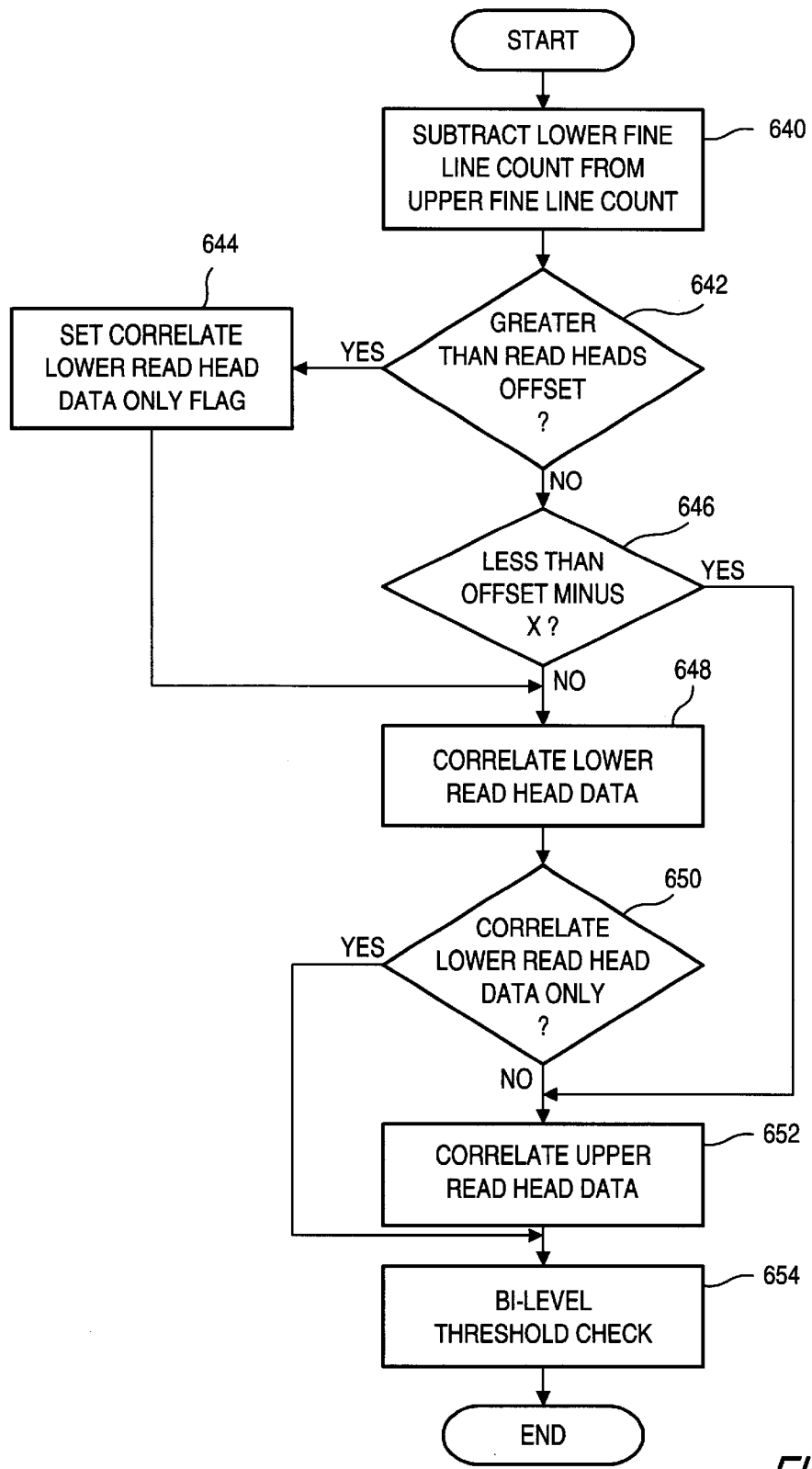
FIG. 45 is a flow chart illustrating the sequence of operations involved in determining the orientation of a bill relative to the upper and lower scanheads.

Referring now to FIGS. 44a, 44b, and 45, the CPU 630 is programmed with the sequence of operations in FIG. 45 to correlate only the test pattern corresponding to the green surface of a scanned bill. As shown in FIGS. 44a and 44b, the upper scanhead 618A is located upstream adjacent the bill transport path relative to the lower scanhead 618B. The distance between the scanheads 618A, 618B in a direction parallel to the transport path corresponds to a predetermined number of encoder counts. It should be understood that the encoder 632 produces a repetitive tracking signal synchronized with incremental movements of the bill transport mechanism, and this repetitive tracking signal has a repetitive sequence of counts (e.g., 65,535 counts) associated therewith. As a bill is scanned by the upper and lower scanheads 618A, 618B, the CPU 630 monitors the output of the upper scanhead 618A to detect the borderline of a first bill surface facing the upper scanhead 618A. Once this borderline of the first surface is detected, the CPU 630 retrieves and stores a first encoder count in memory. Similarly, the CPU 630 monitors the output of the lower scanhead 618B to detect the borderline of a second bill surface facing the lower scanhead 618B. Once the borderline of the second surface is detected, the CPU 630 retrieves and stores a second encoder count in memory.

Referring to FIG. 45, the CPU 630 is programmed to calculate the difference between the first and second encoder counts (step 640). If this difference is greater than the predetermined number of encoder counts corresponding to the distance between the scanheads 618A, 618B (step 642), the bill is oriented with its black surface facing the upper scanhead 618A and its green surface facing the lower scanhead 618B. This can best be understood by reference to FIG. 44a, which shows a bill with the foregoing orientation. In this situation, once the borderline $B_1$ of the black surface passes beneath the upper scanhead 618A and the first encoder count is stored, the borderline $B_2$ still must travel for a distance greater than the distance between the upper and lower scanheads 618A, 618B in order to pass over the lower scanhead 618B. As a result, the difference between the second encoder count associated with the borderline $B_2$ and the first encoder count associated with the borderline $B_1$ will be greater than the predetermined number of encoder counts corresponding to the distance between the scanheads 618A, 618B. With the bill oriented as in FIG. 44a, the CPU 630 sets a flag to indicate that the test pattern produced by the lower scanhead 618B should be correlated (step 644). Next, this test pattern is correlated with the master characteristic patterns stored in memory (step 648).

If at step 642 the difference between the first and second encoder counts is less than the predetermined number of encoder counts corresponding to the distance between the scanheads 618A, 618B, the CPU 630 is programmed to determine whether the difference between the first and second encoder counts is less than the predetermined number minus some safety number "X", e.g., 20 (step 646). If the answer is negative, the orientation of the bill relative to the scanheads 618A, 618B is uncertain so the CPU 630 is programmed to correlate the test patterns produced by both the upper and lower scanheads 618A, 618B with the master characteristic patterns stored in memory (steps 648, 650, and 652).

If the answer is affirmative, the bill is oriented with its green surface facing the upper scanhead 618A and its black surface facing the lower scanhead 618B. This can best be understood by reference to FIG. 44b, which shows a bill with the foregoing orientation. In this situation, once the borderline $B_2$ of the green surface passes beneath the upper scanhead 618A and the first encoder count is stored, the borderline $B_1$ must travel for a distance less than the distance between the upper and lower scanheads 618A, 618B in order to pass over the lower scanhead 618B. As a result, the difference between the second encoder count associated with the borderline $B_1$ and the first encoder count associated with the borderline $B_2$ should be less than the predetermined number of encoder counts corresponding to the distance between the scanheads 618A, 618B. To be on the safe side, it is required that the difference between first and second encoder counts be less than the predetermined number minus the safety number "X". Therefore, the CPU 630 is programmed to correlate the test pattern produced by the upper scanhead 618A (step 652).

After correlating the test pattern associated with either the upper scanhead 618A, the lower scanhead 618B, or both scanheads 618A, 618B, the CPU 630 is programmed to perform the bi-level threshold check described previously (step 654).

While the present invention has been described with reference to one or more particular embodiments, those skilled in the art will recognize that many changes may be made thereto without departing from the spirit and scope of the present invention. For example, the optical scanheads 618A, 618B may be substituted with scanheads which use magnetic sensing, conductivity sensing, capacitive sensing, or mechanical sensing. Each of these embodiments and obvious variations thereof is contemplated as falling within the spirit and scope of the claimed invention, which is set forth in the following claims.

Now that examples of currency scanners having one scanhead per side have been described in connection with scanning U.S. currency, currency discrimination systems of the present invention employing multiple scanheads per side will be described.

Figure 46:
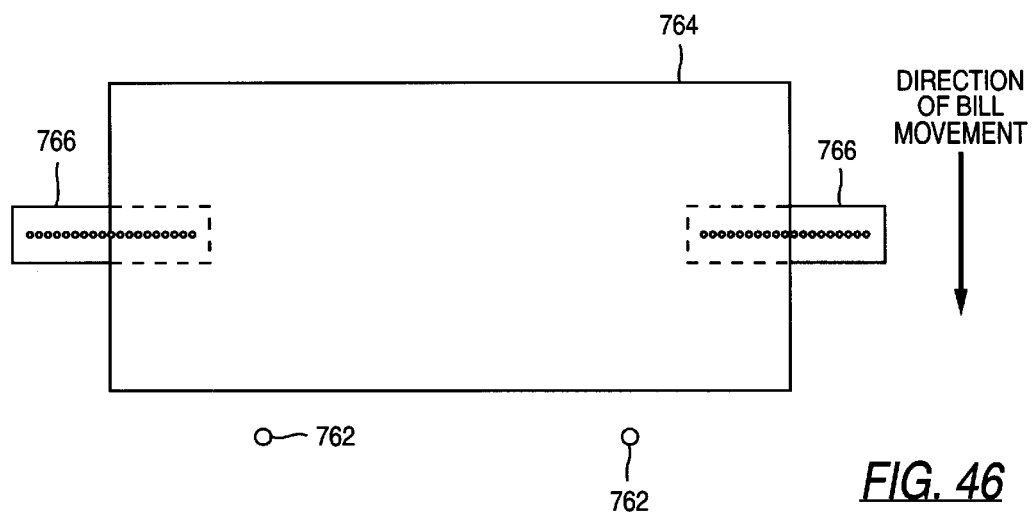
FIG. 46 is a top view of a bill and size determining sensors according to one embodiment of the present invention.

To accommodate non-U.S. currency of a variety of sizes, sensors are added to determine the size of a bill to be scanned. These sensors are placed upstream of the scanheads to be described below. One embodiment of size determining sensors is illustrated in FIG. 46. Two leading/trailing edge sensors 762 detect the leading and trailing edges of a bill 764 as it passing along the transport path. These sensors in conjunction with an encoder (e.g., encoder 32 of FIG. 1 and encoder 632 of FIG. 39) may be used to determine the dimension of the bill along a direction parallel to the scan direction which in FIG. 46 is the narrow dimension (or width) of the bill 764. Additionally, two side edge sensors 766 are used to detect the dimension of a bill 764 transverse to the scan direction which in FIG. 46 is the wide dimension (or length) of the bill 764. While the sensors 762 and 766 of FIG. 46 are optical sensors, any means of determining the size of a bill may be employed.

Once the size of a bill is determined, the potential identity of the bill is limited to those bills having the same size. Accordingly, the area to be scanned can be tailored to the area or areas best suited for identifying the denomination and country of origin of a bill having the measured dimensions.

Figure 47:
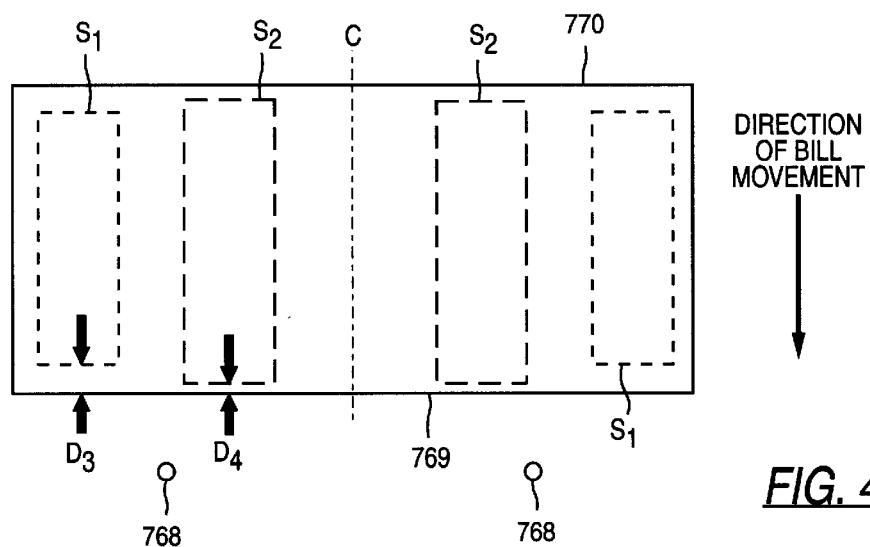
FIG. 47 is a top view of a bill illustrating multiple areas to be optically scanned on a bill according to one embodiment of the present invention.

While the printed indicia on U.S. currency is enclosed within a thin borderline, the sensing of which may serve as a trigger to begin scanning using a wider slit, most currencies of other currency systems such as those from other countries do not have such a borderline. Thus the system described above may be modified to begin scanning relative to the edge of a bill for currencies lacking such a borderline. Referring to FIG. 47, two leading edge detectors 768 are shown. The detection of the leading edge 769 of a bill 770 by leading edge sensors 768 triggers scanning in an area a given distance away from the leading edge of the bill 770, e.g., $D_3$ or $D_4$, which may vary depending upon the preliminary indication of the identity of a bill based on the dimensions of a bill. Alternatively, the leading edge 769 of a bill may be detected by one or more of the scanheads (to be described below) in a similar manner as that described with respect to FIGS. 6a and 6b. Alternatively, the beginning of scanning may be triggered by positional information provided by an encoder (e.g., encoder 32 of FIG. 1 or encoder 632 of FIG. 39), for example, in conjunction with the signals provided by sensors 762 of FIG. 46, thus eliminating the need for leading edge sensors 768.

However, when the initiation of scanning is triggered by the detection of the leading edge of a bill, the chance that a scanned pattern will be offset relative to a corresponding master pattern increases. Methods for compensating for such off-sets are described in U.S. patent application Ser. No. 08/287,882 filed on Aug. 9, 1994 incorporated herein by reference in its entirety.

While it has been determined that the scanning of the central area on the green side of a U.S. bill (see segment S of FIG. 4) provides sufficiently distinct patterns to enable discrimination among the plurality of U.S. denominations, the central area may not be suitable for bills originating in other countries. For example, for bills originating from Country 1, it may be determined that segment $S_1$ (FIG. 47) provides a more preferable area to be scanned, while segment $S_2$ (FIG. 47) is more preferable for bills originating from Country 2. Alternatively, in order to sufficiently discriminate among a given set of bills, it may be necessary to scan bills which are potentially from such set along more than one segment, e.g., scanning a single bill along both $S_1$ and $S_2$.

Figure 48:
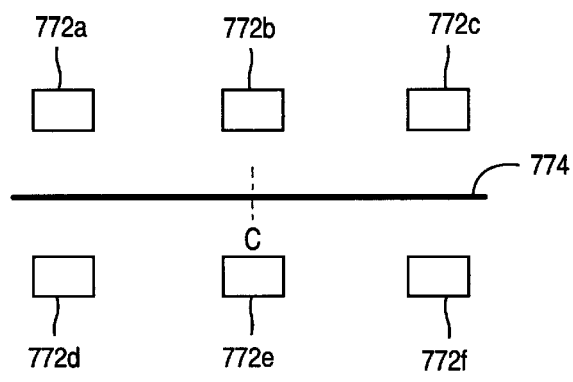
FIG. 48 is a side elevation of a multiple scanhead arrangement according to one embodiment of the present invention.

To accommodate scanning in areas other than the central portion of a bill, multiple scanheads may be positioned next to each other. One embodiment of such a multiple scanhead system is depicted in FIG. 48. Multiple scanheads 772a–c and 772d–f are positioned next to each other along a direction lateral to the direction of bill movement. Such a system permits a bill 774 to be scanned along different segments. Multiple scanheads 772a–f are arranged on each side of the transport path, thus permitting both sides of a bill 774 to be scanned.

Two-sided scanning may be used to permit bills to be fed into a currency discrimination system according to the present invention with either side face up. An example of a two-sided scanhead arrangement is disclosed in U.S. Pat. No. 5,467,406 and incorporated herein by reference. Master patterns generated by scanning genuine bills may be stored for segments on one or both sides. In the case where master patterns are stored from the scanning of only one side of a genuine bill, the patterns retrieved by scanning both sides of a bill under test may be compared to a master set of single-sided master patterns. In such a case, a pattern retrieved from one side of a bill under test should match one of the stored master patterns, while a pattern retrieved from the other side of the bill under test should not match one of the master patterns. Alternatively, master patterns may be stored for both sides of genuine bills. In such a two-sided system, a pattern retrieved by scanning one side of a bill under test should match with one of the master patterns of one side (Match 1) and a pattern retrieved from scanning the opposite side of a bill under test should match the master pattern associated with the opposite side of a genuine bill identified by Match 1.

Alternatively, in situations where the face orientation of a bill (i.e., whether a bill is "face up" or "face down") may be determined prior to or during characteristic pattern scanning, the number of comparisons may be reduced by limiting comparisons to patterns corresponding to the same side of a bill. That is, for example, when it is known that a bill is "face up", scanned patterns associated with scanheads above the transport path need only be compared to master patterns generated by scanning the "face" of genuine bills. By "face" of a bill it is meant a side which is designated as the front surface of the bill. For example, the front or "face" of a U.S. bill may be designated as the "black" surface while the back of a U.S. bill may be designated as the "green" surface. The face orientation may be determinable in some situations by sensing the color of the surfaces of a bill. An alternative method of determining the face orientation of U.S. bills by detecting the borderline on each side of a bill is disclosed in U.S. Pat. No. 5,467,406. The implementation of color sensing is discussed in more U.S. patent application Ser. No. 08/287,882 filed on Aug. 9, 1994 incorporate herein by reference in its entirety.

According to the embodiment of FIG. 48, the bill transport mechanism operates in such a fashion that the central area C of a bill 774 is transported between central scanheads 772b and 772e. Scanheads 772a and 772c and likewise scanheads 772d and 772f are displaced the same distance from central scanheads 772b and 772e, respectively. By symmetrically arranging the scanheads about the central region of a bill, a bill may be scanned in either direction, e.g., top edge first (forward direction) or bottom edge first (reverse direction). As described above with respect to FIGS. 2–6, master patterns are stored from the scanning of genuine bills in both the forward and reverse directions. While a symmetrical arrangement is preferred, it is not essential provided appropriate master patterns are stored for a non-symmetrical system.

Figure 49:
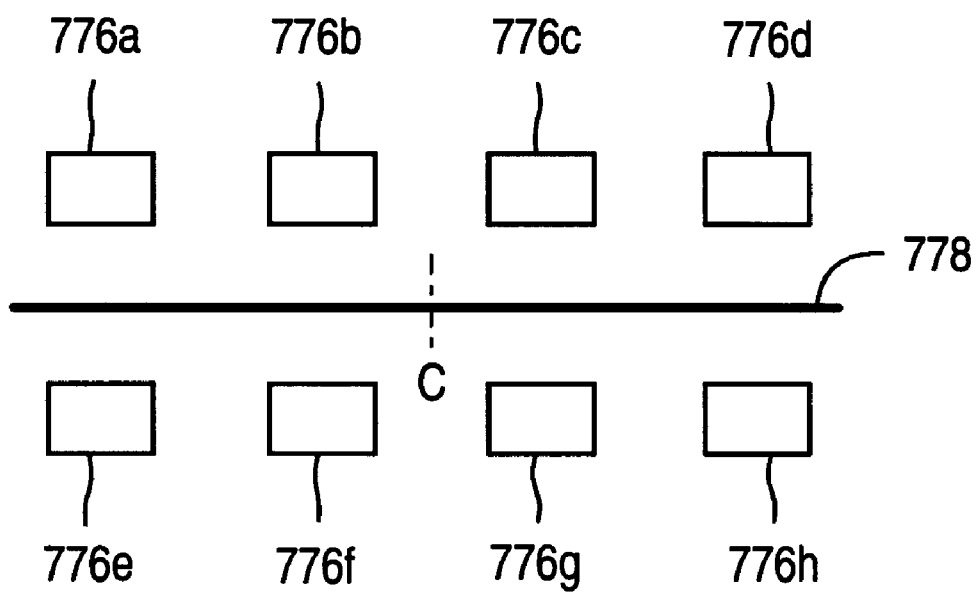
FIG. 49 is a side elevation of a multiple scanhead arrangement according to another embodiment of the present invention.

While FIG. 48 illustrates a system having three scanheads per side, any number of scanheads per side may be utilized. Likewise, it is not necessary that there be a scanhead positioned over the central region of a bill. For example, FIG. 49 illustrates another embodiment of the present invention capable of scanning the segments $S_1$ and $S_2$ of FIG. 47. Scanheads 776a, 776d, 776e, and 776h scan a bill 778 along segment $S_1$ while scanheads 776b, 776c, 776f, and 776g scan segment $S_2$.

What is claimed is:

1. A currency evaluation device for receiving a stack of currency bills and rapidly evaluating all the bills in the stack, said device comprising:

an input receptacle adapted to receive a stack of bills to be evaluated;

a single output receptacle adapted to receive said bills after said bills have been evaluated;

a transport mechanism adapted to transport said bills, one at a time, from said input receptacle to said output receptacle along a transport path;

a denomination discriminating unit adapted to evaluate said bills, said discriminating unit comprising a processor and two functioning denomination detectors positioned along said transport path between said input receptacle and said output receptacle, said detectors being disposed on opposite sides of said transport path so as to be disposed adjacent to first and second opposing surfaces of said bills, said detectors being adapted to generate output signals, said discriminating unit counting and determining the denomination of said bills, said output signals being available to said discriminating unit for determining the denomination of said bills; and means for flagging a bill when the denomination of said bill is not determined by said discriminating unit.

2. The currency evaluation device of claim 1 wherein said means for flagging causes said transport mechanism to halt with said bill whose denomination has not been determined being the last bill transported to said output receptacle.

3. The currency evaluation device of claim 2 wherein each of said detectors includes a stationary optical scanning head for scanning at least a preselected segment of each bill transported between said input and output receptacles by said transport mechanism and producing an output signal representing the scanned image and wherein said discriminating unit includes a processor adapted to receive said output signal and determine the denomination of each scanned bill.

4. The currency evaluation device of claim 2 wherein said transport mechanism is adapted to transport and said discriminating unit is adapted to denominate bills at a rate of at least about 800 bills per minute.

5. The currency evaluation device of claim 2 wherein said bill whose denomination has not been determined is removed from the device before said transport mechanism is restarted.

6. The currency evaluation device of claim 1 wherein each of said detectors includes a stationary optical scanning head for scanning at least a preselected segment of each bill transported between said input and output receptacles by said transport mechanism, and producing an output signal representing the scanned image and wherein said discriminating unit includes a processor adapted to receive said output signal and determine the denomination of each scanned bill.

7. The currency evaluation device of claim 1 wherein said transport mechanism is adapted to transport and said discriminating unit is adapted to denominate bills at a rate of at least about 800 bills per minute.

8. The currency evaluation device of claim 1 wherein said transport mechanism is adapted to transport and said discriminating unit is adapted to denominate bills at a rate of at least about 1000 bills per minute.

9. The currency evaluation device of claim 1 wherein said means for flagging causes said transport mechanism to halt.

10. The currency evaluation device of claim 9 wherein said transport mechanism is adapted to transport and said discriminating unit is adapted to denominate bills at a rate of at least about 800 bills per minute.

11. The currency evaluation device of claim 9 wherein said transport mechanism is adapted to transport and said discriminating unit is adapted to denominate bills at a rate of at least about 1000 bills per minute.

12. The currency evaluation device of claim 1 wherein the discriminating unit is adapted to determine the denomination of U.S. currency bills.

13. The currency evaluation device of claim 1 wherein the discriminating unit is adapted to determine the denomination of currency bills having the same dimensions.

14. The currency evaluation device of claim 1 wherein the input receptacle is adapted to receive a stack of bills having a plurality of denominations and the discriminating unit is adapted to determine the denomination of bills having a plurality of denominations.

15. The currency evaluation device of claim 1 wherein the input receptacle is adapted to receive a stack of bills having a plurality of U.S. currency denominations and the discriminating unit is adapted to determine the denomination of bills having a plurality of U.S. currency denominations.

16. The currency evaluation device of claim 4 wherein the optical scanning head scans each bill using reflected light.

17. The currency evaluation device of claim 4 wherein the discriminating unit is adapted to determine the denomination of U.S. currency bills.

18. The currency evaluation device of claim 4 wherein the discriminating unit is adapted to determine the denomination of currency bills having the same dimensions.

19. The currency evaluation device of claim 4 wherein the input receptacle is adapted to receive a stack of bills having a plurality of denominations and the discriminating unit is adapted to determine the denomination of bills having a plurality of denominations.

20. The currency evaluation device of claim 4 wherein the input receptacle is adapted to receive a stack of bills having a plurality of U.S. currency denominations and the discriminating unit is adapted to determine the denomination of bills having a plurality of U.S. currency denominations.

21. The currency evaluation device of claim 7 wherein the input receptacle is adapted to receive a stack of bills having a plurality of U.S. currency denominations and the discriminating unit is adapted to determine the denomination of bills having a plurality of U.S. currency denominations.

22. The currency evaluation device of claim 8 wherein the input receptacle is adapted to receive a stack of bills having a plurality of U.S. currency denominations and the discriminating unit is adapted to determine the denomination of bills having a plurality of U.S. currency denominations.

23. A currency evaluation device for receiving a stack of currency bills and rapidly evaluating all the bills in the stack, said device comprising:

an input receptacle adapted to receive a stack of bills to be evaluated;

at least one output receptacle adapted to receive said bills after said bills have been evaluated;

a transport mechanism adapted to transport said bills, one at a time, from said input receptacle to said output receptacle along a transport path;

a denomination discriminating unit adapted to evaluate said bills, said discriminating unit comprising a processor and two functioning denomination detectors positioned along said transport path between said input receptacle and said output receptacle, said detectors being disposed on opposite sides of said transport path so as to be disposed adjacent to first and second opposing surfaces of said bills, said detectors being adapted to generate output signals, said discriminating unit counting and determining the denomination of said bills, said output signals being available to said discriminating unit for determining the denomination of said bills; and means for flagging a bill when the denomination of said bill is not determined by said discriminating unit, wherein said means for flagging causes said transport mechanism to halt.

24. The currency evaluation device of claim 23 wherein said means for flagging causes said transport mechanism to halt with said bill whose denomination has not been determined being the last bill transported to said output receptacle.

25. The currency evaluation device of claim 24 wherein said transport mechanism adapted to transport and said discriminating unit is adapted to denominate bills at a rate of at least about 800 bills per minute.

26. The currency evaluation device of claim 24 wherein said bill whose denomination has not been determined is removed from said output receptacle before said transport mechanism is restarted.

27. The currency evaluation device of claim 23 wherein said transport mechanism is adapted to transport and said discriminating unit is adapted to denominate bills at a rate of at least about 800 bills per minute.

28. The currency evaluation device of claim 23 wherein said transport mechanism is adapted to transport and said discriminating unit is adapted to denominate bills at a rate of at least about 1000 bills per minute.

29. A currency evaluation device for receiving a stack of currency bills and rapidly evaluating all the bills in the stack, said device comprising:

an input receptacle adapted to receive a stack of bills to be evaluated;

a single output receptacle adapted to receive said bills after said bills have been evaluated;

a transport mechanism adapted to transport said bills, one at a time, from said input receptacle to said output receptacle along a transport path;

a denomination discriminating unit adapted to evaluate said bills, said discriminating unit comprising a processor and two functioning denomination detectors positioned along said transport path between said input receptacle and said output receptacle, said detectors being disposed on opposite sides of said transport path so as to be disposed adjacent to first and second opposing surfaces of said bills, said detectors being adapted to generate output signals, said discriminating unit counting and determining the denomination of said bills, said output signals being available to said discriminating unit for determining the denomination of said bills; and means for flagging a bill meeting or failing to meet a certain criteria.

30. The currency evaluation device of claim 29 wherein said means for flagging a bill causes said transport mechanism to halt with said bill meeting or failing to meet said certain criteria being positioned at an identifiable location in said output receptacle.

31. The currency evaluation device of claim 30 wherein said certain criteria is said discriminating unit determining the denomination of said bill and wherein said means for flagging causes said transport mechanism to halt when said bill fails to meet said criteria of having its denomination determined by said discriminating unit.

32. The currency evaluation device of claim 30 further comprising an authenticating unit, said authenticating unit performing one or more authenticating tests on said bills and wherein said certain criteria is a bill failing one or more of said one or more authenticating tests and wherein said means for flagging causes said transport mechanism to halt when said bill fails one or more of said one or more authenticating tests.

33. The currency evaluation device of claim 29 further comprising an authenticating unit, said authenticating unit performing one or more authenticating tests on said bills and wherein said certain criteria is a bill failing one or more of said one or more authenticating tests and wherein said means for flagging causes said transport mechanism to halt when said bill fails one or more of said one or more authenticating tests.

34. A currency evaluation device for receiving a stack of currency bills and rapidly evaluating all the bills in the stack, said device comprising:

an input receptacle adapted to receive a stack of bills to be evaluated;

a single output receptacle adapted to receive said bills after said bills have been evaluated;

a transport mechanism adapted to transport said bills, one at a time, from said input receptacle to said output receptacle along a transport path;

a denomination discriminating unit adapted to evaluate said bills, said discriminating unit comprising a processor and two functioning denomination detectors positioned along said transport path between said input receptacle and said output receptacle, said detectors being disposed on opposite sides of said transport path so as to be disposed adjacent to first and second opposing surfaces of said bills, said detectors being adapted to generate output signals, said discriminating unit counting and determining the denomination of said bills, said output signals being available to said discriminating unit for determining the denomination of said bills; and means for halting said transport mechanism when said discriminating unit detects a bill meeting or failing to meet a certain criteria.

35. The currency evaluation device of claim 34 wherein said certain criteria is said discriminating unit determining the denomination of said bill and wherein said means for halting causes said transport mechanism to halt when said bill fails to meet said criteria of having its denomination determined by said discriminating unit.

36. The currency evaluation device of claim 34 further comprising an authenticating unit, said authenticating unit performing one or more authenticating tests on said bills and wherein said certain criteria is a bill failing one or more of said one or more authenticating tests and wherein said means for flagging causes said transport mechanism to halt when said bill fails one or more of said one or more authenticating tests.

37. A document evaluation device for receiving a stack of documents and rapidly evaluating all the documents in the stack, said device comprising:

an input receptacle adapted to receive a stack of documents to be evaluated, genuine ones of said documents each having one of a plurality of images thereon, said plurality of images defining a plurality of document types;

a single output receptacle adapted to receive said documents after said documents have been evaluated;

a transport mechanism adapted to transport said documents, one at a time, from said input receptacle to said output receptacle along a transport path;

a document type discriminating unit adapted to evaluate said documents, said discriminating unit comprising a processor and two functioning document type detectors positioned along said transport path between said input receptacle and said output receptacle, said detectors being disposed on opposite sides of said transport path so as to be disposed adjacent to first and second opposing surfaces of said documents, said detectors being adapted to generate output signals, said discriminating unit being capable of distinguishing among said plurality of document types by scanning the image on each of said documents, said discriminating unit counting and determining the document type of said documents, said output signals being available to said discriminating unit for determining the document type of said documents; and means for flagging a document when the type of said document is not determined by said discriminating unit.

38. The document evaluation device of claim 37 wherein said means for flagging causes said transport mechanism to halt with said document whose type has not been determined being the last document transported to said output receptacle.

39. The document evaluation device of claim 38 wherein said transport mechanism is adapted to transport and said discriminating unit is adapted to determine the document type of documents at a rate of at least about 800 documents per minute.

40. The document evaluation device of claim 37 wherein the detectors scans each bill using reflected light.

41. The document evaluation device of claim 37 wherein the discriminating unit is adapted to determine the denomination of U.S. currency bills.

42. The document evaluation device of claim 37 wherein the discriminating unit is adapted to determine the denomination of currency bills having the same dimensions.

43. The document evaluation device of claim 37 wherein the input receptacle is adapted to receive a stack of bills having a plurality of denominations and the discriminating unit is adapted to determine the denomination of bills having a plurality of denominations.

44. The currency evaluation device of claim 37 wherein the input receptacle is adapted to receive a stack of bills having a plurality of U.S. currency denominations and the discriminating unit is adapted to determine the denomination of bills having a plurality of U.S. currency denominations.

45. The currency evaluation device of claim 39 wherein the input receptacle is adapted to receive a stack of bills having a plurality of U.S. currency denominations and the discriminating unit is adapted to determine the denomination of bills having a plurality of U.S. currency denominations.

46. The document evaluation device of claim 39 wherein the detectors scans each bill using reflected light.

47. A method of counting and discriminating currency bills of different denominations using a currency evaluation device comprising:

receiving a stack of bills to be evaluated in an input receptacle of the evaluation device;

transporting, under control of the evaluation device, the bills, one at a time, from the input receptacle to a single output receptacle of the evaluation device along a transport path;

counting and determining the denomination of the bills under control of the evaluation device using a denomination discriminating unit comprising two functioning denomination detectors positioned along the transport path and disposed on opposite sides of the transport path so as to be disposed adjacent to first and second opposing surfaces of the bills, the determining the denomination of the bills comprising generating output signals by the detectors and using the signals to determine the denomination of the bills; and flagging a bill when the denomination of the bill can not be determined under control of the evaluation device.

48. The method of claim 47 wherein flagging a bill comprises halting the transporting of the bills in the stack with the bill whose denomination has not been determined being the last bill transported to the output receptacle.

49. The method of claim 48 wherein transporting and determining the denomination of bills is performed at a rate of at least about 1000 bills per minute.

50. The method of claim 48 wherein determining the denomination of the bills comprises scanning by the detectors at least a preselected segment of each side of each bill transported between the input and output receptacles, and producing output signals representing the scanned images.

51. The method of claim 50 the scanning detects reflected light.

52. The method of claim 51 wherein transporting and determining the denomination of bills is performed at a rate of at least about 800 bills per minute.

53. The method of claim 52 further comprising removing, under the control of an operator of the evaluation device, the bill whose denomination has not been determined from the evaluation device after transporting has been halted.

54. The method of claim 52 wherein the stack of bills received in the input receptacle have a plurality of U.S. currency denominations and the discriminating unit determines the denomination of bills having a plurality of U.S. currency denominations.

55. The method of claim 47 wherein determining the denomination of the bills comprises scanning by the detectors at least a preselected segment of each side of each bill transported between the input and output receptacles, and producing an output signal representing the scanned images.

56. The method of claim 47 wherein transporting and determining the denomination of bills is performed at a rate of at least about 800 bills per minute.

57. The method of claim 47 wherein transporting and determining the denomination of bills is performed at a rate of at least about 1000 bills per minute.

58. The method of claim 57 wherein the stack of bills received in the input receptacle have a plurality of U.S. currency denominations and the discriminating unit determines the denomination of bills having a plurality of U.S. currency denominations.

59. The method of claim 47 wherein flagging comprises halting the transporting of bills.

60. The method of claim 59 further comprising removing, under the control of an operator of the evaluation device, the bill whose denomination has not been determined from the evaluation device after transporting has been halted.

61. The method of claim 60 further comprising resuming transporting bills after the bill whose denomination has not been determined has been removed from the evaluation device.

62. A method of counting and discriminating documents of different types using a document evaluation device comprising:

receiving a stack of documents to be evaluated in an input receptacle of the evaluation device, genuine ones of the documents each having one of a plurality of images thereon, the plurality of images defining a plurality of document types;

transporting, under control of the evaluation device, the documents, one at a time, from the input receptacle to a single output receptacle of the evaluation device;

counting and determining the type of the documents under control of the evaluation device, the evaluation device distinguishing among the plurality of document types by scanning the image on each side of the documents and using the images to distinguish among the plurality of document types; and flagging a document when the type of the document can not be determined under control of the evaluation device.

63. The method of claim 62 wherein flagging comprises halting the transporting of the documents in the stack with the document whose type has not been determined being the last document transported to the output receptacle.

64. The method of claim 62 wherein the stack of documents received in the input receptacle comprise U.S. currency having a plurality of U.S. currency denominations and the evaluation device determines the denomination of bills having a plurality of U.S. currency denominations.

65. A currency evaluation device for receiving a stack of currency bills and rapidly evaluating all the bills in the stack, the device comprising:

an input receptacle positioned to receive a stack of bills to be evaluated;

a single output receptacle positioned to receive the bills after the bills have been evaluated;

a transport mechanism comprising a transport drive motor and transport rollers, the transport mechanism located between the input receptacle and the output receptacle to transport the bills, one at a time, from the input receptacle to the output receptacle along a transport path;

a denomination discriminating unit comprising two denomination detectors positioned along and on opposite sides of the transport path between the input receptacle and the output receptacle and comprising a processor, the detectors generating characteristic information output signals in response to detected characteristic information, the characteristic information output signals being electrically coupled to the processor, the processor receiving the characteristic information output signals and generating a denomination signal in response thereto; and a flagging device comprising the processor and an encoder linked to the transport mechanism, the encoder producing tracking signals in response to the physical movement of the bills, the processor generating a no call signal when the denomination of a bill is not determined by the processor.

66. The currency evaluation device of claim 65 wherein the flagging device generates a stopping signal in response to the no call signal and wherein the transport drive motor stops in response to the stopping signal.

67. The currency evaluation device of claim 65 wherein the flagging device flags a bill by stopping the transport mechanism.

68. The currency evaluation device of claim 65 wherein the input receptacle is adapted to receive a stack of bills having a plurality of U.S. currency denominations and the discriminating unit is adapted to determine the denomination of bills having a plurality of U.S. currency denominations.

69. The currency evaluation device of claim 65 wherein the detector comprises an optical scanhead.

70. The currency evaluation device of claim 69 wherein the input receptacle is adapted to receive a stack of bills having a plurality of U.S. currency denominations and the discriminating unit is adapted to determine the denomination of bills having a plurality of U.S. currency denominations.

71. The currency evaluation device of claim 65 wherein the processor generates a scanned pattern from each of the bills based on the characteristic information output signal and determines the denomination of a bill by comparing the scanned pattern generated from the bill with master patterns associated with different denominations of bills, the master patterns being stored in a memory.

72. A currency evaluation device for receiving a stack of currency bills and rapidly evaluating all the bills in the stack, the device comprising:

an input receptacle positioned to receive a stack of bills to be evaluated;

a single output receptacle positioned to receive the bills after the bills have been evaluated;

a transport mechanism comprising a transport drive motor and transport rollers, the transport mechanism located between the input receptacle and the output receptacle to transport the bills, one at a time, from the input receptacle to the output receptacle along a transport path; and a denomination discriminating unit comprising two denomination detectors positioned along and on opposite sides of the transport path between the input receptacle and the output receptacle and comprising a processor, the detectors generating characteristic information output signals in response to detected characteristic information, the characteristic information output signals being electrically coupled to the processor, the processor receiving the characteristic information output signals and generating a denomination signal in response thereto.

73. The currency evaluation device of claim 72 wherein the transport mechanism is adapted to transport and the discriminating unit is adapted to denominate bills at a rate of at least about 800 bills per minute.

74. The currency evaluation device of claim 72 wherein the transport mechanism is adapted to transport and the discriminating unit is adapted to denominate bills at a rate of at least about 1000 bills per minute.

75. The currency evaluation device of claim 74 wherein the input receptacle is adapted to receive a stack of bills having a plurality of U.S. currency denominations and the discriminating unit is adapted to determine the denomination of bills having a plurality of U.S. currency denominations.

76. The currency evaluation device of claim 72 wherein the processor generates a scanned pattern from each side of each of the bills based on the characteristic information output signals and determines the denomination of a bill by comparing the scanned pattern generated from the bill with master patterns associated with different denominations of bills, the master patterns being stored in a memory.

77. The currency evaluation device of claim 76 wherein the detectors comprise optical reflected light detectors and wherein the scanned and master patterns comprise optical reflected light patterns.

78. The currency evaluation device of claim 77 wherein the input receptacle is adapted to receive a stack of bills having a plurality of U.S. currency denominations and the discriminating unit is adapted to determine the denomination of bills having a plurality of U.S. currency denominations.

79. The currency evaluation device of claim 77 wherein the processor correlates at least one of the scanned patterns generated from the bill with master patterns associated with different denominations of bills and determines the denomination of the bill if the scanned pattern sufficiently correlates with one of the master patterns.

80. The currency evaluation device of claim 79 wherein the transport mechanism is adapted to transport and the discriminating unit is adapted to denominate bills at a rate of at least about 800 bills per minute.

81. The currency evaluation device of claim 79 wherein the transport mechanism is adapted to transport and the discriminating unit is adapted to denominate bills at a rate of at least about 1000 bills per minute.

82. The currency evaluation device of claim 81 wherein the input receptacle is adapted to receive a stack of bills having a plurality of U.S. currency denominations and the discriminating unit is adapted to determine the denomination of bills having a plurality of U.S. currency denominations.

83. A compact currency evaluation device for receiving a stack of currency bills, rapidly evaluating all the bills in the stack, and placing the bills into a single output receptacle, the device comprising:

an input receptacle adapted to receive a stack of bills to be evaluated;

a single output receptacle adapted to receive the bills after the bills have been evaluated;

a transport mechanism adapted to transport the bills, one at a time, from the input receptacle to the output receptacle along a transport path;

a denomination discriminating unit adapted to evaluate the bills, the discriminating unit comprising two denomination detectors positioned along the transport path between the input receptacle and the output receptacle, the detectors being disposed on opposite sides of the transport path so as to be disposed adjacent to first and second opposing surfaces of the bills so as to permit scanning opposing surfaces of the bills, the discriminating unit counting and determining the denomination of the bills regardless of whether the bills pass the discriminating unit facing up or facing down, the discriminating unit is adapted to determine the denomination of bills of a plurality of denominations; and means for flagging a bill when the denomination of the bill is not determined by the discriminating unit.

84. The currency evaluation device of claim 83 wherein the transport mechanism is adapted to transport and the discriminating unit is adapted to denominate bills at a rate of at least about 1000 bills per minute.

85. The currency evaluation device of claim 84 wherein the discriminating unit is adapted to determine the denomination of bills having a plurality of U.S. currency denominations.

86. A compact currency evaluation device for receiving a stack of currency bills, rapidly evaluating the bills in the stack, and placing the bills into a single output receptacle, the device comprising:

an input receptacle positioned to receive a stack of bills to be evaluated;

a single output receptacle positioned to receive the bills after the bills have been evaluated;

a transport mechanism comprising a transport drive motor and transport rollers, the transport mechanism located between the input receptacle and the output receptacle to transport the bills, one at a time, from the input receptacle to the output receptacle along a transport path; and a denomination discriminating unit comprising two denomination detectors positioned along and on opposite sides of the transport path between the input receptacle and the output receptacle so as to permit scanning opposing surfaces of the bills and comprising a processor, the detectors generating characteristic information output signals in response to detected characteristic information, the characteristic information output signals being electrically coupled to the processor, the processor receiving the characteristic information output signals and generating a denomination signal in response thereto, the discriminating unit being adapted to determine the denomination of bills having a plurality of denominations regardless of whether the bills pass the discriminating unit facing up or facing down.

87. The currency evaluation device of claim 86 wherein the transport mechanism is adapted to transport and the discriminating unit is adapted to denominate bills at a rate of at least about 800 bills per minute.

88. The currency evaluation device of claim 86 wherein the transport mechanism is adapted to transport and the discriminating unit is adapted to denominate bills at a rate of at least about 1000 bills per minute.

89. The currency evaluation device of claim 88 wherein the discriminating unit is adapted to determine the denomination of bills having a plurality of U.S. currency denominations.

90. A method of counting and discriminating currency bills of different denominations using a compact currency evaluation device comprising:

receiving a stack of bills to be evaluated in an input receptacle of the evaluation device;

transporting, under control of the evaluation device, the bills, one at a time, from the input receptacle to a single output receptacle of the evaluation device along a transport path;

counting and determining the denomination of the bills under control of the evaluation device using a denomination discriminating unit comprising two denomination detectors positioned along the transport path and disposed on opposite sides of the transport path so as to be disposed adjacent to first and second opposing surfaces of the bills, the discriminating unit determining the denomination of bills regardless of whether the bills are transported adjacent the denomination detectors in a face-up or face-down manner.

91. The method of claim 90 wherein transporting and determining the denomination of bills is performed at a rate of at least about 1000 bills per minute.

92. The method of claim 90 wherein transporting and determining the denomination of bills is performed at a rate of at least about 800 bills per minute.

93. The method of claim 92 wherein determining the denomination of the bills comprises scanning by the detectors at least a preselected segment of each side of each bill transported between the input and output receptacles, and producing an output signal representing the scanned images.

94. The method of claim 93 wherein the stack of bills received in the input receptacle comprises bills of a plurality of U.S. currency denominations and the discriminating unit determines the denomination of bills having a plurality of U.S. currency denominations.

95. The method of claim 94 further comprising halting the transporting of the bills in the stack when the denomination of a bill can not be determined under control of the evaluation device such that the bill whose denomination has not been determined is the last bill transported to the output receptacle.

96. A currency counting and evaluation device for receiving a stack of currency bills, rapidly counting and evaluating all the bills in the stack, and then re-stacking the bills, the device comprising a feed mechanism for receiving a stack of currency bills and feeding the bills, one at a time, to a bill transport mechanism;

the bill transport mechanism transporting bills from the feed mechanism to a stacking station along a transport path, at a rate in excess of about 800 bills per minute;

a first optical scanning head located on a first side of the transport path between the feed mechanism and the stacking station for scanning a first preselected segment of a central portion of a first side of each bill transported between the stations by the transport mechanism, the first scanning head including at least one light source for illuminating a strip of the preselected segment of a bill, and at least one detector for receiving light from the illuminated strip on the bill and producing a first output signal representing variations in the intensity of the received light;

a second optical scanning head located on a second side of the transport path between the feed mechanism and the stacking station for scanning a second preselected segment of a central portion of a second side of each bill transported between the stations by the transport mechanism, the second scanning head including at least one light source for illuminating a strip of the preselected segment of a bill, and at least one detector for receiving light from the illuminated strip on the bill and producing a second output signal representing variations in the intensity of the received light;

means for sampling at least one of the output signals at preselected intervals as a bill is moved across the scanning head, each of the output signal samples being proportional to the intensity of the light received from a different strip of one of the preselected segments of a bill;

a memory for storing characteristic signal samples produced by scanning the preselected segments of bills of different denominations with the scanning head and sampling the output signal at the preselected intervals, each of the stored signal samples being proportional to the intensity of the light received from a different strip of a preselected segment of a bill; and signal processing means for receiving the signal samples and (1) determining the denomination of each scanned bill by comparing the stored signal samples with the output signal samples produced by the scanning of each bill with the scanning head, (2) counting the number of scanned bills of each denomination, and (3) accumulating the cumulative value of the scanned bills of each denomination, the signal processing means being adapted to determine the denomination of bills regardless of whether the bills are transported along the transport path in a face-up or face-down manner.

97. The currency counting and evaluation device of claim 96 wherein
the feed mechanism feeds the bills in the direction of the narrow dimension of the bills;
the bill transport mechanism transports bills in the direction of the narrow dimension of the bills; and
the first and second scanning heads comprise first and second stationary optical scanning heads and the detectors of the first and second scanning heads receive reflected light.

98. The currency counting and evaluation device of claim 97 wherein the signal processing means is capable of determining the denomination of each scanned bill by comparing stored signal samples and output signal samples associated only with scanning the central portion of each bill.

* * * * *